US012693502B2

(12) United States Patent
Chen et al.

(10) Patent No.: US 12,693,502 B2
(45) Date of Patent: Jul. 28, 2026

(54) IMAGE CAPTURING SYSTEM LENS ASSEMBLY, IMAGING APPARATUS AND ELECTRONIC DEVICE

(71) Applicant: LARGAN PRECISION CO., LTD., Taichung City (TW)

(72) Inventors: I-Chieh Chen, Taichung City (TW); Cheng-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 260 days.

(21) Appl. No.: 18/670,052

(22) Filed: May 21, 2024

(65) Prior Publication Data

US 2025/0004250 A1    Jan. 2, 2025

(30) Foreign Application Priority Data

Jun. 29, 2023    (TW) ................................. 112124406

(51) Int. Cl.
*G02B 13/00*       (2006.01)
*G02B 9/64*        (2006.01)

(52) U.S. Cl.
CPC ........... *G02B 13/0045* (2013.01); *G02B 9/64* (2013.01)

(58) Field of Classification Search
None
See application file for complete search history.

(56) References Cited

U.S. PATENT DOCUMENTS

| | | | |
|---|---|---|---|
| 9,615,008 B2 | 4/2017 | Sun | |
| 11,137,576 B2 | 10/2021 | Kuo | |
| 11,774,718 B2 | 10/2023 | Wang et al. | |
| 2019/0033557 A1 | 1/2019 | Chang | |
| 2019/0033558 A1 | 1/2019 | Chang | |
| 2022/0091396 A1* | 3/2022 | Ko ........................... G02B 9/64 | |
| 2022/0326486 A1 | 10/2022 | Chang | |

FOREIGN PATENT DOCUMENTS

| | | |
|---|---|---|
| CN | 110609376 A | 12/2019 |
| CN | 110764222 A | 2/2020 |
| CN | 111367053 A | 7/2020 |
| CN | 112698490 A | 4/2021 |
| CN | 112987259 A | 6/2021 |
| CN | 213633974 U | 7/2021 |
| CN | 114675405 A | 6/2022 |
| JP | H01221715 A | 9/1989 |
| JP | 2012181508 A | 9/2012 |

(Continued)

*Primary Examiner* — Phu Vu
(74) *Attorney, Agent, or Firm* — McClure, Qualey & Rodack, LLP

(57) ABSTRACT

An image capturing system lens assembly includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. The fourth lens element has negative refractive power. The image-side surface of the eighth lens element is concave in a paraxial region thereof, and the image-side surface of the eighth lens element includes at least one inflection point.

29 Claims, 35 Drawing Sheets

1

(56)           References Cited

FOREIGN PATENT DOCUMENTS

| | | | |
|---|---|---|---|
| JP | 2012234169 | A | 11/2012 |
| TW | 202001335 | A | 1/2020 |
| TW | 202248709 | A | 12/2022 |
| WO | 2014103200 | A1 | 7/2014 |
| WO | 2021117497 | A1 | 6/2021 |

\* cited by examiner

100

101

102

103

104

300

301

310

320

330

400

401

490

450

460

410

420

470

430

480

440

610

IMAGE CAPTURING SYSTEM LENS ASSEMBLY, IMAGING APPARATUS AND ELECTRONIC DEVICE

RELATED APPLICATIONS

This application claims priority to Taiwan Application Serial Number 112124406, filed Jun. 29, 2023, which is herein incorporated by reference.

BACKGROUND

Technical Field

The present disclosure relates to an image capturing system lens assembly and an imaging apparatus. More particularly, the present disclosure relates to an image capturing system lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an image capturing system lens assembly that meets the aforementioned needs.

Moreover, nowadays, unmanned aerial vehicles have become lighter and high image quality. In order to reduce the weight itself, lens elements in optical lens assemblies thereof are all made of plastic material. Even it helps to simplify the structure of optical lens assemblies and reduce the overall size, it is not suitable for high temperature, low temperature, humid and other weather conditions, that is, it has greater deformation by being more susceptible to the influence of external temperature, and it is also difficult to maintain high image quality in various weather environments at the same time. Thus, the environment for the use of unmanned aerial vehicles is greatly restricted.

SUMMARY

According to one aspect of the present disclosure, an image capturing system lens assembly includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. Preferably, the image-side surface of the first lens element is concave in a paraxial region thereof. Preferably, the second lens element has positive refractive power. Preferably, the fourth lens element has negative refractive power. Preferably, the fifth lens element has positive refractive power. Preferably, the eighth lens element has negative refractive power. Preferably, the image-side surface of the eighth lens element is concave in a paraxial region thereof. Preferably, the image-side surface of the eighth lens element includes at least one inflection point. When the image capturing system lens assembly further comprises an aperture stop, an axial distance between the aperture stop and the image-side surface of the eighth lens element is SD, an axial distance between the object-side surface of the first lens element and the image-side surface of the eighth lens element is TD, a focal length of the image capturing system lens assembly is f, a focal length of the first lens element is f1, a focal length of the second lens element is f2, an axial distance between the first lens element and the second lens element is T12, and a curvature radius of the image-side surface of the fifth lens element is R10, the following conditions are preferably satisfied: $0.20 < T12/f < 2.50$; $0.25 < |f2/f1| < 1.40$; $0.01 < SD/TD < 0.70$; and $0.40 < |f/R10| < 2.5$.

According to another aspect of the present disclosure, an imaging apparatus includes the image capturing system lens assembly of the aforementioned aspect and an image sensor, wherein the image sensor is disposed on an image surface of the image capturing system lens assembly.

According to another aspect of the present disclosure, an electronic device includes the imaging apparatus of the aforementioned aspect.

According to another aspect of the present disclosure, an image capturing system lens assembly includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. Preferably, the image-side surface of the first lens element is concave in a paraxial region thereof. Preferably, the object-side surface of the second lens element is convex in a paraxial region thereof. Preferably, the fourth lens element has negative refractive power. Preferably, the image-side surface of the fifth lens element is convex in a paraxial region thereof. Preferably, the image-side surface of the eighth lens element is concave in a paraxial region thereof. Preferably, the image-side surface of the eighth lens element includes at least one inflection point. When a focal length of the image capturing system lens assembly is f, a focal length of the first lens element is f1, a focal length of the second lens element is f2, an axial distance between the first lens element and the second lens element is T12, a curvature radius of the object-side surface of the second lens element is R3, and a curvature radius of the image-side surface of the second lens element is R4, the following conditions are preferably satisfied: $0.25 < T12/f < 2.50$; $0.25 < |f2/f1| < 1.40$; and $-12.00 < (R3-R4)/(R3+R4) < 0.20$.

According to another aspect of the present disclosure, an image capturing system lens assembly includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. Preferably, the image-side surface of the first lens element is concave in a paraxial region thereof. Preferably, the second lens element has positive refractive power. Preferably, the object-side surface of the second lens element is convex in a paraxial region thereof. Preferably, the fourth lens element has negative refractive power. Preferably, the image-side surface of the fifth lens element is convex in a paraxial region thereof. Preferably, the eighth lens element has negative refractive power. Preferably, the image-side surface of the eighth lens element is concave in a paraxial region thereof. Preferably, the image-side surface of the eighth lens element includes at least one inflection point. When the image capturing system lens assembly further comprises an aperture stop, an axial distance between the aperture stop and the image-side surface of the eighth lens element is SD, an axial distance between the object-side surface of the first lens element and the image-side surface of the eighth lens element is TD, a focal length of the image capturing system lens assembly is f, a focal length of the first lens element is f1, a focal length of the second lens element is f2, an axial distance between the first lens element and the second lens element is T12, a curvature radius of the object-side surface of the first lens element is R1, and a curvature radius of the image-side surface of the eighth lens element is R16, the following conditions are preferably satisfied: $0.28<T12/f<2.00$; $0.01<|f2/f1|<1.40$; $0.01<SD/TD<0.70$; and $0.10<(R1-R16)/(R1+R16)<2.00$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
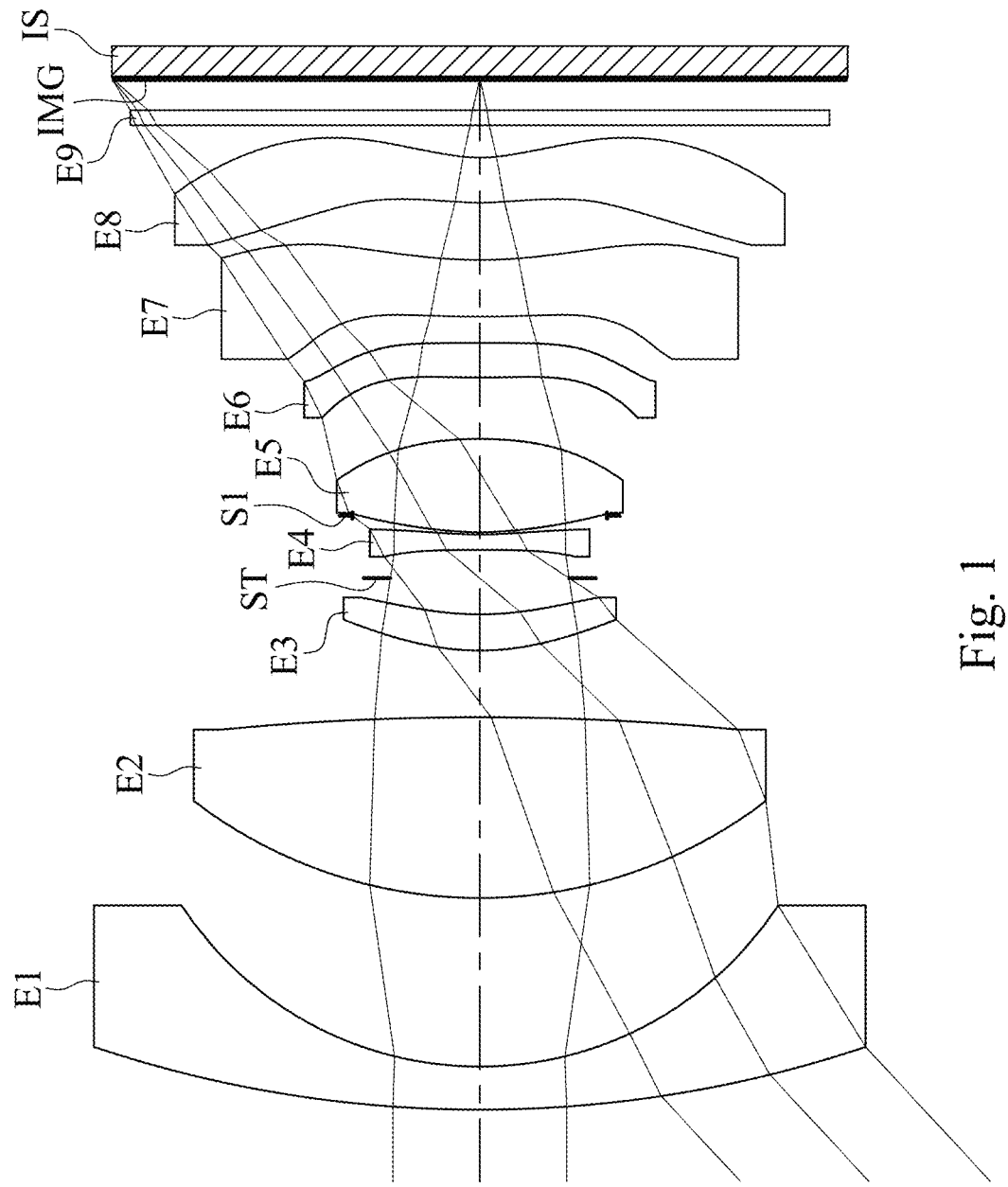
FIG. 1 is a schematic view of an imaging apparatus according to the 1st embodiment of the present disclosure.

The present disclosure provides an image capturing system lens assembly, which includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side.

The object-side surface of the first lens element can be convex in a paraxial region thereof, which is favorable for enlarging field of view and the image size. The image-side surface of the first lens element is concave in a paraxial region thereof, which is favorable for balancing spherical aberration of the image capturing system lens assembly.

The second lens element can have positive refractive power, which is favorable for compressing the volume of the image capturing system lens assembly by converging the light. The object-side surface of the second lens element can be convex in a paraxial region thereof, so that it is favorable for compressing the volume of the image capturing system lens assembly by adjusting the surface shape and refractive power of the second lens element.

The fourth lens element has negative refractive power, so that it is favorable for enlarging the image surface by adjusting the travelling direction of the light.

The fifth lens element can have positive refractive power, so that it is favorable for effectively controlling the travelling direction of the light path by balancing refractive power of the fourth lens element. The object-side surface of the fifth lens element can be convex in a paraxial region thereof, so that it is favorable for enhancing the image quality by increasing the symmetry of the image capturing system lens assembly. The image-side surface of the fifth lens element can be convex in a paraxial region thereof, thus the fifth lens element can obtain the light converging ability so as to avoid the excessive incident angle of light from the peripheral region which would generate the stray light.

The object-side surface of the seventh lens element can be convex in a paraxial region thereof, so that it is favorable for compressing the volume and correcting aberrations by adjusting the surface shape and refractive power of the seventh lens element. The image-side surface of the seventh lens element can be concave in a paraxial region thereof. Therefore, it is favorable for controlling the back focal length by assisting the eighth lens element so as to avoid the difficulty for reducing the size of devices by preventing the excessive volume of the image capturing system lens assembly.

The eighth lens element can have negative refractive power, so that it is favorable for avoiding the excessive total track length by effectively controlling the back focal length of the image capturing system lens assembly. The image-side surface of the eighth lens element is concave in a paraxial region thereof, so that it is favorable for balancing the back focal length of the image capturing system lens assembly and also correcting off-axis aberration.

The object-side surface of the seventh lens element can include at least one inflection point, which is favorable for enhancing the ability of the object-side surface of the seventh lens element for correcting aberrations of the peripheral region of the image. The image-side surface of seventh lens element can include at least one inflection point, which is favorable for the manufacturing of the lens element and the correcting ability of aberrations by enhancing the flexibility of the shape of the seventh lens element to design.

The image-side surface of the eighth lens element includes at least one inflection point, so that it is favorable for correcting and compensating aberrations of the peripheral region of the image.

When a focal length of the image capturing system lens assembly is f, and an axial distance between the first lens element and the second lens element is T12, the following condition is satisfied: $0.20<T12/f<2.50$. Therefore, it is favorable for reasonably contributing the volume, reducing the assembling error and controlling the size of field of view by controlling the ratio of the distance between the first lens element and the second lens element and the focal length. Further, the following condition can be satisfied: $0.25<T12/f<2.50$. Furthermore, the following condition can be satisfied: $0.25<T12/f<2.00$. Furthermore, the following condition can be satisfied: $0.28<T12/f<2.00$. Furthermore, the following condition can be satisfied: $0.35<T12/f<1.00$. Furthermore, the following condition can be satisfied: $0.30<T12/f<1.50$. Moreover, the following condition can be satisfied: $0.43≤T12/f≤0.63$.

When a focal length of the first lens element is f1, and a focal length of the second lens element is f2, the following condition is satisfied: $0.01<|f2/f1|<1.40$. Therefore, it is favorable for increasing the symmetry of the image capturing system lens assembly and decreasing the size of flare spot on the center of the field by balancing the first lens element and the second lens element. Further, the following condition can be satisfied: $0.25<|f2/f1|<1.40$. Furthermore, the following condition can be satisfied: $0.40<|f2/f1|<1.20$. Moreover, the following condition can be satisfied: $0.61≤|f2/f1|≤0.93$.

The image capturing system lens assembly can further include an aperture stop. When an axial distance between the aperture stop and the image-side surface of the eighth lens element is SD, and an axial distance between the object-side surface of the first lens element and the image-side surface of the eighth lens element is TD, the following condition is satisfied: $0.01<SD/TD<0.70$. Therefore, it is favorable for obtaining the balance between the amount of incoming light and the volume of the lens elements by controlling the location of the aperture stop. Further, the following condition can be satisfied: $0.20<SD/TD<0.60$. Furthermore, the following condition can be satisfied: $0.38≤SD/TD≤0.49$.

When the focal length of the image capturing system lens assembly is f, and a curvature radius of the image-side surface of the fifth lens element is R10, the following condition is satisfied: $0.40<|f/R10|<2.5$. Therefore, it is favorable for effectively balancing the refractive power and the surface shape of the lens element, so that aberrations of the image capturing system lens assembly can be corrected and the stray light therein can be reduced. Further, the following condition can be satisfied: $0.50<|f/R10|<2.0$. Furthermore, the following condition can be satisfied: $0.76≤|f/R10|≤1.26$.

When a curvature radius of the object-side surface of the second lens element is R3, and a curvature radius of the image-side surface of the second lens element is R4, the following condition is satisfied: $-12.00<(R3-R4)/(R3+R4)<0.20$. Therefore, it is favorable for reducing the effective diameter and the volume of the image capturing system lens assembly by adjusting the curvature radius of the object-side surface of the second lens element and the curvature radius of the image-side surface of the second lens element. Further, the following condition can be satisfied: $-10.00<(R3-R4)/(R3+R4)<0.00$. Furthermore, the following condition can be satisfied: $-7.00<(R3-R4)/(R3+R4)<-0.50$. Moreover, the following condition can be satisfied: $-5.37≤(R3-R4)/(R3+R4)≤-0.72$.

When a curvature radius of the object-side surface of the first lens element is R1, and a curvature radius of the image-side surface of the eighth lens element is R16, the following condition is satisfied: $0.10<(R1-R16)/(R1+R16)<2.00$. Therefore, it is favorable for obtaining the balance between the light converging quality in the center and the volume of the image capturing system lens assembly by adjusting the curvature radius of the object-side surface of the first lens element and the curvature radius of the image-side surface of the eighth lens element. Further, the following condition can be satisfied: 0.50<(R1−R16)/(R1+R16) <1.50. Furthermore, the following condition can be satisfied:

$$0.35 \le (R1 - R16)/(R1 + R16) \le 1.10.$$

When the focal length of the image capturing system lens assembly is f, a focal length of the third lens element is f3, a focal length of the fourth lens element is f4, a focal length of the fifth lens element is f5, and a focal length of the sixth lens element is f6, the following condition is satisfied: 0<(|f/f3|+|f/f6|)/(| f/f4|+|f/f5|)<0.50. Therefore, the light converging ability of the fourth lens element and the fifth lens element can be enhanced which can be further balanced by the third lens element and the sixth lens element, so that the total track length of the image capturing system lens assembly can be reduced. Further, the following condition can be satisfied: 0.02<(|f/f3|+|f/f6|)/(|f/f4|+|f/f5|)<0.30.

When the focal length of the third lens element is f3, and the focal length of the fifth lens element is f5, the following condition is satisfied: 0<|f5/f3|<0.25. Therefore, it is favorable for balancing the back focal length of the image capturing system lens assembly by adjusting the arrangement of the focal length so as to satisfy more application. Further, the following condition can be satisfied:

$$0.01 < |f5/f3| < 0.18.$$

When an axial distance between the object-side surface of the first lens element and the image surface is TL, and a maximum image height of the image capturing system lens assembly is ImgH, the following condition is satisfied: 1.50<TL/ImgH<3.50. Therefore, it is favorable for compressing the total track length of the image capturing system lens assembly under the sufficient image size. Further, the following condition can be satisfied: 2.40<TL/ImgH<3.20.

When a central thickness of the fourth lens element is CT4, and a central thickness of the fifth lens element is CT5, the following condition is satisfied: 0.10<CT4/CT5<0.40. Therefore, it is favorable for enlarging the field of view by adjusting the ratio of the central thicknesses of the fourth lens element and the fifth lens element. Further, the following condition can be satisfied: 0.12<CT4/CT5<0.38.

When the axial distance between the first lens element and the second lens element is T12, and an axial distance between the image-side surface of the eighth lens element and the image surface is BL, the following condition is satisfied: 0.90<T12/BL<5.00. Therefore, it is favorable for balancing the field of view and the back focal length of the image capturing system lens assembly so as to apply to various fields. Further, the following condition can be satisfied:

$$1.50 < T12/BL < 4.00.$$

When an Abbe number of the eighth lens element is V8, the following condition is satisfied: 10.0<V8<40.0. Therefore, it is favorable for correcting chromatic aberration generated by the image capturing system lens assembly and enhancing the image quality. Further, the following condition can be satisfied: 15.0<V8<35.0.

When an axial distance between the object-side surface of the first lens element and the image-side surface of the second lens element is Dr1r4, and an axial distance between the object-side surface of the sixth lens element and the image-side surface of the eighth lens element is Dr11r16, the following condition is satisfied: 1.20<Dr1r4/Dr11r16<2.50. Therefore, it is favorable for obtaining the balance between the assembling error and the manufacturability by adjusting the ratio between the thicknesses of the lens group on the object side and the lens group on the image side. Further, the following condition can be satisfied:

$$1.50 < Dr1r4/Dr11r16 < 2.20.$$

When a maximum effective radius of the object-side surface of the first lens element is Y1R1, and a maximum effective radius of the image-side surface of the eighth lens element is Y8R2, the following condition is satisfied: 0.80<Y1R1/Y8R2<1.50. Therefore, the heights of the effective radii of the first lens element and the eighth lens element can be balanced, so that the symmetry of the image capturing system lens assembly can be increased so as to enhance the image quality. Further, the following condition can be satisfied: 1.00<Y1R1/Y8R2<1.30.

When a maximum effective radius of the object-side surface of the fifth lens element is Y5R1, and a maximum image height of the image capturing system lens assembly is ImgH, the following condition is satisfied: 0.20<Y5R1/ImgH<0.50. Therefore, it is favorable for increasing the image size and reducing the effective radius of the fifth lens element by adjusting the height of the effective radius of the object-side surface of the fifth lens element. Further, the following condition can be satisfied: 0.25<Y5R1/ImgH<0.42.

When a displacement in parallel with an optical axis from an axial vertex on the image-side surface of the first lens element to a maximum effective radius position on the image-side surface of the first lens element is SAG1R2, and a central thickness of the first lens element is CT1, the following condition is satisfied: 1.00<SAG1R2/CT1<4.50. Therefore, the curvature of the peripheral surface shape of the image-side surface of the first lens element can be balanced, it is favorable for avoiding the total reflection by moderating the refraction angle of light. Further, the following condition can be satisfied: 1.40<SAG1R2/CT1<4.00.

Both of the first lens element and the second lens element can be made of glass material. The use of glass material can effectively reduce the sensitivity to environmental factors, which is applicable for various environments with high stability. Further, it is favorable for resisting humid environments and preventing surface damage, such as scratches, by using glass material on the object side of the image capturing system lens assembly, so that the life time of electronic products can be extended effectively.

When a refractive index of the second lens element is N2, the following condition is satisfied: 1.620<N2<1.900. Therefore, it is favorable for reducing the image differences caused by temperature effects and maintaining high imaging level under different environments with different temperatures by adjusting the refractive index of the second lens element. Further, the following condition can be satisfied: 1.680<N2<1.850.

When a maximum field of view of the image capturing system lens assembly is FOV, the following condition is satisfied: 70.0 degrees<FOV<120.0 degrees. Therefore, it is favorable for obtaining sufficient imaging range of the image capturing system lens assembly so as to satisfy the requirement the field of view of the applied device. Further, the following condition can be satisfied: 80.0 degrees<FOV<100.0 degrees.

When a curvature radius of the object-side surface of the first lens element is R1, and a curvature radius of the object-side surface of the fifth lens element is R9, the following condition is satisfied: 0.10<(R1−R9)/(R1+R9)<2.50. Therefore, the first lens element and the fifth lens element can cooperate with each other by effectively balancing the curvature radius of the object-side surface of the first lens element and the curvature radius of the object-side surface of the fifth lens element so as to enhance the central image quality. Further, the following condition can be satisfied: 0.20<(R1−R9)/(R1+R9)<1.50. Furthermore, the following condition can be satisfied: 0.30<(R1−R9)/(R1+R9)<1.00.

When a central thickness of the fifth lens element is CT5, and an axial distance between the seventh lens element and the eighth lens element is T78, the following condition is satisfied: 0.10<CT5/T78<4.00. Therefore, the central thickness of the fifth lens element and the axial distance between the seventh lens element and the eighth lens element can be balanced, so that it is favorable for the assembling of the image capturing system lens assembly so as to increase the yield rate. Further, the following condition can be satisfied: 0.50<CT5/T78<2.50.

When an Abbe number of the third lens element V3, and an Abbe number of the sixth lens element is V6, the following condition is satisfied: 1.5<V3/V6<3.5. Therefore, it is favorable for balancing the light converging abilities among different wavelengths and correcting chromatic aberration by adjusting the light path of the image capturing system lens assembly. Further, the following condition can be satisfied: 1.8<V3/V6<3.0.

When a curvature radius of the image-side surface of the fifth lens element is R10, and a curvature radius of the object-side surface of the seventh lens element is R13, the following condition is satisfied: −2.00<R10/R13<−0.10. Therefore, the surface shapes of the fifth lens element and the seventh lens element can be balanced effectively, so that the fifth lens element can obtain stronger controlling ability of the light path and can be balanced by the seventh lens element. Further, the following condition can be satisfied: −1.80<R10/R13<−0.50.

When a central thickness of the third lens element is CT3, and a central thickness of the fifth lens element is CT5, the following condition is satisfied: 1.70<CT5/CT3<5.50. Therefore, it is favorable for controlling the volume of the image capturing system lens assembly by balance the ratio of the central thicknesses of the third lens element and the fifth lens element. Further, the following condition can be satisfied: 2.00<CT5/CT3<4.00.

When the focal length of the image capturing system lens assembly is f, the curvature radius of the object-side surface of the fifth lens element is R9, and the curvature radius of the image-side surface of the fifth lens element is R10, the following condition is satisfied: 1.20<|f/R9|+|f/R10|<3.40. Therefore, it is favorable for correcting the image quality by adjusting the surface shape and the refractive power of the fifth lens element. Further, the following condition can be satisfied: 1.50<|f/R9|+|f/R10|<2.80.

The aperture stop can be located between the third lens element and the fourth lens element. Therefore, the image range and the incident angle of the incident light on the image surface can be restricted so as to satisfy the image effect of high illumination.

When the central thickness of the fifth lens element is CT5, and an axial distance between the fifth lens element and the sixth lens element is T56, the following condition is satisfied: 0.20<T56/CT5<1.35. Therefore, it is favorable for increasing the flexible to design by obtaining sufficient space between the fifth lens element and the sixth lens element. Further, the following condition can be satisfied: 0.50<T56/CT5<1.15.

When an Abbe number of the third lens element is V3, and an Abbe number of the fourth lens element is V4, the following condition is satisfied: 1.5<V3/V4<3.5. Therefore, it is favorable for correcting chromatic aberration by adjusting the arrangement of the material of the lens elements. Further, the following condition can be satisfied: 1.8<V3/V4<3.0.

Each of the aforementioned features of the image capturing system lens assembly can be utilized in various combinations for achieving the corresponding effects.

According to the image capturing system lens assembly of the present disclosure, the lens elements thereof can be made of glass or plastic materials. When the lens elements are made of glass materials, the distribution of the refractive power of the image capturing system lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the image capturing system lens assembly. Therefore, the total track length of the image capturing system lens assembly can also be reduced. The aspheric surfaces may be formed by a plastic injection molding method, a glass molding method or other manufacturing methods.

According to the image capturing system lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for light in a wavelength range of 600 nm-800 nm in the image capturing system lens assembly so as to reduce extra red light or infrared light, or the additives can have the absorption ability for light in a wavelength range of 350 nm-450 nm in the image capturing system lens assembly so as to reduce blue light or ultraviolet light. Therefore, additives can prevent the image from interfering by light in a particular wavelength range. Furthermore, the additives can be homogeneously mixed with the plastic material, and the lens elements can be made by the injection molding method. Moreover, the additives can be coated on the lens surfaces to provide the aforementioned effects.

According to the image capturing system lens assembly of the present disclosure, when a surface of the lens element is aspheric, it indicates that entire optical effective region of the surface of the lens element or a part thereof is aspheric.

According to the image capturing system lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the image capturing system lens assembly of the present disclosure, if the lens element has positive refractive power or negative refractive power, or the focal length of the lens element, all can be referred to the refractive power, or the focal length, in the paraxial region of the lens element.

According to the image capturing system lens assembly of the present disclosure, a critical point is a non-axial point of the lens surface where its tangent is perpendicular to the optical axis; an inflection point is a point on a lens surface with a curvature changing from positive to negative or from negative to positive.

According to the image capturing system lens assembly of the present disclosure, the image surface thereof, based on the corresponding image sensor, can be flat or curved. In particular, the image surface can be a concave curved surface facing towards the object side. Furthermore, the image capturing system lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 31A:
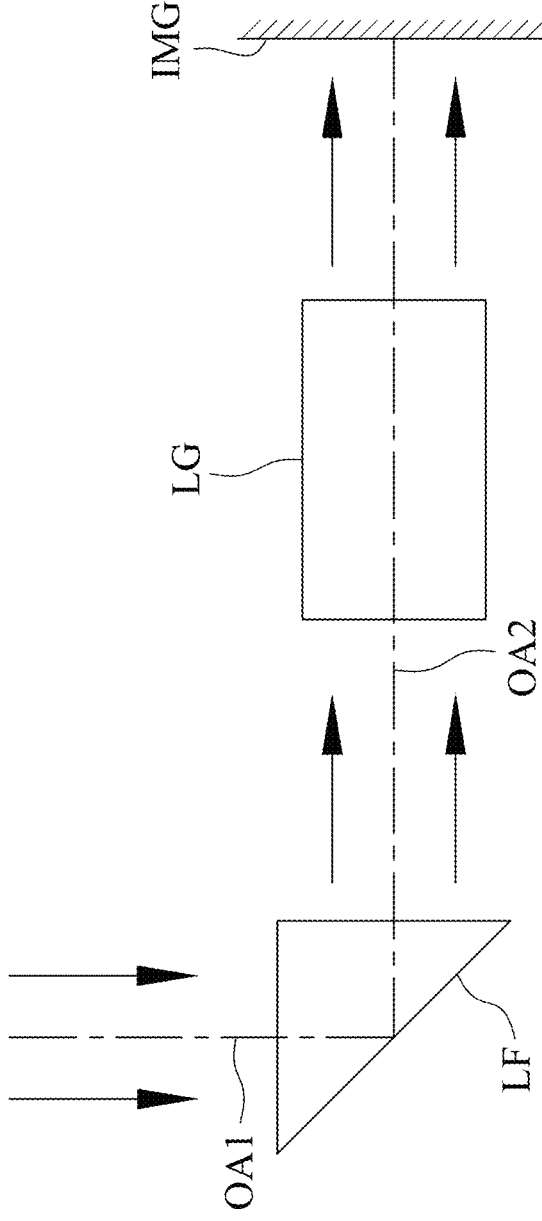
FIG. 31A is a schematic view of an arrangement of a light path folding element in the image capturing system lens assembly of the present disclosure.
Figure 31B:
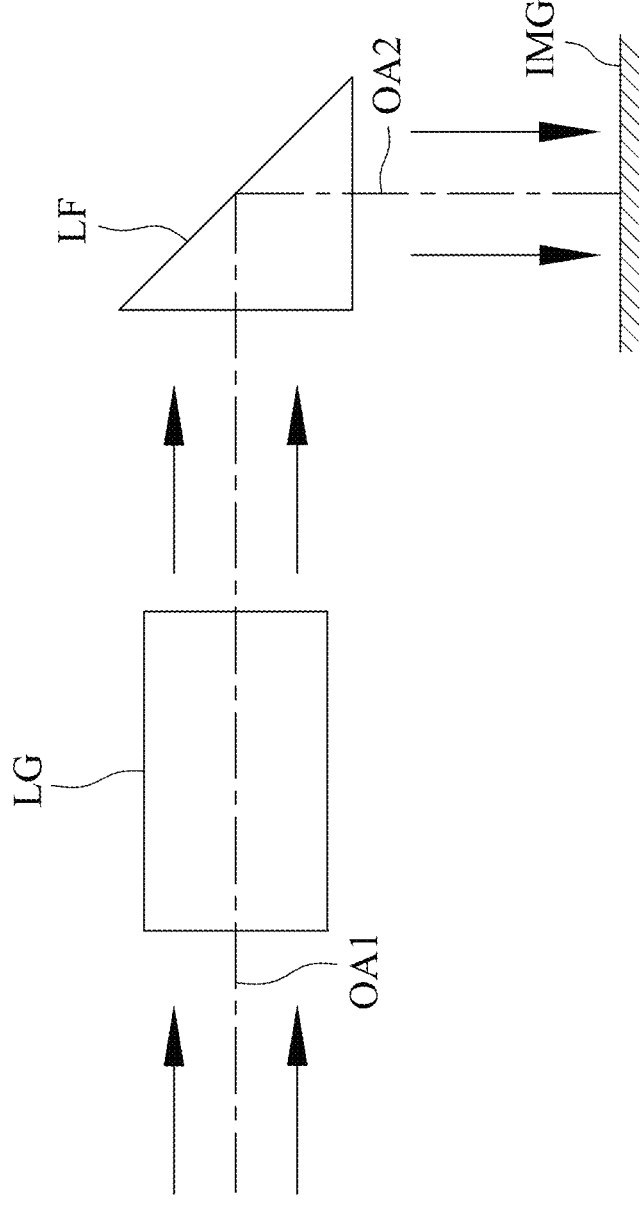
FIG. 31B is a schematic view of another arrangement of the light path folding element in the image capturing system lens assembly of the present disclosure.
Figure 31C:
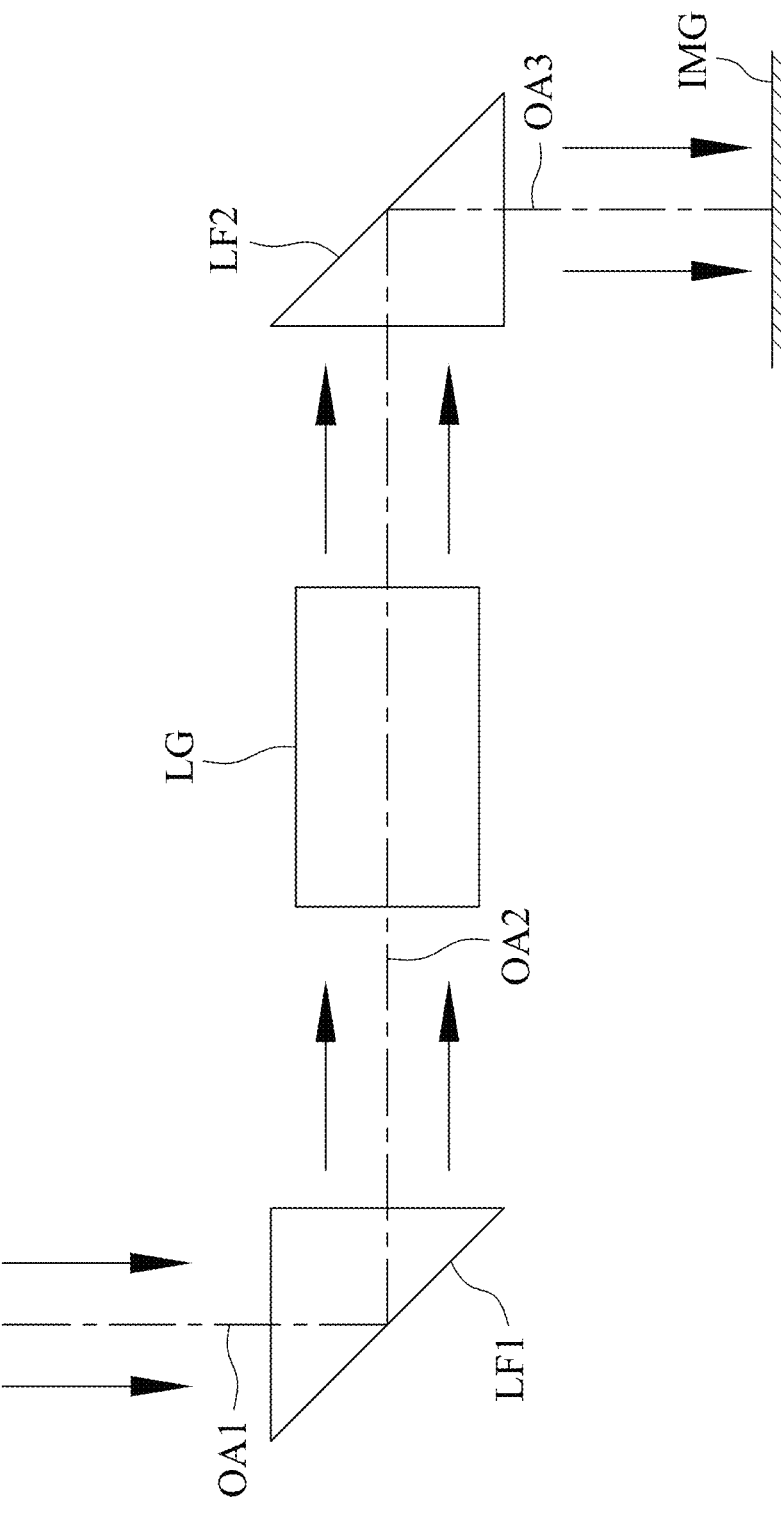
FIG. 31C is a schematic view of an arrangement of two light path folding elements in the image capturing system lens assembly of the present disclosure.

According to the image capturing system lens assembly of the present disclosure, at least one element with light path folding function can be selectively disposed between the imaged object and the image surface, such as a prism or a mirror, etc. Therefore it is favorable for providing high flexible space arrangement of the image capturing system lens assembly, so that the compactness of the electronic device would not be restricted by the optical total track length of the image capturing system lens assembly. FIG. 31A is a schematic view of an arrangement of a light path folding element LF in the image capturing system lens assembly of the present disclosure. FIG. 31B is a schematic view of another arrangement of the light path folding element LF in the image capturing system lens assembly of the present disclosure. As shown in FIGS. 31A and 31B, the image capturing system lens assembly includes, in order from an imaged object (not shown in drawings) to an image surface IMG, a first optical axis OA1, the light path folding element LF and a second optical axis OA2, wherein the light path folding element LF can be disposed between the imaged object and a lens group LG of the image capturing system lens assembly as shown in FIG. 31A, or can be disposed between the lens group LG of the image capturing system lens assembly and the image surface IMG as shown in FIG. 31B. Moreover, FIG. 31C is a schematic view of an arrangement of two light path folding elements LF1, LF2 in the image capturing system lens assembly of the present disclosure. As shown in FIG. 31C, the image capturing system lens assembly includes, in order from an imaged object (not shown in drawings) to an image surface IMG, a first optical axis OA1, the light path folding element LF1, a second optical axis OA2, the light path folding element LF2 and a third optical axis OA3, wherein the light path folding element LF1 is disposed between the imaged object and a lens group LG of the image capturing system lens assembly, and the light path folding element LF2 is disposed between the lens group LG of the image capturing system lens assembly and the image surface IMG. The image capturing system lens assembly can also be selectively disposed with three or more light path folding element, the type, amount and location of the light path folding element will not be limited to the present disclosure.

Furthermore, according to the image capturing system lens assembly of the present disclosure, the image capturing system lens assembly can include at least one stop, such as an aperture stop, a glare stop or a field stop, for eliminating stray light and thereby improving image resolution thereof.

According to the image capturing system lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the image capturing system lens assembly and the image surface can be obtained, and thereby obtains a telecentric effect and improves the image-sensing efficiency of the image sensor, such as CCD or CMOS. The middle stop is favorable for enlarging the field of view of the image capturing system lens assembly and thereby provides a wider field of view for the same.

According to the image capturing system lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the image capturing system lens assembly according to the present disclosure, so as to moderate the image quality by changing f-number such as changing the depth of field or the exposure speed.

The image capturing system lens assembly according to the present disclosure can include at least one optical lens element, an optical element or a carrier. A low reflection layer is disposed on at least one surface of at least one optical lens element, the optical element or the carrier, wherein the low reflection layer is favorable for effectively reducing the stray light formed by the reflection of light on the interface. The low reflection layer can be disposed on the non-optically effective area of the object-side surface or the image-side surface of the optical lens element, or can be disposed on the connecting surface between the object-side surface or the image-side surface; wherein the optical element can be at least one of a light blocking element, an annular spacer element, a barrel element, a cover glass, a blue glass, a filter or a color filter, a light path folding element, a prism or a mirror, etc.; wherein the carrier can be a lens group lens mount, a micro lens disposed on the image sensor, the peripheral of the image sensor substrate or a glass sheet for protecting the image sensor, etc.

According to the image capturing system lens assembly of the present disclosure, the image capturing system lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned image capturing system lens assembly and an image sensor is provided, wherein the image sensor is disposed on the image surface of the image capturing system lens assembly. By the arrangement of the refractive power, thicknesses and distributions of the distance between the lens elements in the image capturing system lens assembly, it is favorable for providing better field of view and maintaining high image quality. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific embodiments are provided for further explanation.

1st Embodiment

Figure 2:
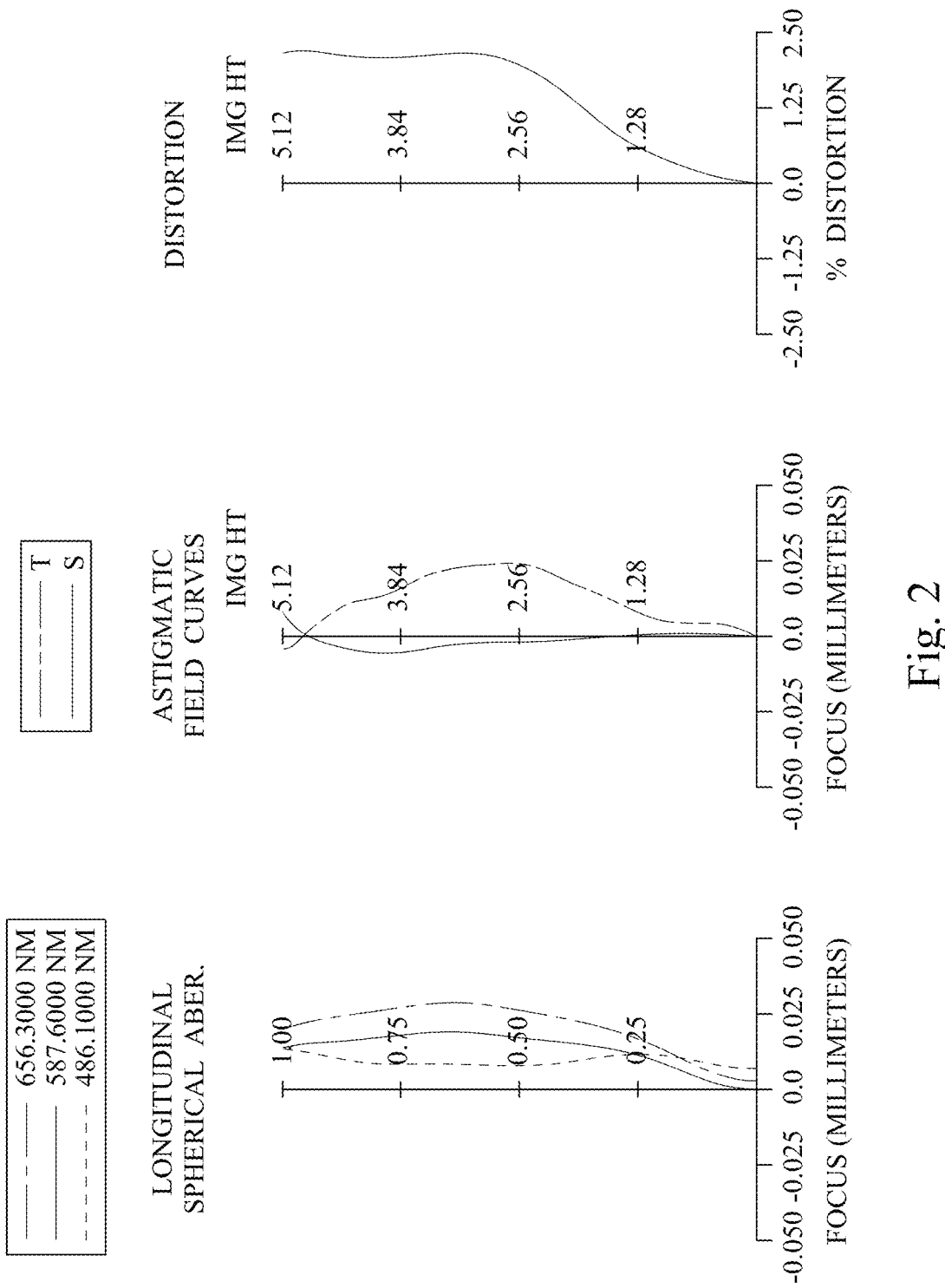
FIG. 2 shows spherical aberration curves, astigmatic field curves and a distortion curve of the imaging apparatus according to the 1st embodiment.

FIG. 1 is a schematic view of an imaging apparatus 1 according to the 1st embodiment of the present disclosure. FIG. 2 shows spherical aberration curves, astigmatic field curves and a distortion curve of the imaging apparatus 1 according to the 1st embodiment. In FIG. 1, the imaging apparatus 1 includes an image capturing system lens assembly (its reference numeral is omitted) and an image sensor IS. The image capturing system lens assembly includes, in order from an object side to an image side along an optical path, a first lens element E1, a second lens element E2, a third lens element E3, an aperture stop ST, a fourth lens element E4, a stop S1, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both spherical.

Figure 23:
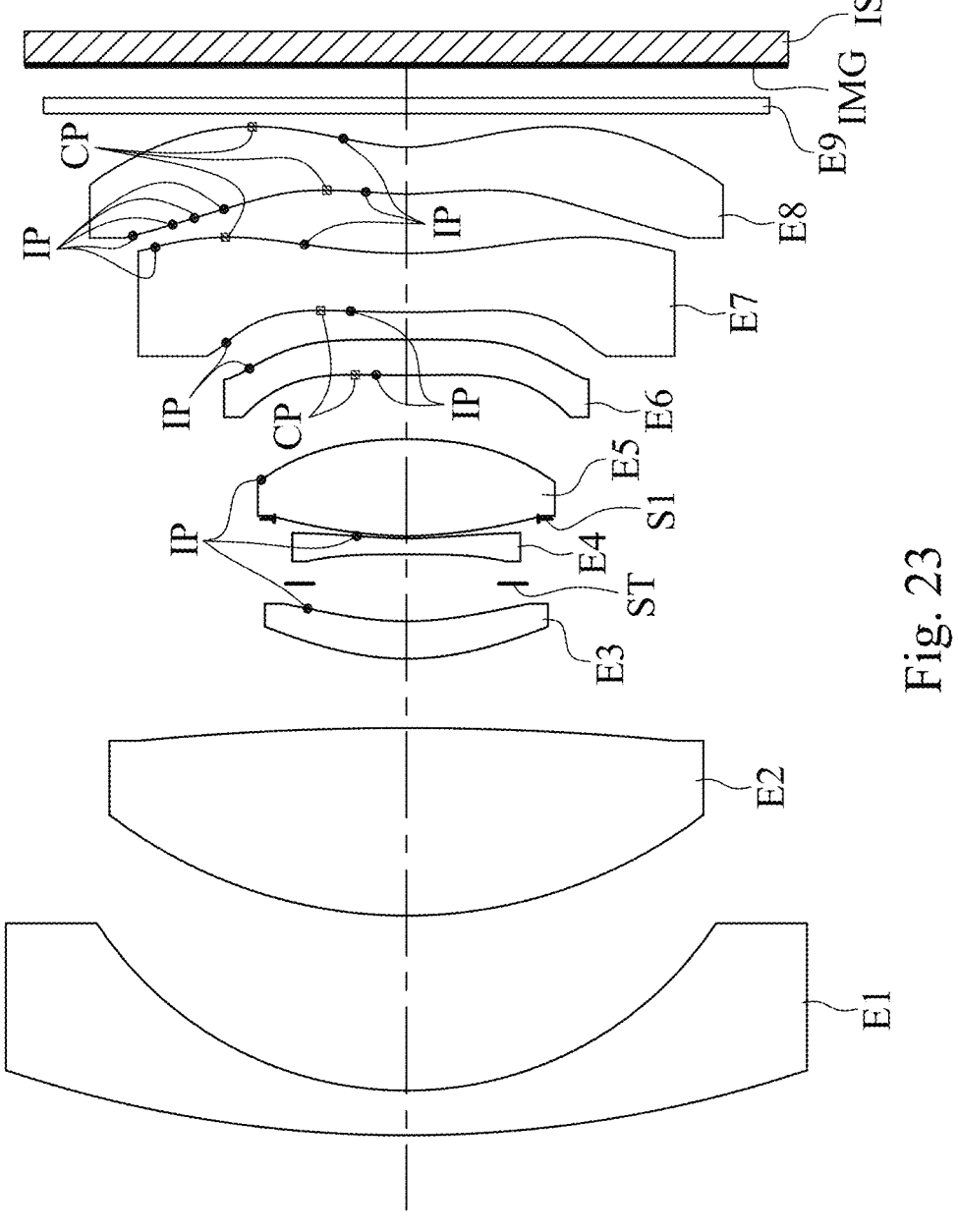
FIG. 23 is a schematic view of the inflection points and the critical points of each lens element according to the 1st embodiment.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, FIG. 23 is a schematic view of the inflection points IP and the critical points CP of each lens element according to the 1st embodiment. The image-side surface of the third lens element E3 includes one inflection point IP (as shown in FIG. 23).

The fourth lens element E4 with negative refractive power has an object-side surface being concave in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes one inflection point IP (as shown in FIG. 23).

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the image-side surface of the fifth lens element E5 includes one inflection point IP (as shown in FIG. 23).

The sixth lens element E6 with positive refractive power has an object-side surface being convex in a paraxial region thereof and an image-side surface being convex in a paraxial region thereof. The sixth lens element E6 is made of a plastic material, and has the object-side surface and the image-side surface being both aspheric. Furthermore, the object-side surface of the sixth lens element E6 includes one inflection point IP (as shown in FIG. 23) and one critical point CP (as shown in FIG. 23), and the image-side surface of the sixth lens element E6 includes one inflection point IP (as shown in FIG. 23).

The seventh lens element E7 with negative refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes two inflection points IP (as shown in FIG. 23) and one critical point CP (as shown in FIG. 23), and the image-side surface of the seventh lens element E7 includes two inflection points IP (as shown in FIG. 23) and one critical point CP (as shown in FIG. 23).

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes five inflection points IP (as shown in FIG. 23) and one critical point CP (as shown in FIG. 23), and the image-side surface of the eighth lens element E8 includes one inflection point IP (as shown in FIG. 23) and one critical point CP (as shown in FIG. 23).

The filter E9 is made of a glass material, which is located between the eighth lens element E8 and the image surface IMG in order, and will not affect the focal length of the image capturing system lens assembly.

The equation of the aspheric surface profiles of the aforementioned lens elements of the 1st embodiment is expressed as follows:

$$X(Y) = \left(Y^2/R\right)\big/\left(1 + sqrt\left(1 - (1+k)\times(Y/R)^2\right)\right) + \sum_i (Ai)\times\left(Y^i\right),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient.

In the image capturing system lens assembly according to the 1st embodiment, when a focal length of the image capturing system lens assembly is f, an f-number of the image capturing system lens assembly is Fno, and half of a maximum field of view of the image capturing system lens assembly is HFOV, these parameters have the following values: f=5.39 mm; Fno=2.23; and HFOV=42.9 degrees.

In the image capturing system lens assembly according to the 1st embodiment, when a maximum field of view of the image capturing system lens assembly is FOV, the following condition is satisfied: FOV=85.8 degrees.

In the image capturing system lens assembly according to the 1st embodiment, when an axial distance between the object-side surface of the first lens element E1 and the image surface IMG is TL, and a maximum image height of the image capturing system lens assembly is ImgH, the following condition is satisfied: TL/ImgH=2.81.

In the image capturing system lens assembly according to the 1st embodiment, when an axial distance between the aperture stop ST and the image-side surface of the eighth lens element E8 is SD, and an axial distance between the object-side surface of the first lens element E1 and the image-side surface of the eighth lens element E8 is TD, the following condition is satisfied:

$$SD/TD = 0.44.$$

In the image capturing system lens assembly according to the 1st embodiment, when the focal length of the image capturing system lens assembly is f, an axial distance between the first lens element E1 and the second lens element E2 is T12, and an axial distance between the image-side surface of the eighth lens element E8 and the image surface IMG is BL, the following conditions are satisfied: T12/f=0.44; and T12/BL=2.14.

In the image capturing system lens assembly according to the 1st embodiment, when a focal length of the first lens element E1 is f1, a focal length of the second lens element E2 is f2, a focal length of the third lens element E3 is f3, and a focal length of the fifth lens element E5 is f5, the following conditions are satisfied: |f2/f1|=0.80; and |f5/f3|=0.14.

In the image capturing system lens assembly according to the 1st embodiment, when the focal length of the image capturing system lens assembly is f, a curvature radius of the object-side surface of the fifth lens element E5 is R9, and a curvature radius of the image-side surface of the fifth lens element E5 is R10, the following conditions are satisfied: |f/R10|=1.00; and |f/R9|+|f/R10|=2.40.

In the image capturing system lens assembly according to the 1st embodiment, when the focal length of the image capturing system lens assembly is f, the focal length of the third lens element E3 is f3, a focal length of the fourth lens element E4 is f4, the focal length of the fifth lens element E5 is f5, and a focal length of the sixth lens element E6 is f6, the following condition is satisfied:

$$(|f/f3|+|f/f6|)/(|f/f4|+|f/f5|) = 0.19.$$

In the image capturing system lens assembly according to the 1st embodiment, when a curvature radius of the object-side surface of the first lens element E1 is R1, and the curvature radius of the object-side surface of the fifth lens element E5 is R9, the following condition is satisfied: (R1−R9)/(R1+R9)=0.63.

In the image capturing system lens assembly according to the 1st embodiment, when the curvature radius of the object-side surface of the first lens element E1 is R1, and a curvature radius of the image-side surface of the eighth lens element E8 is R16, the following condition is satisfied: (R1−R16)/(R1+R16)=0.75.

In the image capturing system lens assembly according to the 1st embodiment, when a curvature radius of the object-side surface of the second lens element E2 is R3, and a curvature radius of the image-side surface of the second lens element E2 is R4, the following condition is satisfied:

$$(R3 - R4)/(R3 + R4) = -1.42.$$

In the image capturing system lens assembly according to the 1st embodiment, when the curvature radius of the image-side surface of the fifth lens element E5 is R10, and a curvature radius of the object-side surface of the seventh lens element E7 is R13, the following condition is satisfied: R10/R13=−0.31.

In the image capturing system lens assembly according to the 1st embodiment, when an axial distance between the object-side surface of the first lens element E1 and the image-side surface of the second lens element E2 is Dr1r4, and an axial distance between the object-side surface of the sixth lens element E6 and the image-side surface of the eighth lens element E8 is Dr11r16, the following condition is satisfied: Dr1r4/Dr11r16=1.79; specifically, the axial distance between the first lens element E1 and the second lens element E2 is T12, an axial distance between the sixth lens element E6 and the seven lens element E7 is T67, an axial distance between the seventh lens element E7 and the eighth lens element E8 is T78, a central thickness of the first lens element E1 is CT1, a central thickness of the second lens element E2 is CT2, a central thickness of the sixth lens element E6 is CT6, a central thickness of the seventh lens element E7 is CT7, a central thickness of the eighth lens element E8 is CT8, $$Dr1r4/Dr11r16 = (CT1 + T12 + CT2)/(CT6 + T67 + CT7 + T78 + CT8).$$

In the image capturing system lens assembly according to the 1st embodiment, when a central thickness of the third lens element E3 is CT3, a central thickness of the fourth lens element E4 is CT4, a central thickness of the fifth lens element E5 is CT5, an axial distance between the fifth lens element E5 and the sixth lens element E6 is T56, and the axial distance between the seventh lens element E7 and the eighth lens element E8 is T78, the following conditions are satisfied: CT4/CT5=0.17; CT5/CT3=2.58; CT5/T78=1.63; and T56/CT5=0.66.

In the image capturing system lens assembly according to the 1st embodiment, when a refractive index of the second lens element E2 is N2, the following condition is satisfied: N2=1.802.

In the image capturing system lens assembly according to the 1st embodiment, when an Abbe number of the eighth lens element E8 is V8, the following condition is satisfied: V8=25.6.

In the image capturing system lens assembly according to the 1st embodiment, when an Abbe number of the third lens element E3 is V3, an Abbe number of the fourth lens element E4 is V4, and an Abbe number of the sixth lens element E6 is V6, the following conditions are satisfied: V3/V4=2.9; and V3/V6=2.4.

Figure 24:
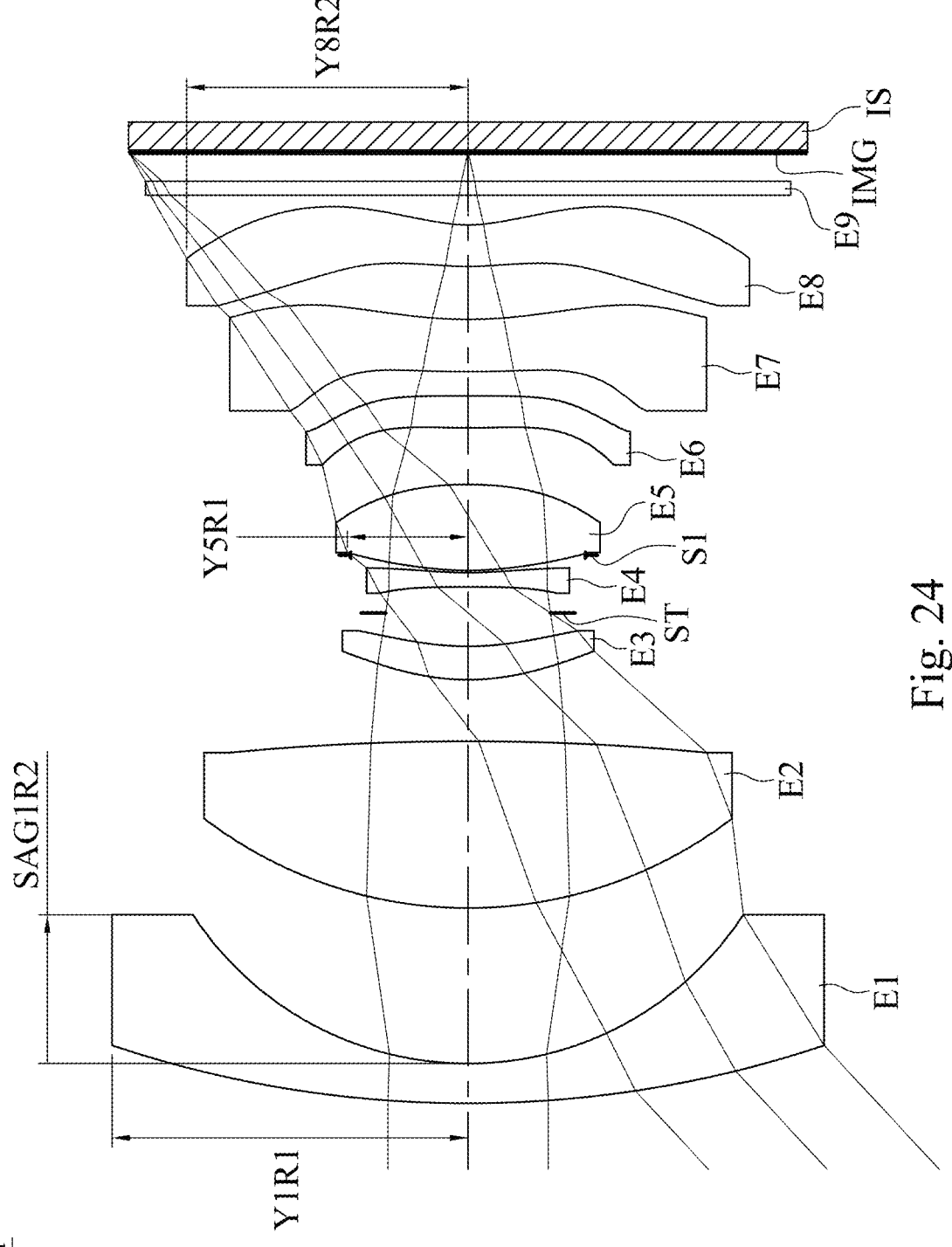
FIG. 24 is a schematic view of partial parameters according to the 1st embodiment of the present disclosure.

FIG. 24 is a schematic view of partial parameters according to the 1st embodiment of the present disclosure. In the image capturing system lens assembly according to the 1st embodiment, when maximum effective radius of the object-side surface of the first lens element is Y1R1 (as shown in FIG. 24), a maximum effective radius of the object-side surface of the fifth lens element is Y5R1 (as shown in FIG. 24), a maximum effective radius of the image-side surface of the eighth lens element is Y8R2 (as shown in FIG. 24), and a maximum image height of the image capturing system lens assembly is ImgH, the following conditions are satisfied: Y1R1/Y8R2=1.27; and Y5R1/ImgH=0.36.

In the image capturing system lens assembly according to the 1st embodiment, when a displacement in parallel with an optical axis from an axial vertex on the image-side surface of the first lens element E1 to a maximum effective radius position on the image-side surface of the first lens element E1 is SAG1R2 (as shown in FIG. 24), and the central thickness of the first lens element E1 is CT1, the following condition is satisfied: SAG1R2/CT1=3.75.

The detailed optical data of the 1st embodiment are shown in Table 1A and the aspheric surface data are shown in Table 1B below.

TABLE 1A

1st Embodiment
f = 5.39 mm, Fno = 2.23, HFOV = 42.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.9433 | SPH | 0.600 | Glass | 1.806 | 41.0 | −8.90 |
| 2 | | 4.9599 | SPH | 2.349 | | | | |
| 3 | Lens 2 | 6.5392 | SPH | 2.519 | Glass | 1.802 | 44.3 | 7.13 |
| 4 | | −37.6142 | SPH | 0.929 | | | | |
| 5 | Lens 3 | 3.6250 | ASP | 0.504 | Plastic | 1.544 | 56.0 | 30.15 |
| 6 | | 4.4253 | ASP | 0.505 | | | | |
| 7 | Ape. Stop | Plano | | 0.392 | | | | |
| 8 | Lens 4 | −58.8235 | ASP | 0.215 | Plastic | 1.669 | 19.5 | −6.93 |
| 9 | | 5.0432 | ASP | 0.263 | | | | |
| 10 | Stop | Plano | | −0.233 | | | | |
| 11 | Lens 5 | 3.8420 | ASP | 1.301 | Plastic | 1.544 | 56.0 | 4.33 |
| 12 | | −5.3764 | ASP | 0.858 | | | | |
| 13 | Lens 6 | 20.0238 | ASP | 0.480 | Plastic | 1.639 | 23.5 | 27.25 |
| 14 | | −131.5777 | ASP | 0.366 | | | | |
| 15 | Lens 7 | 17.2220 | ASP | 0.790 | Plastic | 1.566 | 37.4 | −18.71 |
| 16 | | 6.4490 | ASP | 0.797 | | | | |
| 17 | Lens 8 | 4.4695 | ASP | 0.629 | Plastic | 1.614 | 25.6 | −9.26 |
| 18 | | 2.3685 | ASP | 0.450 | | | | |
| 19 | Filter | Plano | | 0.210 | Glass | 1.517 | 64.2 | — |
| 20 | | Plano | | 0.439 | | | | |
| 21 | Image | Plano | | — | | | | |

Reference wavelength is 587.6 nm (d-line).
Effective radius of Surface 10 (stop S1) is 1.77 mm.

TABLE 1B

Aspheric Coefficients

| Surface # | 5 | 6 | 8 | 9 |
|---|---|---|---|---|
| k= | 0.0000000E+00 | 0.0000000E+00 | 0.0000000E+00 | 3.5178200E+00 |
| A4= | −6.1160191E−03 | −8.6857155E−03 | −3.5749008E−02 | −1.0371081E−01 |
| A6= | −7.1944236E−04 | −1.9164832E−03 | 1.8783507E−02 | 1.1195731E−01 |
| A8= | −1.5738498E−04 | 2.7216241E−04 | −1.9342293E−02 | −1.0650722E−01 |
| A10= | 6.7742165E−05 | 1.9967322E−05 | 1.5567317E−02 | 7.1162899E−02 |
| A12= | −2.6728641E−06 | | −1.0022950E−02 | −3.2073249E−02 |
| A14= | | | 4.6916125E−03 | 9.3108816E−03 |

TABLE 1B-continued

| Aspheric Coefficients | | | |
|---|---|---|---|
| A16= | | | −1.3242262E−03 | −1.5758824E−03 |
| A18= | | | 1.6220838E−04 | 1.1798911E−04 |

| Surface # | 11 | 12 | 13 | 14 |
|---|---|---|---|---|
| k= | −3.6478400E+01 | −1.0000000E+00 | 0.0000000E+00 | 0.0000000E+00 |
| A4= | −1.3423878E−02 | −1.8090242E−02 | −2.2435841E−02 | −5.4763690E−03 |
| A6= | 3.7939077E−02 | 1.8916323E−03 | −7.9189425E−03 | −1.4935913E−02 |
| A8= | −3.8523241E−02 | −8.6943956E−04 | 3.7667854E−03 | 6.9786390E−03 |
| A10= | 2.3866461 E−02 | 5.6154708E−04 | −1.8888109E−03 | −3.0704498E−03 |
| A12= | −9.3538676E−03 | −1.9286288E−04 | 8.7814724E−04 | 1.2593214E−03 |
| A14= | 2.2589503E−03 | 2.9607678E−05 | −2.3776301E−04 | −3.3581265E−04 |
| A16= | −3.0628265E−04 | −1.3428219E−06 | 3.1714584E−05 | 5.1247139E−05 |
| A18= | 1.7836267E−05 | | −1.6193043E−06 | −4.0554413E−06 |
| A20= | | | | 1.2869912E−07 |

| Surface # | 15 | 16 | 17 | 18 |
|---|---|---|---|---|
| k= | 0.0000000E+00 | 0.0000000E+00 | 0.0000000E+00 | −1.0000000E+00 |
| A4= | −1.1528032E−03 | −1.4606913E−02 | −8.0387650E−02 | −8.5185709E−02 |
| A6= | −5.6129903E−03 | 1.0228693E−02 | 2.4806651E−02 | 2.8896439E−02 |
| A8= | 4.0763443E−04 | −6.2631647E−03 | −6.2834724E−03 | −8.3249112E−03 |
| A10= | −3.6543141E−04 | 2.1774085E−03 | 1.2384605E−03 | 1.8331684E−03 |
| A12= | 3.0998250E−04 | −4.8303683E−04 | −1.8885420E−04 | −3.0178350E−04 |
| A14= | −8.5771394E−05 | 7.2343968E−05 | 2.3506968E−05 | 3.6715162E−05 |
| A16= | 8.1553433E−06 | −7.4478819E−06 | −2.4467833E−06 | −3.2620551E−06 |
| A18= | 4.3131898E−07 | 5.2076485E−07 | 2.0150791E−07 | 2.0805454E−07 |
| A20= | −1.4327414E−07 | −2.3620184E−08 | −1.1977754E−08 | −9.2507484E−09 |
| A22= | 9.9737170E−09 | 6.2594376E−10 | 4.6774142E−10 | 2.7178775E−10 |
| A24= | −2.2641765E−10 | −7.3455745E−12 | −1.0601243E−11 | −4.7372026E−12 |
| A26= | | | 1.0519680E−13 | 3.7064870E−14 |

In Table 1A, the curvature radius, the thickness and the focal length are shown in millimeters (mm). Surface numbers 0-21 represent the surfaces sequentially arranged from the object side to the image side along the optical axis. In Table 1B, k represents the conic coefficient of the equation of the aspheric surface profiles. A4-A26 represent the aspheric coefficients ranging from the 4th order to the 30th order. The tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

2nd Embodiment

Figure 3:
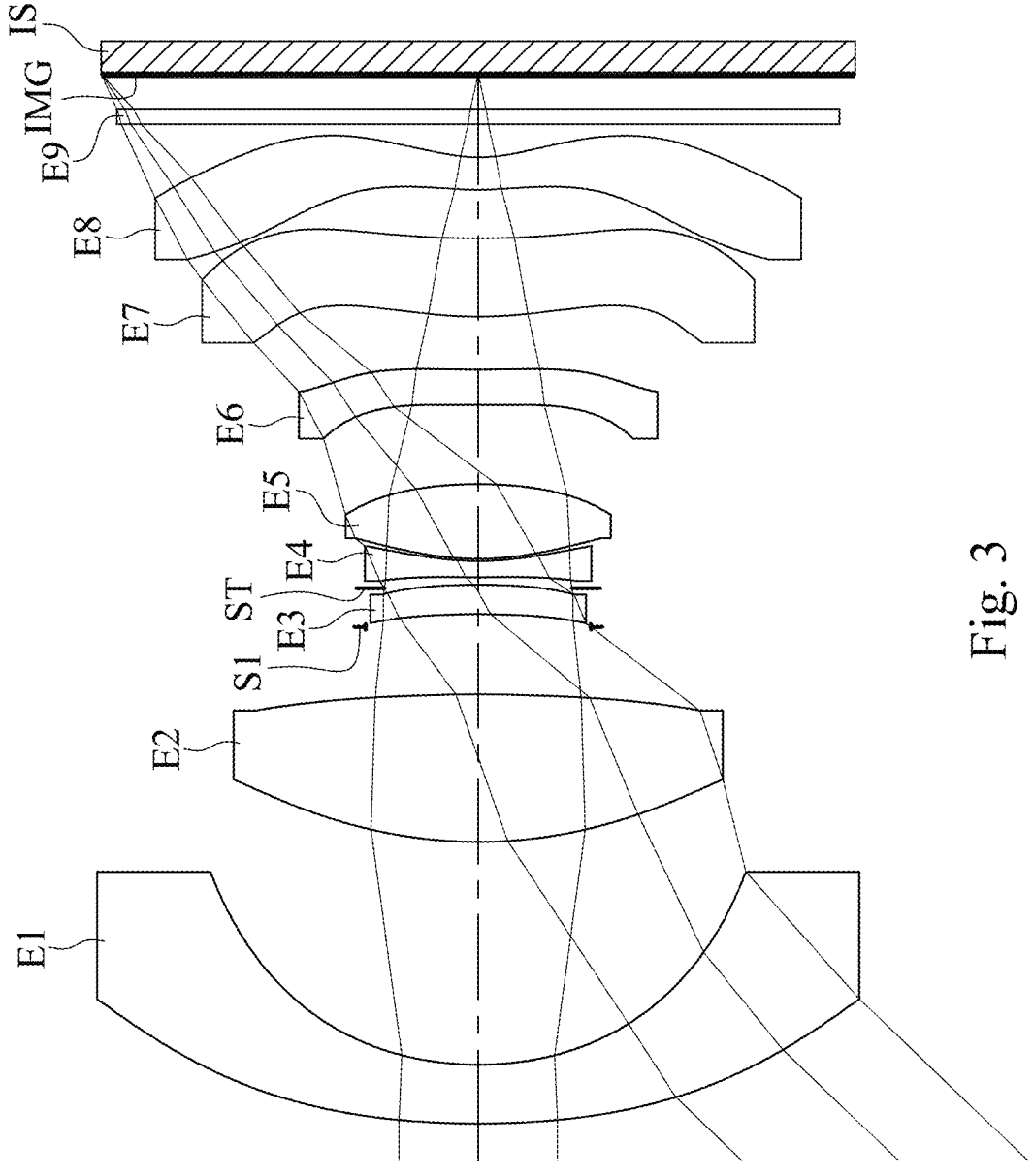
FIG. 3 is a schematic view of an imaging apparatus according to the 2nd embodiment of the present disclosure.
Figure 4:
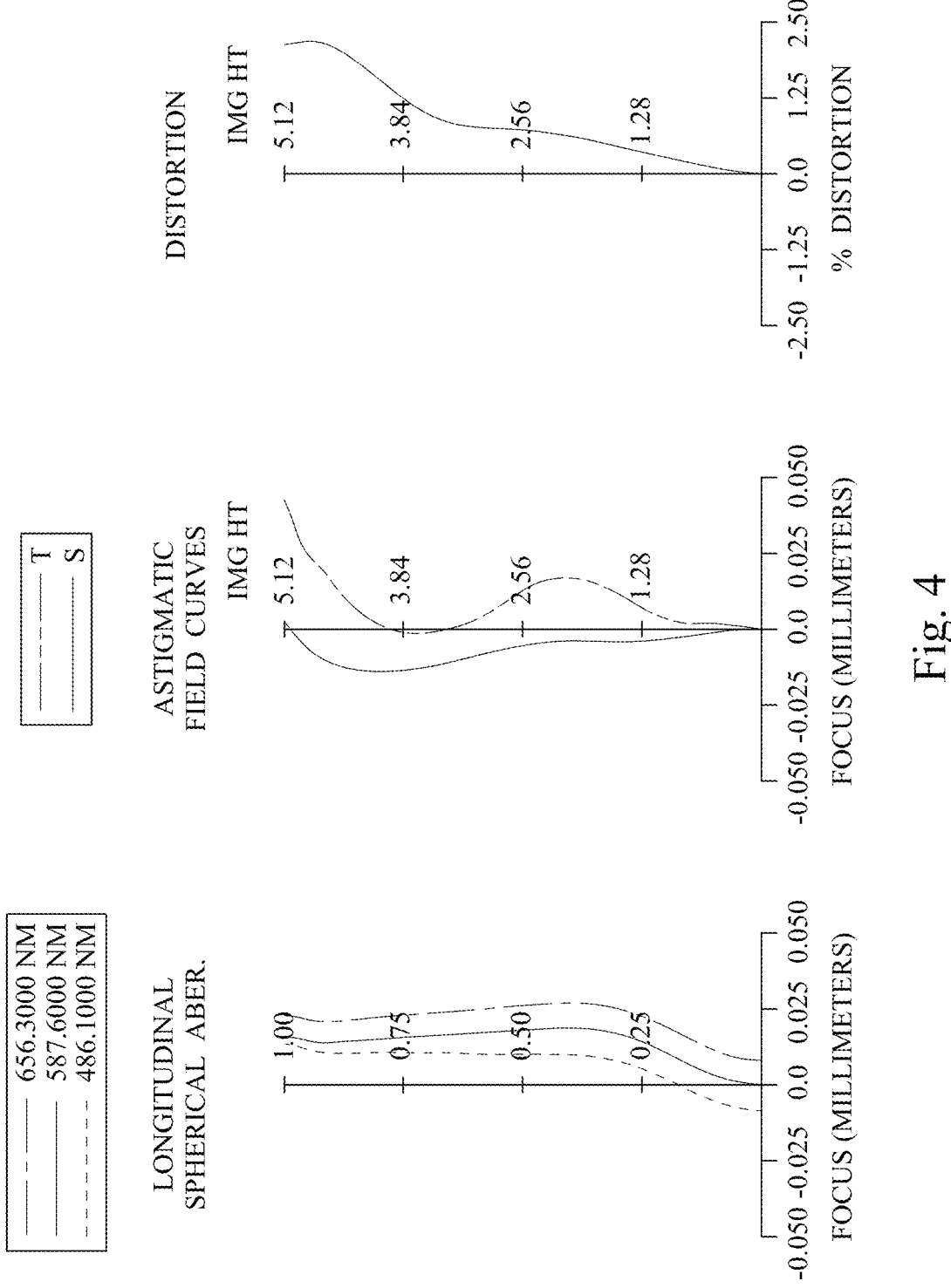
FIG. 4 shows spherical aberration curves, astigmatic field curves and a distortion curve of the imaging apparatus according to the 2nd embodiment.

FIG. 3 is a schematic view of an imaging apparatus 2 according to the 2nd embodiment of the present disclosure. FIG. 4 shows spherical aberration curves, astigmatic field curves and a distortion curve of the imaging apparatus 2 according to the 2nd embodiment. In FIG. 3, the imaging apparatus 2 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both aspheric. Furthermore, the object-side surface of the second lens element E2 includes one inflection point.

The third lens element E3 with positive refractive power has an object-side surface being concave in a paraxial region thereof and an image-side surface being convex in a paraxial region thereof. The third lens element E3 is made of a plastic material, and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point and one critical point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes one inflection point and one critical point, and the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes two inflection points and one critical point, and the image-side surface of the seventh lens element E7 includes two inflection points and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes two inflection points and one critical point, and the image-side surface of the eighth lens element E8 includes one inflection point and one critical point.

The filter E9 is made of a glass material, which is located between the eighth lens element E8 and the image surface IMG in order, and will not affect the focal length of the image capturing system lens assembly.

The detailed optical data of the 2nd embodiment are shown in Table 2A and the aspheric surface data are shown in Table 2B below.

TABLE 2A

| 2nd Embodiment f = 4.80 mm, Fno = 2.23, HFOV = 46.2 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 12.3363 | ASP | 0.800 | Glass | 1.804 | 46.6 | −8.56 |
| 2 | | 4.2912 | ASP | 3.031 | | | | |
| 3 | Lens 2 | 6.3162 | ASP | 2.007 | Glass | 1.821 | 42.7 | 6.13 |
| 4 | | −21.2648 | ASP | 0.915 | | | | |
| 5 | Stop | Plano | | 0.176 | | | | |
| 6 | Lens 3 | −11.1111 | ASP | 0.400 | Plastic | 1.544 | 56.0 | 110.14 |
| 7 | | −9.4920 | ASP | −0.048 | | | | |
| 8 | Ape. Stop | Plano | | 0.150 | | | | |
| 9 | Lens 4 | 25.3824 | ASP | 0.219 | Plastic | 1.639 | 23.5 | −6.58 |
| 10 | | 3.5947 | ASP | 0.030 | | | | |
| 11 | Lens 5 | 3.7280 | ASP | 1.019 | Plastic | 1.544 | 56.0 | 4.28 |
| 12 | | −5.6089 | ASP | 1.075 | | | | |
| 13 | Lens 6 | 38.7865 | ASP | 0.480 | Plastic | 1.639 | 23.5 | −41.90 |
| 14 | | 15.7585 | ASP | 0.721 | | | | |
| 15 | Lens 7 | 5.8644 | ASP | 1.066 | Plastic | 1.544 | 56.0 | 16.74 |
| 16 | | 15.4121 | ASP | 0.659 | | | | |
| 17 | Lens 8 | 4.7877 | ASP | 0.442 | Plastic | 1.587 | 28.3 | −7.12 |
| 18 | | 2.1549 | ASP | 0.450 | | | | |
| 19 | Filter | Plano | | 0.210 | Glass | 1.517 | 64.2 | — |
| 20 | | Plano | | 0.464 | | | | |
| 21 | Image | Plano | | — | | | | |

Reference wavelength is 587.6 nm (d-line).
Effective radius of Surface 5 (stop S1) is 1.53 mm.

TABLE 2B

| Aspheric Coefficients | | | | |
|---|---|---|---|---|
| Surface # | 1 | 2 | 3 | 4 |
| k= | 0.0000000E+00 | 0.0000000E+00 | 0.0000000E+00 | 0.0000000E+00 |
| A4= | 1.5919563E−03 | 2.1824154E−03 | −5.6899662E−04 | 1.2285960E−03 |
| A6= | −6.8603910E−05 | 3.6872442E−05 | 1.9869735E−05 | −1.9663624E−04 |
| A8= | 3.3265496E−06 | −4.5254305E−06 | −9.4722050E−07 | 7.4793381E−06 |
| A10= | −1.0089690E−07 | 1.0797228E−06 | −2.3846139E−07 | −1.5862432E−07 |
| A12= | 1.1139482E−09 | −2.9419832E−08 | | |
| Surface # | 6 | 7 | 9 | 10 |
| k= | 0.0000000E+00 | 0.0000000E+00 | 0.0000000E+00 | 2.4636600E+00 |
| A4= | 5.2522394E−03 | −7.1231178E−03 | −5.2477343E−02 | −7.4274784E−02 |
| A6= | −7.5830998E−03 | −1.2915802E−02 | 4.3297934E−02 | 7.7387199E−02 |

TABLE 2B-continued

| Aspheric Coefficients | | | |
|---|---|---|---|
| A8= | 2.6183087E−04 | 6.6934004E−03 | −5.4273130E−02 | −9.0452859E−02 |
| A10= | 6.6977232E−04 | −1.1749103E−03 | 5.5241558E−02 | 6.9687479E−02 |
| A12= | −1.4765327E−04 | | −3.7661334E−02 | −3.2907708E−02 |
| A14= | | | 1.6609076E−02 | 8.8325075E−03 |
| A16= | | | −4.3933064E−03 | −1.1776110E−03 |
| A18= | | | 5.2675795E−04 | 5.1402255E−05 |

| Surface # | 11 | 12 | 13 | 14 |
|---|---|---|---|---|
| k= | −1.5476900E+01 | −1.0000000E+00 | 0.0000000E+00 | 0.0000000E+00 |
| A4= | 3.9100440E−03 | −8.6509120E−03 | −3.0154155E−02 | −3.2623376E−02 |
| A6= | 2.4816845E−02 | −1.2200490E−03 | 5.5494747E−03 | 7.6004543E−03 |
| A8= | −4.5569529E−02 | 1.3372237E−03 | −3.2667755E−03 | −3.0081469E−03 |
| A10= | 3.9129502E−02 | −1.5022642E−03 | 1.3390057E−03 | 1.0503541 E−03 |
| A12= | −1.9040759E−02 | 7.4543145E−04 | −4.2590105E−04 | −2.6747641E−04 |
| A14= | 5.3089190E−03 | −1.8491158E−04 | 9.0166453E−05 | 4.8285455E−05 |
| A16= | −7.8409961E−04 | 1.8315635E−05 | −1.0545875E−05 | −5.4260457E−06 |
| A18= | 4.6923679E−05 | | 4.9688973E−07 | 3.4062942E−07 |
| A20= | | | | −9.6850230E−09 |

| Surface # | 15 | 16 | 17 | 18 |
|---|---|---|---|---|
| k= | 0.0000000E+00 | 0.0000000E+00 | 0.0000000E+00 | −1.0000000E+00 |
| A4= | −1.0261120E−02 | 7.7401750E−03 | −7.5114003E−02 | −8.9077690E−02 |
| A6= | −1.1381319E−03 | −4.1801098E−03 | 1.8604743E−02 | 2.7250390E−02 |
| A8= | 3.6710314E−04 | 1.2916138E−03 | −3.9487394E−03 | −7.2943541E−03 |
| A10= | −1.9506826E−04 | −4.3267024E−04 | 8.1065698E−04 | 1.5484279E−03 |
| A12= | 7.8103411E−05 | 1.1100249E−04 | −1.7068391E−04 | −2.5210750E−04 |
| A14= | −2.1039362E−05 | −1.9597567E−05 | 3.0954290E−05 | 3.0624867E−05 |
| A16= | 3.8465423E−06 | 2.3476613E−06 | −4.0774997E−06 | −2.7111848E−06 |
| A18= | −4.7151650E−07 | −1.8769559E−07 | 3.6547777E−07 | 1.7111086E−07 |
| A20= | 3.6455617E−08 | 9.5732382E−09 | −2.1649411E−08 | −7.4696610E−09 |
| A22= | −1.5647464E−09 | −2.8106916E−10 | 8.1202170E−10 | 2.1389020E−10 |
| A24= | 2.7727081E−11 | 3.6072554E−12 | −1.7501305E−11 | −3.6098156E−12 |
| A26= | | | 1.6543148E−13 | 2.7191718E−14 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions in Table 2C:

TABLE 2C

| 2nd Embodiment | | | |
|---|---|---|---|
| f [mm] | 4.80 | (R3 − R4)/(R3 + R4) | −1.85 |
| Fno | 2.23 | R10/R13 | −0.96 |
| HFOV [deg.] | 46.2 | Dr1r4/Dr11r16 | 1.73 |
| FOV [deg.] | 92.4 | CT4/CT5 | 0.21 |
| TL/ImgH | 2.79 | CT5/CT3 | 2.55 |
| SD/TD | 0.45 | CT5/T78 | 1.55 |
| T12/f | 0.63 | T56/CT5 | 1.05 |
| T12/BL | 2.70 | N2 | 1.821 |
| \|f2/f1\| | 0.72 | V8 | 28.3 |
| \|f5/f3\| | 0.04 | V3/V4 | 2.4 |
| \|f/R10\| | 0.86 | V3/V6 | 2.4 |
| \|f/R9\| + \|f/R10\| | 2.14 | Y1R1/Y8R2 | 1.18 |
| (\|F/f3\| + \|f/f6\|)/ | 0.09 | Y5R1/ImgH | 0.33 |
| (\|F/f4\| + \|f/f5\|) | | | |
| (R1 − R9)/(R1 + R9) | 0.54 | SAG1R2/CT1 | 3.28 |
| (R1 − R16)/(R1 + R16) | 0.70 | | |

3rd Embodiment

Figure 5:
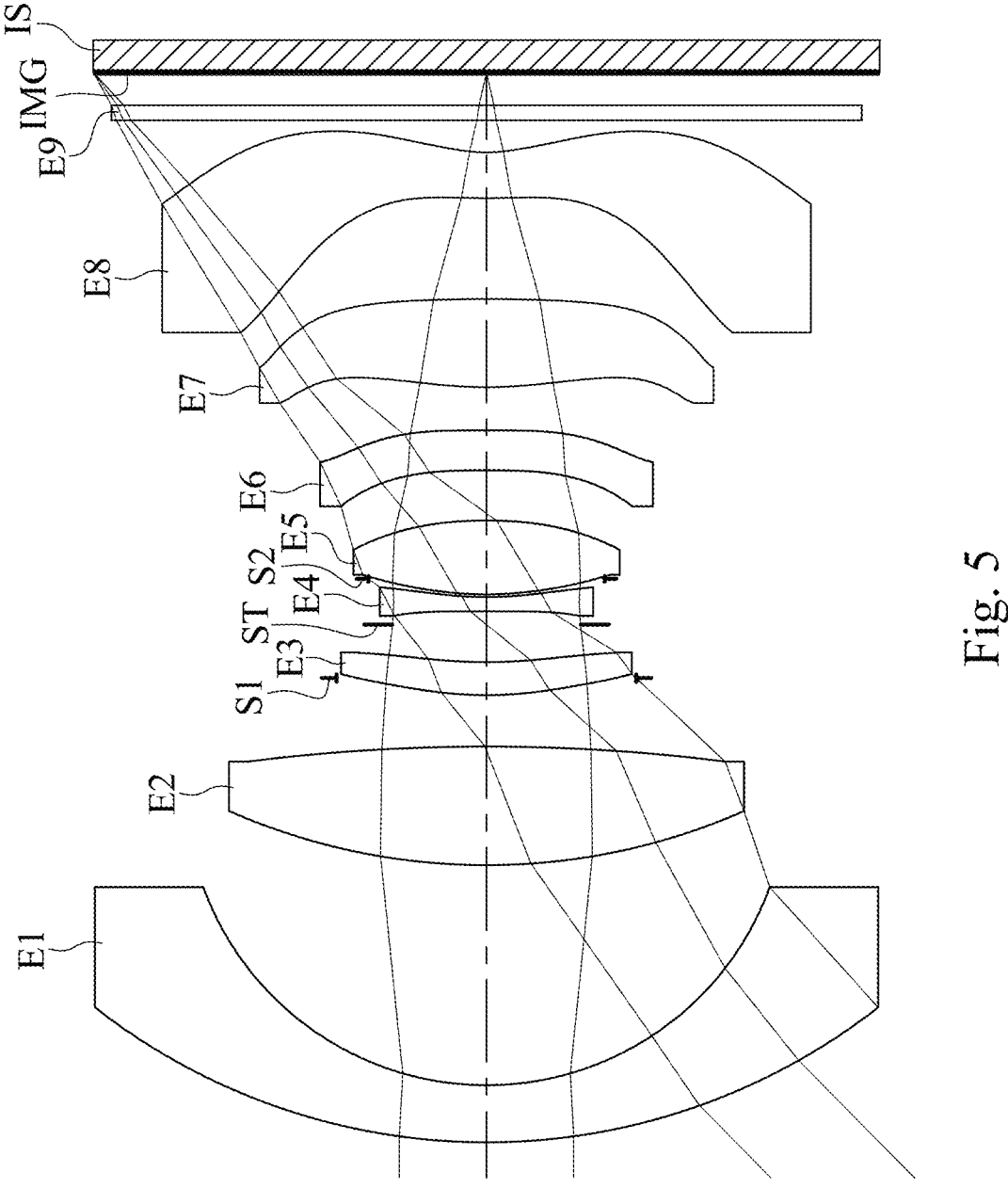
FIG. 5 is a schematic view of an imaging apparatus according to the 3rd embodiment of the present disclosure.

FIG. 5 is a schematic view of an imaging apparatus 3 according to the 3rd embodiment of the present disclosure.

Figure 6:
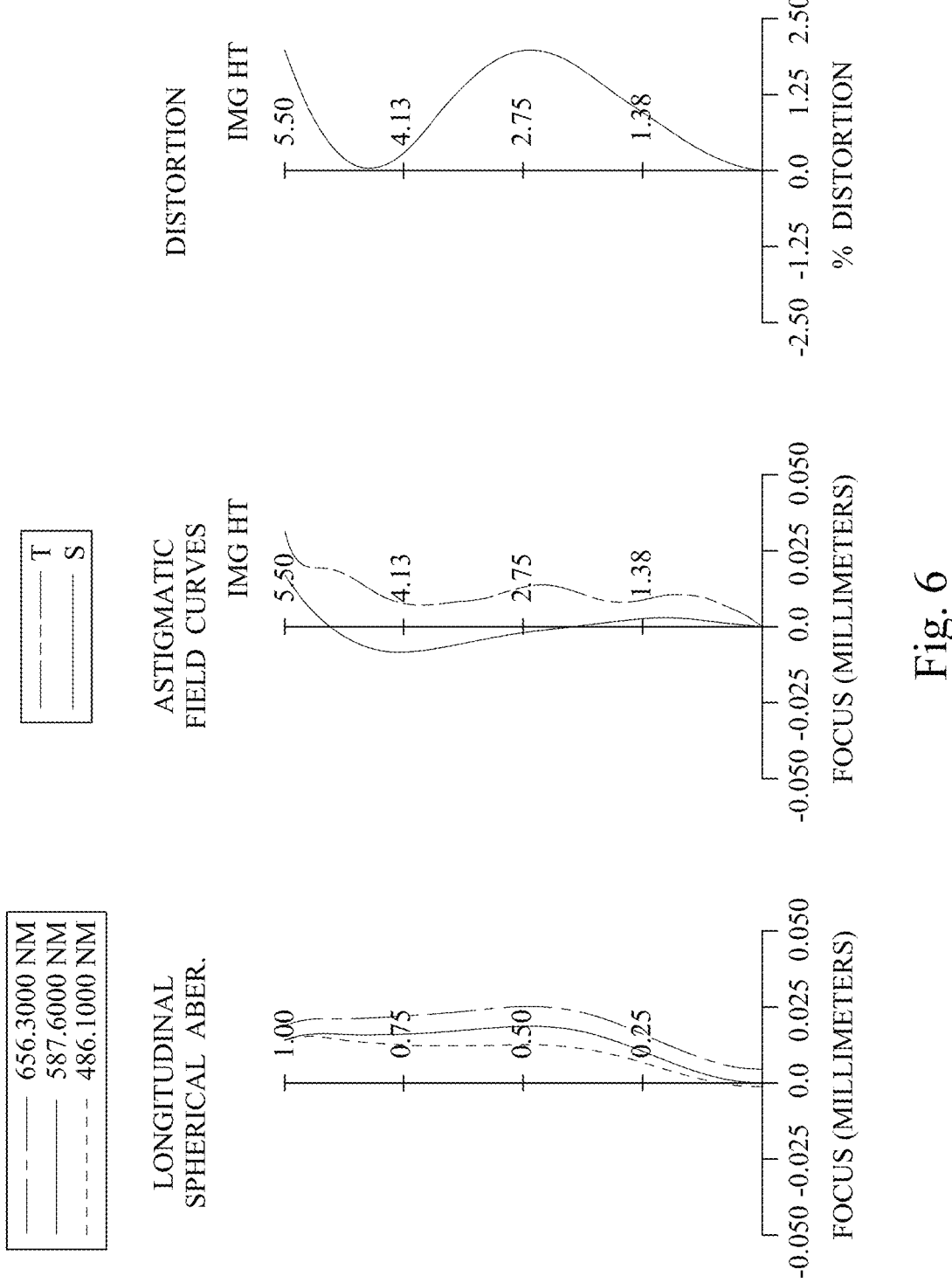
FIG. 6 shows spherical aberration curves, astigmatic field curves and a distortion curve of the imaging apparatus according to the 3rd embodiment.

FIG. 6 shows spherical aberration curves, astigmatic field curves and a distortion curve of the imaging apparatus 3 according to the 3rd embodiment. In FIG. 5, the imaging apparatus 3 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both spherical.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the image-side surface of the third lens element E3 includes two inflection points.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point and one critical point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric.

The sixth lens element E6 with negative refractive power has an object-side surface being concave in a paraxial region thereof and an image-side surface being concave in a paraxial region thereof. The sixth lens element E6 is made of a plastic material, and has the object-side surface and the image-side surface being both aspheric. Furthermore, the image-side surface of the sixth lens element E6 includes two inflection points and one critical point.

The seventh lens element E7 with positive refractive power has an object-side surface being convex in a paraxial region thereof and an image-side surface being convex in a paraxial region thereof. The seventh lens element E7 is made of a plastic material, and has the object-side surface and the image-side surface being both aspheric. Furthermore, the object-side surface of the seventh lens element E7 includes two inflection points and one critical point, and the image-side surface of the seventh lens element E7 includes one inflection point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes two inflection points and one critical point, and the image-side surface of the eighth lens element E8 includes two inflection points and one critical point.

The filter E9 is made of a glass material, which is located between the eighth lens element E8 and the image surface IMG in order, and will not affect the focal length of the image capturing system lens assembly.

The detailed optical data of the 3rd embodiment are shown in Table 3A and the aspheric surface data are shown in Table 3B below.

TABLE 3A

| 3rd Embodiment f = 5.45 mm, Fno = 2.23, HFOV = 44.7 deg. | | | | | | | |
|---|---|---|---|---|---|---|---|
| Surface # | | Curvature Radius | | Thickness | Material | Index | Abbe # | Focal Length |

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.8948 | SPH | 0.800 | Glass | 1.665 | 54.7 | −12.97 |
| 2 | | 4.2199 | SPH | 3.082 | | | | |
| 3 | Lens 2 | 8.9397 | SPH | 1.662 | Glass | 1.720 | 50.4 | 9.48 |
| 4 | | −26.5653 | SPH | 0.960 | | | | |
| 5 | Stop | Plano | | −0.240 | | | | |
| 6 | Lens 3 | 5.2360 | ASP | 0.462 | Plastic | 1.544 | 56.0 | 41.95 |
| 7 | | 6.5838 | ASP | 0.526 | | | | |
| 8 | Ape. Stop | Plano | | 0.186 | | | | |
| 9 | Lens 4 | 113.3765 | ASP | 0.200 | Plastic | 1.614 | 25.6 | −7.52 |
| 10 | | 4.4346 | ASP | 0.255 | | | | |
| 11 | Stop | Plano | | −0.218 | | | | |
| 12 | Lens 5 | 4.4583 | ASP | 1.036 | Plastic | 1.544 | 56.0 | 4.84 |
| 13 | | −5.9061 | ASP | 0.703 | | | | |
| 14 | Lens 6 | −19.2308 | ASP | 0.558 | Plastic | 1.587 | 28.3 | −31.33 |
| 15 | | 429.9565 | ASP | 0.606 | | | | |
| 16 | Lens 7 | 5.9522 | ASP | 1.234 | Plastic | 1.544 | 56.0 | 8.93 |
| 17 | | −24.5689 | ASP | 1.414 | | | | |
| 18 | Lens 8 | 9.5152 | ASP | 0.641 | Plastic | 1.587 | 28.3 | −5.59 |
| 19 | | 2.3808 | ASP | 0.450 | | | | |
| 20 | Filter | Plano | | 0.210 | Glass | 1.517 | 64.2 | — |
| 21 | | Plano | | 0.459 | | | | |
| 22 | Image | Plano | | — | | | | |

Reference wavelength is 587.6 nm (d-line).
Effective radius of Surface 5 (stop S1) is 2.10 mm.
Effective radius of Surface 11 (stop S2) is 1.65 mm.

TABLE 3B

| Aspheric Coefficients | | | | |
|---|---|---|---|---|
| Surface # | 6 | 7 | 9 | 10 |
| k = | 0.0000000E+00 | 0.0000000E+00 | 0.0000000E+00 | 3.3588400E+00 |
| A4 = | −7.9512889E−03 | −1.1552963E−02 | −3.7569587E−02 | −7.7698808E−02 |
| A6 = | −9.2392284E−04 | −1.8064476E−03 | 3.3407025E−02 | 1.0118293E−01 |

TABLE 3B-continued

| A8 = | 2.7388863E−04 | 8.0791628E−04 | −4.1490160E−02 | −1.1840109E−01 |
| A10 = | 1.2740681E−05 | −6.7050518E−05 | 2.9419690E−02 | 8.7592250E−02 |
| A12 = | −1.5394164E−06 | | −1.0963327E−02 | −4.0639276E−02 |
| A14 = | | | 1.3251688E−03 | 1.1351005E−02 |
| A16 = | | | 3.3597213E−04 | −1.7355675E−03 |
| A18 = | | | −8.8608658E−05 | 1.1047513E−04 |

Aspheric Coefficients

| Surface # | 12 | 13 | 14 | 15 |
|---|---|---|---|---|
| k = | −2.0727200E+01 | −1.0000000E+00 | 0.0000000E+00 | 0.0000000E+00 |
| A4 = | −2.0195594E−02 | −1.6110673E−02 | −4.0051596E−02 | −4.3182937E−02 |
| A6 = | 6.1220453E−02 | 2.7463106E−03 | 1.1865053E−02 | 1.1683353E−02 |
| A8 = | −7.2245315E−02 | −1.0887513E−04 | −6.8190650E−03 | −4.0019737E−03 |
| A10 = | 5.1543056E−02 | −3.4129875E−04 | 3.9727489E−03 | 1.2766292E−03 |
| A12 = | −2.2843340E−02 | 2.0993522E−04 | −1.5728842E−03 | −2.2634890E−04 |
| A14 = | 6.1430434E−03 | −4.2897222E−05 | 3.6544119E−04 | −5.9305878E−07 |
| A16 = | −9.1883007E−04 | 2.0136697E−06 | −4.4319138E−05 | 7.9500017E−06 |
| A18 = | 5.8580528E−05 | | 2.0896083E−06 | −1.2180770E−06 |
| A20 = | | | | 5.7443397E−08 |

Aspheric Coefficients

| Surface # | 16 | 17 | 18 | 19 |
|---|---|---|---|---|
| k = | 0.0000000E+00 | 0.0000000E+00 | 0.0000000E+00 | −1.0000000E+00 |
| A4 = | −1.7376368E−02 | −1.3406676E−03 | −7.0480215E−02 | −7.5445915E−02 |
| A6 = | 3.8129456E−03 | −2.4252243E−04 | 1.4487039E−02 | 2.1527187E−02 |
| A8 = | −2.5856912E−03 | 1.3710136E−04 | −2.0982539E−03 | −5.1108110E−03 |
| A10 = | 1.2866582E−03 | −3.5901183E−04 | 1.7096657E−04 | 9.3087217E−04 |
| A12 = | −4.3232101E−04 | 1.9717430E−04 | −5.5810061E−05 | −1.2875658E−04 |
| A14 = | 9.6345736E−05 | −5.7294748E−05 | 3.0524955E−05 | 1.3415759E−05 |
| A16 = | −1.4126272E−05 | 1.0200357E−05 | −8.1548136E−06 | −1.0397957E−06 |
| A18 = | 1.3036975E−06 | −1.1525145E−06 | 1.2210308E−06 | 5.8712882E−08 |
| A20 = | −6.9418836E−08 | 8.0675202E−08 | −1.0994970E−07 | −2.3339889E−09 |
| A22 = | 1.8169557E−09 | −3.1856661E−09 | 5.9406963E−09 | 6.1626041E−11 |
| A24 = | −1.5846890E−11 | 5.4224974E−11 | −1.7813687E−10 | −9.6693866E−13 |
| A26 = | | | 2.2868606E−12 | 6.8074132E−15 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions in Table 3C:

TABLE 3C

| 3rd Embodiment | | | |
|---|---|---|---|
| f [mm] | 5.45 | (R3 − R4)/(R3 + R4) | −2.01 |
| Fno | 2.23 | R10/R13 | −0.99 |
| HFOV [deg.] | 44.7 | Dr1r4/Dr11r16 | 1.25 |
| FOV [deg.] | 89.4 | CT4/CT5 | 0.19 |
| TL/ImgH | 2.72 | CT5/CT3 | 2.24 |
| SD/TD | 0.48 | CT5/T78 | 0.73 |
| T12/f | 0.57 | T56/CT5 | 0.68 |
| T12/BL | 2.75 | N2 | 1.720 |
| \|f2/f1\| | 0.73 | V8 | 28.3 |
| \|f5/f3\| | 0.12 | V3/V4 | 2.2 |
| \|f/R10\| | 0.92 | V3/V6 | 2.0 |
| \|f/R9\| + \|f/R10\| | 2.14 | Y1R1/Y8R2 | 1.21 |
| (\|F/f3\| + \|f/f6\|)/ (\|F/f4\| + \|f/f5\|) | 0.16 | Y5R1/ImgH | 0.31 |
| (R1 − R9)/(R1 + R9) | 0.33 | SAG1R2/CT1 | 3.47 |
| (R1 − R16)/(R1 + R16) | 0.58 | | |

4th Embodiment

Figure 7:
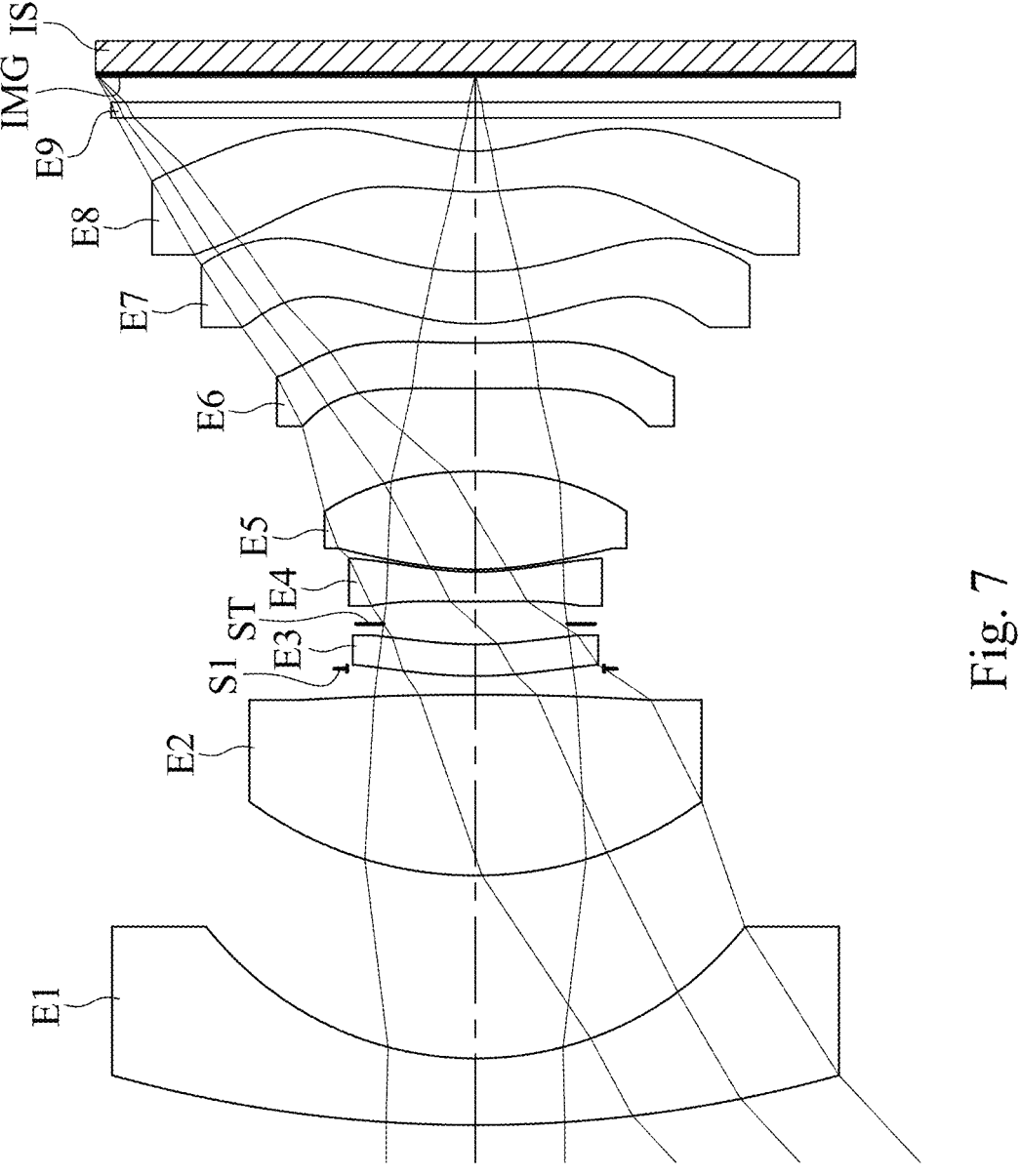
FIG. 7 is a schematic view of an imaging apparatus according to the 4th embodiment of the present disclosure.
Figure 8:
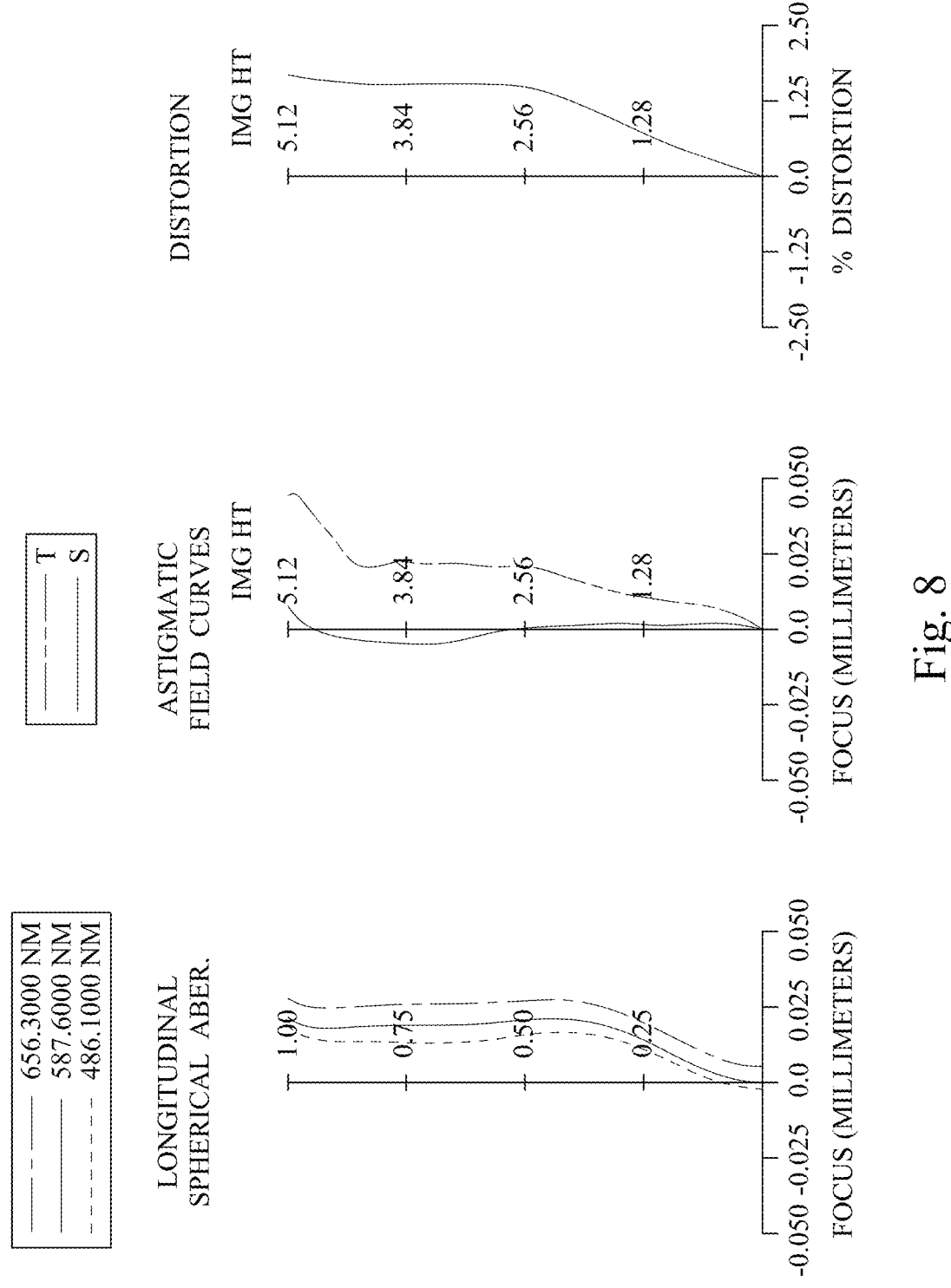
FIG. 8 shows spherical aberration curves, astigmatic field curves and a distortion curve of the imaging apparatus according to the 4th embodiment.

FIG. 7 is a schematic view of an imaging apparatus 4 according to the 4th embodiment of the present disclosure. FIG. 8 shows spherical aberration curves, astigmatic field curves and a distortion curve of the imaging apparatus 4 according to the 4th embodiment. In FIG. 7, the imaging apparatus 4 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both spherical.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point and one critical point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the image-side surface of the fifth lens element E5 includes one inflection point.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes one inflection point and one critical point, and the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes two inflection points and one critical point, and the image-side surface of the seventh lens element E7 includes one inflection point and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes three inflection points and one critical point, and the image-side surface of the eighth lens element E8 includes three inflection points and one critical point.

The filter E9 is made of a glass material, which is located between the eighth lens element E8 and the image surface IMG in order, and will not affect the focal length of the image capturing system lens assembly.

The detailed optical data of the 4th embodiment are shown in Table 4A and the aspheric surface data are shown in Table 4B below.

TABLE 4A

4th Embodiment
f = 5.38 mm, Fno = 2.23, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 18.2318 | SPH | 0.900 | Glass | 1.603 | 60.6 | −10.46 |
| 2 | | 4.6007 | SPH | 2.471 | | | | |
| 3 | Lens 2 | 5.1606 | SPH | 2.445 | Glass | 1.729 | 54.7 | 6.39 |
| 4 | | −38.4639 | SPH | 0.352 | | | | |
| 5 | Stop | Plano | | −0.100 | | | | |
| 6 | Lens 3 | 6.0067 | ASP | 0.428 | Plastic | 1.544 | 56.0 | −179.74 |
| 7 | | 5.5170 | ASP | 0.273 | | | | |
| 8 | Ape. Stop | Plano | | 0.306 | | | | |
| 9 | Lens 4 | 29.4699 | ASP | 0.400 | Plastic | 1.639 | 23.5 | −7.08 |
| 10 | | 3.8969 | ASP | 0.033 | | | | |
| 11 | Lens 5 | 4.2819 | ASP | 1.326 | Plastic | 1.544 | 56.0 | 4.56 |
| 12 | | −5.2570 | ASP | 1.118 | | | | |
| 13 | Lens 6 | 40.5669 | ASP | 0.616 | Plastic | 1.639 | 23.5 | −33.95 |
| 14 | | 14.0450 | ASP | 0.260 | | | | |
| 15 | Lens 7 | 3.2936 | ASP | 0.704 | Plastic | 1.566 | 37.4 | 17.66 |
| 16 | | 4.5323 | ASP | 1.078 | | | | |
| 17 | Lens 8 | 4.0072 | ASP | 0.550 | Plastic | 1.639 | 23.5 | −8.82 |
| 18 | | 2.2163 | ASP | 0.450 | | | | |
| 19 | Filter | Plano | | 0.210 | Glass | 1.517 | 64.2 | — |
| 20 | | Plano | | 0.373 | | | | |
| 21 | Image | Plano | | — | | | | |

Reference wavelength is 587.6 nm (d-line).
Effective radius of Surface 5 (stop S1) is 1.73 mm.

TABLE 4B

Aspheric Coefficients

| Surface # | 6 | 7 | 9 | 10 |
|---|---|---|---|---|
| k = | 0.0000000E+00 | 0.0000000E+00 | 0.0000000E+00 | 2.5295300E+00 |
| A4 = | −1.0669759E−02 | −1.3427907E−02 | −3.0946090E−02 | −5.3201855E−02 |
| A6 = | 8.0357415E−04 | −8.8155482E−04 | 1.3554085E−02 | 2.4882599E−02 |
| A8 = | −1.0090333E−03 | 4.3396750E−05 | −1.4181091E−02 | −1.6265009E−02 |
| A10 = | 5.7630622E−04 | 3.3148954E−04 | 1.1017697E−02 | 7.3566613E−03 |
| A12 = | −1.6252355E−04 | −2.8640469E−04 | −5.6998185E−03 | −2.2237678E−03 |
| A14 = | 1.6873574E−05 | 5.8168932E−05 | 1.6290083E−03 | 3.8722242E−04 |
| A16 = | | | −1.9998659E−04 | −3.0690988E−05 |

Aspheric Coefficients

| Surface # | 11 | 12 | 13 | 14 |
|---|---|---|---|---|
| k = | −2.2908800E+01 | −1.0000000E+00 | 0.0000000E+00 | 1.7834600E+01 |
| A4 = | 7.8969979E−03 | −8.1543619E−03 | −9.8646978E−03 | −1.2350205E−02 |
| A6 = | −4.2152514E−04 | 1.5323880E−04 | −3.6922196E−03 | −1.1633817E−02 |
| A8 = | −1.9846726E−03 | −4.3078272E−04 | 1.5452125E−03 | 7.9757660E−03 |
| A10 = | 1.2482637E−03 | 2.2363063E−04 | −3.0821001E−04 | −3.0073077E−03 |
| A12 = | −3.7358746E−04 | −6.3042665E−05 | −1.2026082E−04 | 6.9894991 E−04 |
| A14 = | 5.8861403E−05 | 7.8697669E−06 | 7.7251348E−05 | −1.0214886E−04 |
| A16 = | −3.8944811E−06 | −1.0291361E−07 | −1.7338375E−05 | 9.1733742E−06 |
| A18 = | | | 1.8339854E−06 | −4.5764195E−07 |
| A20 = | | | −7.4916466E−08 | 9.5702524E−09 |

Aspheric Coefficients

| Surface # | 15 | 16 | 17 | 18 |
|---|---|---|---|---|
| k = | −1.9393100E−01 | −1.5029600E+00 | −3.2674300E+01 | −8.3273700E−01 |
| A4 = | −4.7337405E−03 | 6.9491181E−03 | −1.1233044E−02 | −7.7084755E−02 |
| A6 = | −1.0158445E−02 | −1.1151053E−03 | −2.5682445E−02 | 1.7266792E−02 |
| A8 = | 4.2516834E−03 | −2.7498109E−03 | 1.9179313E−02 | −3.1199850E−03 |
| A10 = | −1.5631719E−03 | 1.4557549E−03 | −7.6683481E−03 | 4.5418562E−04 |
| A12 = | 4.9931118E−04 | −3.8798291E−04 | 1.9744326E−03 | −6.9499660E−05 |
| A14 = | −1.2325766E−04 | 6.4892873E−05 | −3.4219281E−04 | 1.1734455E−05 |
| A16 = | 2.1329099E−05 | −7.1884227E−06 | 4.0608448E−05 | −1.6562992E−06 |
| A18 = | −2.4337498E−06 | 5.2761764E−07 | −3.3039253E−06 | 1.6562678E−07 |
| A20 = | 1.7247073E−07 | −2.4664871E−08 | 1.8122046E−07 | −1.1214910E−08 |
| A22 = | −6.8349075E−09 | 6.6413625E−10 | −6.4072423E−09 | 5.0276565E−10 |
| A24 = | 1.1524962E−10 | −7.8279840E−12 | 1.3191035E−10 | −1.4305116E−11 |
| A26 = | | | −1.2017836E−12 | 2.3414465E−13 |
| A28 = | | | | −1.6800641E−15 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 4A and Table 4B as the following values and satisfy the following conditions in Table 4C:

TABLE 4C

| 4th Embodiment | | | |
|---|---|---|---|
| f [mm] | 5.38 | (R3 − R4)/(R3 + R4) | −1.31 |
| Fno | 2.23 | R10/R13 | −1.60 |
| HFOV [deg.] | 43.0 | Dr1r4/Dr11r16 | 1.81 |
| FOV [deg.] | 86.0 | CT4/CT5 | 0.30 |
| TL/ImgH | 2.77 | CT5/CT3 | 3.10 |
| SD/TD | 0.49 | CT5/T78 | 1.23 |
| T12/f | 0.46 | T56/CT5 | 0.84 |
| T12/BL | 2.39 | N2 | 1.729 |
| \|f2/f1\| | 0.61 | V8 | 23.5 |
| \|f5/f3\| | 0.03 | V3/V4 | 2.4 |
| \|f/R10\| | 1.02 | V3/V6 | 2.4 |
| \|f/R9\| + \|f/R10\| | 2.28 | Y1R1/Y8R2 | 1.12 |
| (\|f/f3\| + \|f/f6\|)/(\|f/f4\| + \|f/f5\|) | 0.10 | Y5R1/ImgH | 0.36 |

TABLE 4C-continued

| 4th Embodiment | | | |
|---|---|---|---|
| (R1 − R9)/(R1 + R9) | 0.62 | SAG1R2/CT1 | 1.98 |
| (R1 − R16)/(R1 + R16) | 0.78 | | |

5th Embodiment

Figure 9:
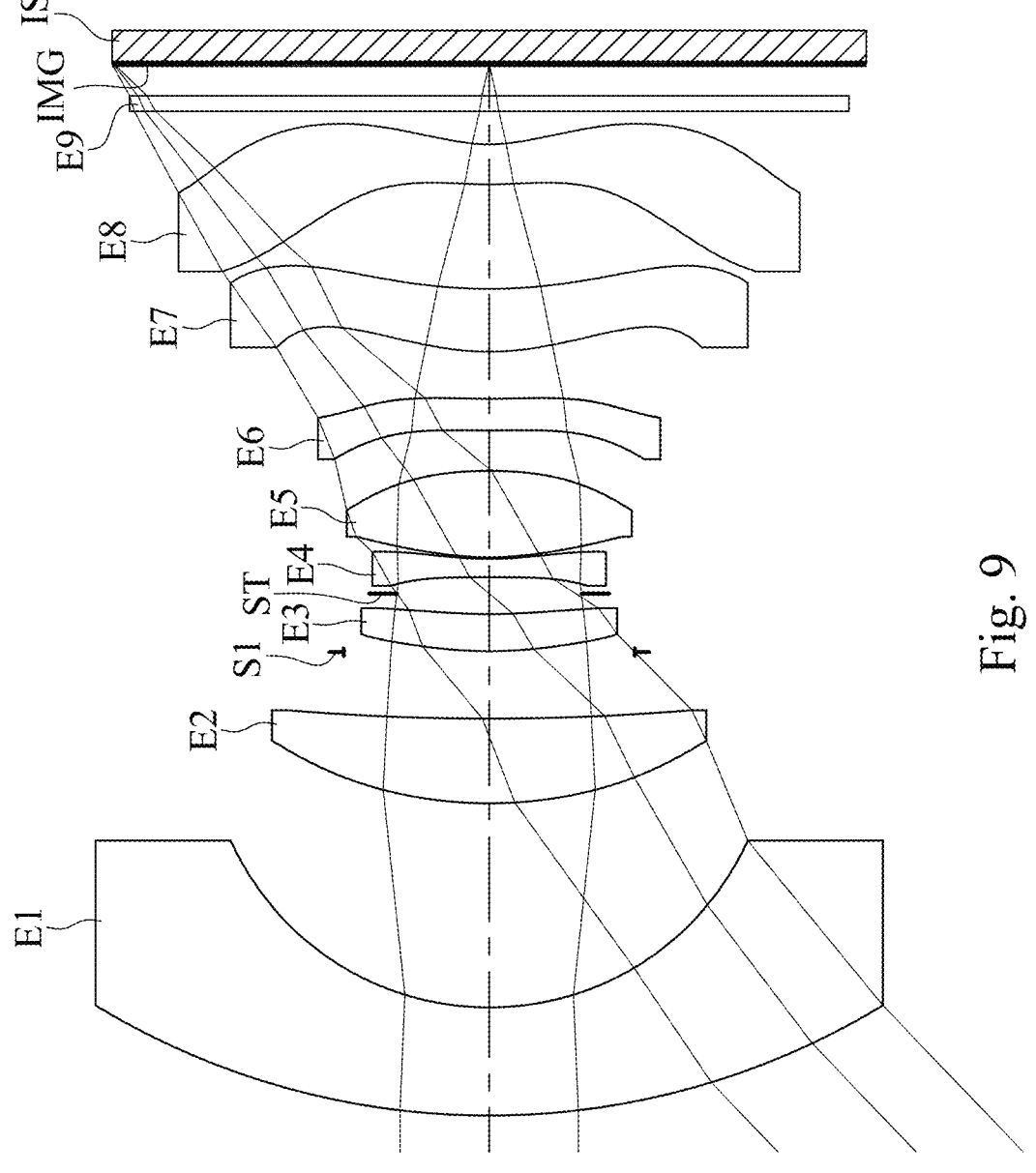
FIG. 9 is a schematic view of an imaging apparatus according to the 5th embodiment of the present disclosure.
Figure 10:
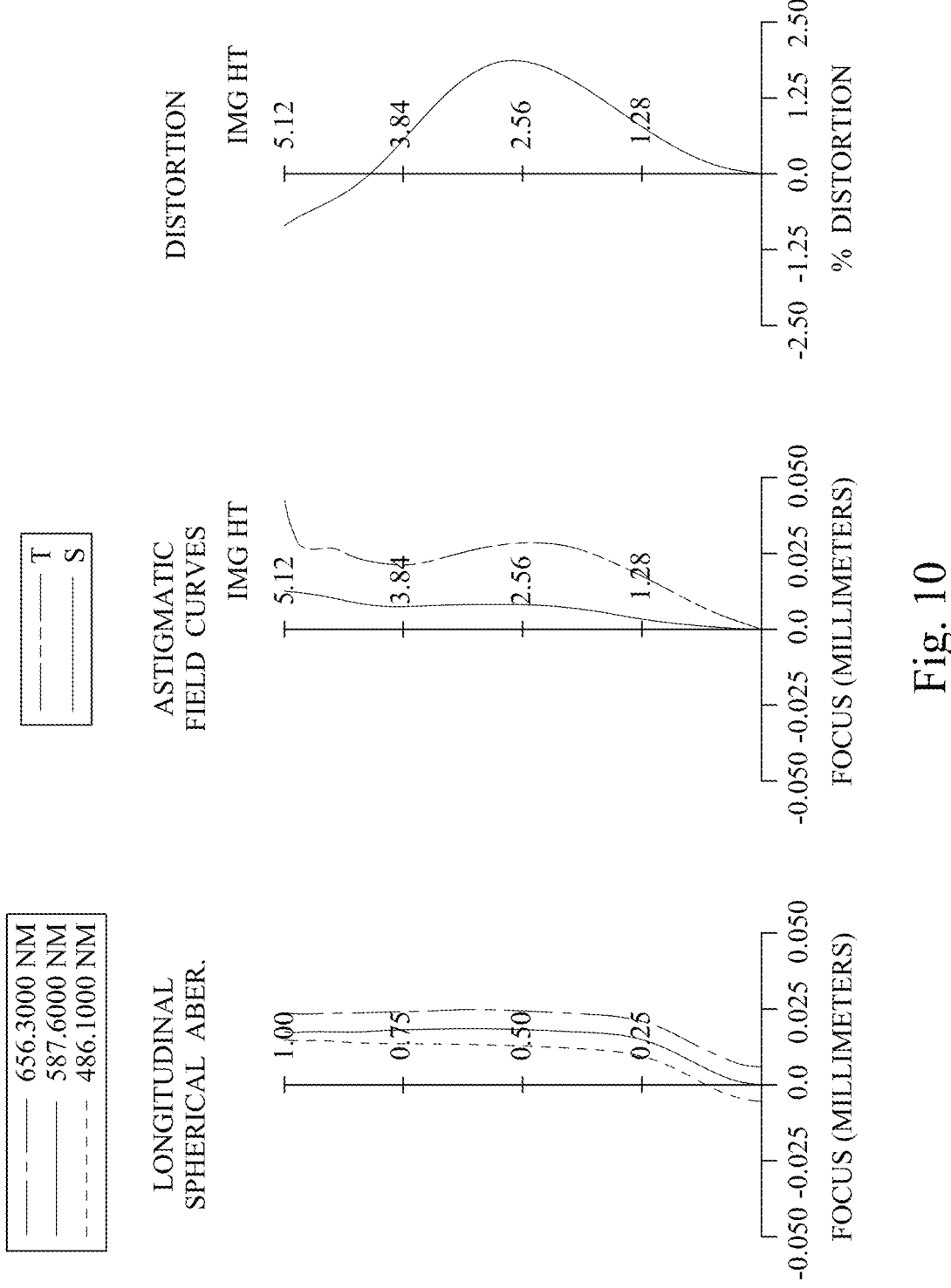
FIG. 10 shows spherical aberration curves, astigmatic field curves and a distortion curve of the imaging apparatus according to the 5th embodiment.

FIG. 9 is a schematic view of an imaging apparatus 5 according to the 5th embodiment of the present disclosure. FIG. 10 shows spherical aberration curves, astigmatic field curves and a distortion curve of the imaging apparatus 5 according to the 5th embodiment. In FIG. 9, the imaging apparatus 5 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being concave in a paraxial region thereof. The second lens element E2 is made of a glass material, and has the object-side surface and the image-side surface being both aspheric. Furthermore, the object-side surface of the second lens element E2 includes one inflection point, and the image-side surface of the second lens element E2 includes one inflection point.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the image-side surface of the third lens element E3 includes two inflection points.

The fourth lens element E4 with negative refractive power has an object-side surface being concave in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes one inflection point and one critical point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes one inflection point and one critical point, and the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point and one critical point, and the image-side surface of the seventh lens element E7 includes one inflection point and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes two inflection points and one critical point, and the image-side surface of the eighth lens element E8 includes two inflection points and one critical point.

The filter E9 is made of a glass material, which is located between the eighth lens element E8 and the image surface IMG in order, and will not affect the focal length of the image capturing system lens assembly.

The detailed optical data of the 5th embodiment are shown in Table 5A and the aspheric surface data are shown in Table 5B below.

TABLE 5A

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.3198 | SPH | 1.473 | Glass | 1.540 | 59.7 | −12.42 |
| 2 | | 3.8606 | SPH | 2.785 | | | | |
| 3 | Lens 2 | 5.8358 | ASP | 1.156 | Glass | 1.755 | 52.3 | 9.09 |
| 4 | | 35.7143 | ASP | 0.908 | | | | |
| 5 | Stop | Plano | | 0.010 | | | | |
| 6 | Lens 3 | 5.7132 | ASP | 0.506 | Plastic | 1.544 | 56.0 | 34.15 |
| 7 | | 7.9932 | ASP | 0.279 | | | | |
| 8 | Ape. Stop | Plano | | 0.225 | | | | |
| 9 | Lens 4 | −49.9524 | ASP | 0.250 | Plastic | 1.614 | 25.6 | −7.14 |
| 10 | | 4.8128 | ASP | 0.020 | | | | |
| 11 | Lens 5 | 4.2736 | ASP | 1.180 | Plastic | 1.544 | 56.0 | 4.55 |
| 12 | | −5.3090 | ASP | 0.550 | | | | |
| 13 | Lens 6 | 25.3951 | ASP | 0.433 | Plastic | 1.639 | 23.5 | −38.64 |
| 14 | | 12.4323 | ASP | 0.641 | | | | |
| 15 | Lens 7 | 3.5773 | ASP | 0.857 | Plastic | 1.544 | 56.0 | 12.41 |
| 16 | | 6.9640 | ASP | 1.424 | | | | |
| 17 | Lens 8 | 6.1427 | ASP | 0.547 | Plastic | 1.566 | 37.4 | −6.91 |
| 18 | | 2.3123 | ASP | 0.450 | | | | |

5th Embodiment
f = 5.38 mm, Fno = 2.22, HFOV = 43.7 deg.

TABLE 5A-continued

| | | | 5th Embodiment f = 5.38 mm, Fno = 2.22, HFOV = 43.7 deg. | | | | |
|---|---|---|---|---|---|---|---|
| Surface # | | Curvature Radius | Thickness | Material | Index | Abbe # | Focal Length |
| 19 | Filter | Plano | 0.210 | Glass | 1.517 | 64.2 | — |
| 20 | | Plano | 0.437 | | | | |
| 21 | Image | Plano | — | | | | |

Reference wavelength is 587.6 nm (d-line).
Effective radius of Surface 5 (stop S1) is 1.98 mm.

TABLE 5B

| | | | Aspheric Coefficients | | |
|---|---|---|---|---|---|
| Surface # | 3 | 4 | 6 | 7 | 9 |
| k= | 0.0000000E+00 | 0.0000000E+00 | 5.2304400E+00 | −1.5840500E+00 | 9.9000000E+01 |
| A4= | 2.5656444E−04 | −1.7857001E−04 | −1.3061396E−02 | −1.2692468E−02 | −3.5716720E−02 |
| A6= | 8.7062611E−05 | 1.4859292E−04 | 1.9836762E−03 | −1.2550167E−02 | 1.3122861E−02 |
| A8= | −2.0584058E−06 | −1.7605898E−05 | −4.5988945E−03 | 3.8173762E−02 | −3.7434107E−02 |
| A10= | 3.2289516E−07 | 2.4146605E−06 | 6.5811920E−03 | −7.0298804E−02 | 8.9911717E−02 |
| A12= | 5.8784134E−08 | −4.8291179E−07 | −5.9217071E−03 | 8.5175942E−02 | −1.5069500E−01 |
| A14= | −1.5848813E−08 | 2.8927040E−08 | 3.5499030E−03 | −6.7873660E−02 | 1.6864337E−01 |
| A16= | | | −1.3871560E−03 | 3.5321193E−02 | −1.2271133E−01 |
| A18= | | | 3.4002640E−04 | −1.1537555E−02 | 5.5511383E−02 |
| A20= | | | −4.7370360E−05 | 2.1450033E−03 | −1.4157459E−02 |
| A22= | | | 2.8636642E−06 | −1.7301424E−04 | 1.5538915E−03 |

| Surface # | 10 | 11 | 12 | 13 | 14 |
|---|---|---|---|---|---|
| k= | 4.0780100E+00 | −1.9559900E+01 | 1.5732500E+00 | −8.5635100E+00 | 1.3336000E+01 |
| A4= | −4.4513482E−02 | 1.0863249E−02 | −1.7598505E−02 | −4.5097046E−02 | −5.1914326E−02 |
| A6= | 1.7006117E−02 | −3.8380313E−03 | 3.0385518E−03 | 1.8863354E−02 | 2.4481338E−02 |
| A8= | −2.0713751E−02 | −7.6099779E−03 | −6.9808376E−04 | −1.7533844E−02 | −1.8972679E−02 |
| A10= | 1.7128821E−02 | 1.3061805E−02 | −7.9150405E−04 | 1.5530996E−02 | 1.4323140E−02 |
| A12= | −5.5837443E−03 | −9.7301593E−03 | 1.3362494E−03 | −1.1248167E−02 | −8.7937150E−03 |
| A14= | −2.6067460E−03 | 4.1820966E−03 | −9.5143110E−04 | 6.2320944E−03 | 4.0932989E−03 |
| A16= | 3.3615569E−03 | −1.0692751E−03 | 3.9471798E−04 | −2.5559755E−03 | −1.3904342E−03 |
| A18= | −1.4402888E−03 | 1.5095013E−04 | −9.5967990E−05 | 7.5568389E−04 | 3.3543611E−04 |
| A20= | 2.9980462E−04 | −8.8676062E−06 | 1.2591878E−05 | −1.5436185E−04 | −5.5371417E−05 |
| A22= | −2.5441908E−05 | −4.5295185E−08 | −6.8709409E−07 | 2.0402185E−05 | 5.8894076E−06 |
| A24= | | | | −1.5566220E−06 | −3.6098615E−07 |
| A26= | | | | 5.1783061E−08 | 9.6349059E−09 |

| Surface # | 15 | 16 | 17 | 18 |
|---|---|---|---|---|
| k= | −1.5380700E+00 | 1.4317400E+00 | −1.3202800E+00 | −1.1619700E+00 |
| A4= | −2.2055067E−02 | −5.3523601E−03 | −7.8135037E−02 | −8.3098711E−02 |
| A6= | 9.1243593E−03 | 3.7000107E−03 | 1.9806066E−02 | 2.7920123E−02 |
| A8= | −6.0457208E−03 | −2.7635338E−03 | −4.0044247E−03 | −8.3430454E−03 |
| A10= | 3.3792971E−03 | 1.2406211E−03 | 3.5356479E−04 | 2.0286128E−03 |
| A12= | −1.4973521E−03 | −4.0177557E−04 | 1.4167741E−04 | −3.8654775E−04 |
| A14= | 5.0397461E−04 | 9.6183117E−05 | −7.5125761E−05 | 5.6442213E−05 |
| A16= | −1.2726352E−04 | −1.7032131E−05 | 1.8514921E−05 | −6.2287718E−06 |
| A18= | 2.3864360E−05 | 2.2080339E−06 | −2.8626251E−06 | 5.1230876E−07 |
| A20= | −3.2702775E−06 | −2.0549713E−07 | 2.9239174E−07 | −3.0761857E−08 |
| A22= | 3.1800024E−07 | 1.3289602E−08 | −1.9688362E−08 | 1.3036803E−09 |
| A24= | −2.0754499E−08 | −5.6433012E−10 | 8.4073818E−10 | −3.6791916E−11 |
| A26= | 8.1279002E−10 | 1.4089798E−11 | −2.0639786E−11 | 6.1828733E−13 |
| A28= | −1.4368268E−11 | −1.5614744E−13 | 2.2197046E−13 | −4.6671399E−15 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 5A and Table 5B as the following values and satisfy the following conditions in Table 5C:

TABLE 5C

| | 5th Embodiment | | |
|---|---|---|---|
| f [mm] | 5.38 | (R3 − R4)/(R3 + R4) | −0.72 |
| Fno | 2.22 | R10/R13 | −1.48 |
| HFOV [deg.] | 43.7 | Dr1r4/Dr11r16 | 1.39 |
| FOV [deg.] | 87.4 | CT4/CT5 | 0.21 |
| TL/ImgH | 2.80 | CT5/CT3 | 2.33 |
| SD/TD | 0.46 | CT5/T78 | 0.83 |
| T12/f | 0.52 | T56/CT5 | 0.47 |
| T12/BL | 2.54 | N2 | 1.755 |

TABLE 5C-continued

| 5th Embodiment | | | |
|---|---|---|---|
| \|f2/f1\| | 0.73 | V8 | 37.4 |
| \|f5/f3\| | 0.13 | V3/V4 | 2.2 |
| \|f/R10\| | 1.01 | V3/V6 | 2.4 |
| \|f/R9\| + \|f/R10\| | 2.27 | Y1R1/Y8R2 | 1.27 |
| (\|f/f3\| + \|f/f6\|)/(\|f/f4\| + \|f/f5\|) | 0.15 | Y5R1/ImgH | 0.35 |
| (R1 − R9)/(R1 + R9) | 0.41 | SAG1R2/CT1 | 1.55 |
| (R1 − R16)/(R1 + R16) | 0.63 | | |

6th Embodiment

Figure 11:
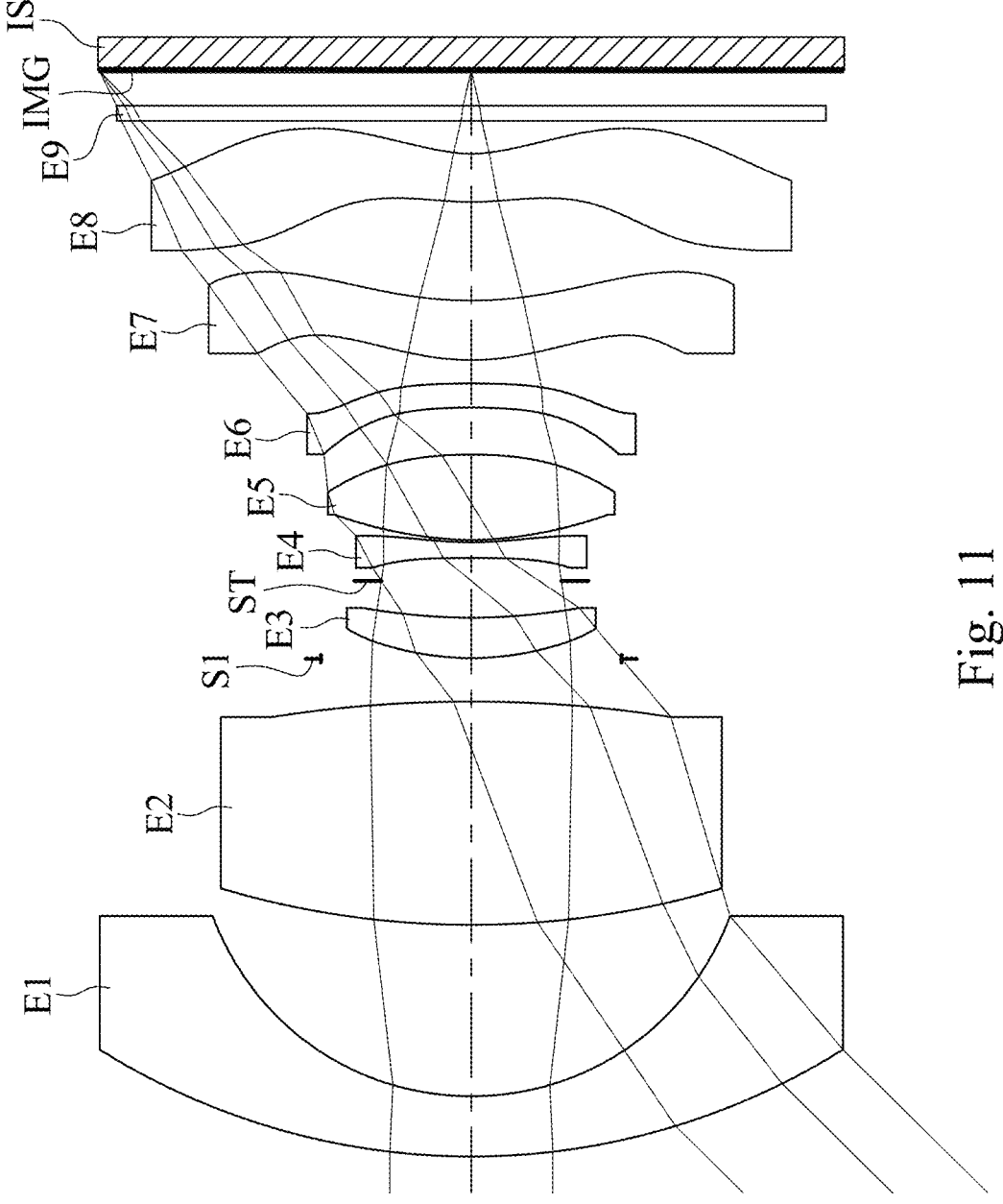
FIG. 11 is a schematic view of an imaging apparatus according to the 6th embodiment of the present disclosure.
Figure 12:
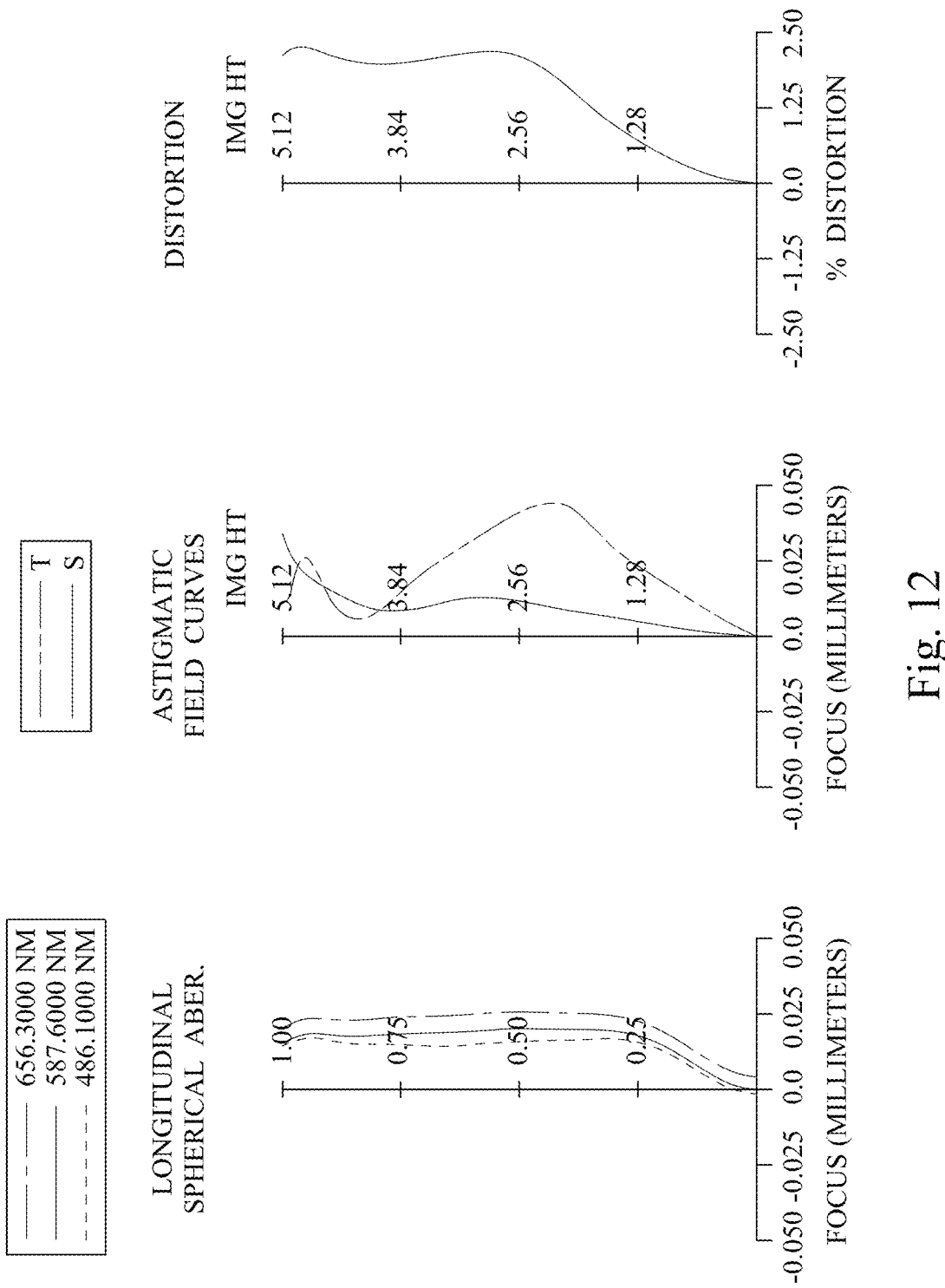
FIG. 12 shows spherical aberration curves, astigmatic field curves and a distortion curve of the imaging apparatus according to the 6th embodiment.

FIG. 11 is a schematic view of an imaging apparatus 6 according to the 6th embodiment of the present disclosure. FIG. 12 shows spherical aberration curves, astigmatic field curves and a distortion curve of the imaging apparatus 6 according to the 6th embodiment. In FIG. 11, the imaging apparatus 6 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both spherical.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes one inflection point and one critical point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point.

The sixth lens element E6 with negative refractive power has an object-side surface being concave in a paraxial region thereof and an image-side surface being convex in a paraxial region thereof. The sixth lens element E6 is made of a plastic material, and has the object-side surface and the image-side surface being both aspheric. Furthermore, the image-side surface of the sixth lens element E6 includes one inflection point and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point and one critical point, and the image-side surface of the seventh lens element E7 includes one inflection point and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes two inflection points and one critical point, and the image-side surface of the eighth lens element E8 includes two inflection points and one critical point.

The filter E9 is made of a glass material, which is located between the eighth lens element E8 and the image surface IMG in order, and will not affect the focal length of the image capturing system lens assembly.

The detailed optical data of the 6th embodiment are shown in Table 6A and the aspheric surface data are shown in Table 6B below.

TABLE 6A

| 6th Embodiment f = 4.94 mm, Fno = 2.21, HFOV = 45.3 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 9.5962 | SPH | 0.825 | Glass | 1.622 | 56.7 | −10.62 |
| 2 | | 3.7846 | SPH | 2.356 | | | | |
| 3 | Lens 2 | 12.0825 | SPH | 3.068 | Glass | 1.755 | 52.3 | 9.93 |
| 4 | | −17.6092 | SPH | 0.586 | | | | |
| 5 | Stop | Plano | | 0.010 | | | | |
| 6 | Lens 3 | 3.9182 | ASP | 0.553 | Plastic | 1.544 | 56.0 | 15.48 |
| 7 | | 6.9627 | ASP | 0.507 | | | | |

TABLE 6A-continued

| | | 6th Embodiment<br>f = 4.94 mm, Fno = 2.21, HFOV = 45.3 deg. | | | | | |
| Surface<br># | | Curvature<br>Radius | Thickness | Material | Index | Abbe # | Focal<br>Length |
|---|---|---|---|---|---|---|---|
| 8 | Ape. Stop | Plano | 0.316 | | | | |
| 9 | Lens 4 | −22.3824 ASP | 0.215 | Plastic | 1.614 | 25.6 | −6.53 |
| 10 | | 4.8995 ASP | 0.030 | | | | |
| 11 | Lens 5 | 3.9118 ASP | 1.174 | Plastic | 1.544 | 56.0 | 4.57 |
| 12 | | −6.1063 ASP | 0.646 | | | | |
| 13 | Lens 6 | −7.7706 ASP | 0.331 | Plastic | 1.639 | 23.5 | −38.46 |
| 14 | | −11.5555 ASP | 0.322 | | | | |
| 15 | Lens 7 | 3.4979 ASP | 0.817 | Plastic | 1.544 | 56.0 | 14.96 |
| 16 | | 5.6299 ASP | 1.354 | | | | |
| 17 | Lens 8 | 4.3857 ASP | 0.662 | Plastic | 1.566 | 37.4 | −8.00 |
| 18 | | 2.1068 ASP | 0.450 | | | | |
| 19 | Filter | Plano | 0.210 | Glass | 1.517 | 64.2 | — |
| 20 | | Plano | 0.488 | | | | |
| 21 | Image | Plano | — | | | | |

Reference wavelength is 587.6 nm (d-line).

Effective radius of Surface 5 (stop S1) is 2.06 mm.

TABLE 6B

| | | Aspheric Coefficients | | |
| Surface # | 6 | 7 | 9 | 10 |
|---|---|---|---|---|
| k= | 2.8120100E+00 | 9.1429600E+00 | −6.9160100E+01 | 3.8378500E+00 |
| A4= | −1.0837454E−02 | −1.0380768E−02 | −2.8927090E−02 | −4.9063710E−02 |
| A6= | 4.8161068E−03 | −8.0605721E−03 | 1.2875206E−02 | −1.0070386E−03 |
| A8= | −1.0635182E−02 | 2.0653606E−02 | −9.2439544E−02 | 3.5501344E−02 |
| A10= | 1.2811676E−02 | −3.4172888E−02 | 3.0211460E−01 | −4.7614162E−02 |
| A12= | −1.0001233E−02 | 3.7765737E−02 | −5.6743698E−01 | 3.1584209E−02 |
| A14= | 5.2131123E−03 | −2.7615684E−02 | 6.6185042E−01 | −1.0076151E−02 |
| A16= | −1.7931904E−03 | 1.3329835E−02 | −4.8816357E−01 | −2.0774499E−04 |
| A18= | 3.9525985E−04 | −4.0820645E−03 | 2.2165646E−01 | 1.3340010E−03 |
| A20= | −5.1458557E−05 | 7.1816269E−04 | −5.6564510E−02 | −4.2382425E−04 |
| A22= | 3.1116735E−06 | −5.5034357E−05 | 6.2080574E−03 | 4.5347725E−05 |

| Surface # | 11 | 12 | 13 | 14 |
|---|---|---|---|---|
| k= | −1.6986000E+01 | 1.8190200E+00 | 8.4800800E−01 | −7.2029500E+01 |
| A4= | 8.1152718E−04 | −1.5161810E−02 | 2.2080675E−03 | 2.3675445E−03 |
| A6= | −9.9100186E−03 | −3.3695521E−03 | −3.7538494E−02 | −4.3315187E−02 |
| A8= | 3.2421541E−02 | 2.7071330E−03 | 2.3103680E−02 | 3.3680756E−02 |
| A10= | −4.0117974E−02 | 6.6603060E−04 | −7.7889855E−03 | −1.9000256E−02 |
| A12= | 2.9395745E−02 | −1.9149309E−03 | 8.9914540E−04 | 9.7258446E−03 |
| A14= | −1.3908054E−02 | 1.3581858E−03 | 5.7521452E−04 | −4.2977398E−03 |
| A16= | 4.2933899E−03 | −5.1806622E−04 | −3.4295729E−04 | 1.4863091 E−03 |
| A18= | −8.3575042E−04 | 1.1249312E−04 | 8.4469341E−05 | −3.7386976E−04 |
| A20= | 9.3132135E−05 | −1.2986870E−05 | −1.0324860E−05 | 6.4796226E−05 |
| A22= | −4.5293470E−06 | 6.1325126E−07 | 5.0683612E−07 | −7.2565497E−06 |
| A24= | | | | 4.6897948E−07 |
| A26= | | | | −1.3202182E−08 |

| Surface # | 15 | 16 | 17 | 18 |
|---|---|---|---|---|
| k= | 4.4673500E−02 | −2.5556200E+00 | −2.7905300E+00 | −1.0766300E+00 |
| A4= | −8.6619879E−03 | −2.6705345E−03 | −7.0637930E−02 | −8.1153758E−02 |
| A6= | −8.7642697E−03 | 7.8776723E−03 | 1.3680283E−02 | 2.2495103E−02 |
| A8= | 4.2567309E−03 | −7.8525798E−03 | −2.6591423E−04 | −4.9862815E−03 |
| A10= | −1.8111562E−03 | 3.6730441E−03 | −9.9522695E−04 | 8.0950200E−04 |
| A12= | 7.6554174E−04 | −1.0635950E−03 | 3.8255851E−04 | −9.5169246E−05 |
| A14= | −2.6479773E−04 | 2.0816378E−04 | −7.5816467E−05 | 7.9475167E−06 |
| A16= | 6.4576313E−05 | −2.8508039E−05 | 9.3828228E−06 | −4.4456541 E−07 |
| A18= | −1.0623935E−05 | 2.7489684E−06 | −7.6590806E−07 | 1.4073025E−08 |
| A20= | 1.1475512E−06 | −1.8335942E−07 | 4.1470629E−08 | −5.8846730E−11 |
| A22= | −7.7413986E−08 | 8.0612483E−09 | −1.4391180E−09 | −1.3365488E−11 |
| A24= | 2.9331957E−09 | −2.1015095E−10 | 2.9060887E−11 | 4.6894775E−13 |
| A26= | −4.7254993E−11 | 2.4591550E−12 | −2.6017188E−13 | −5.2777804E−15 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 6A and Table 6B as the following values and satisfy the following conditions in Table 6C:

TABLE 6C

| 6th Embodiment | | | |
|---|---|---|---|
| f [mm] | 4.94 | (R3 − R4)/(R3 + R4) | −5.37 |
| Fno | 2.21 | R10/R13 | −1.75 |
| HFOV [deg.] | 45.3 | Dr1r4/Dr11r16 | 1.79 |
| FOV [deg.] | 90.6 | CT4/CT5 | 0.18 |
| TL/ImgH | 2.91 | CT5/CT3 | 2.12 |
| SD/TD | 0.43 | CT5/T78 | 0.87 |
| T12/f | 0.48 | T56/CT5 | 0.55 |
| T12/BL | 2.05 | N2 | 1.755 |
| \|f2/f1\| | 0.93 | V8 | 37.4 |
| \|f5/f3\| | 0.30 | V3/V4 | 2.2 |
| \|f/R10\| | 0.81 | V3/V6 | 2.4 |
| \|f/R9\| + \|f/R10\| | 2.07 | Y1R1/Y8R2 | 1.16 |
| (\|f/f3\| + \|f/f6\|)/(\|f/f4\| + \|f/f5\|) | 0.24 | Y5R1/ImgH | 0.37 |
| (R1 − R9)/(R1 + R9) | 0.42 | SAG1R2/CT1 | 3.00 |
| (R1 − R16)/(R1 + R16) | 0.64 | | |

7th Embodiment

Figure 13:
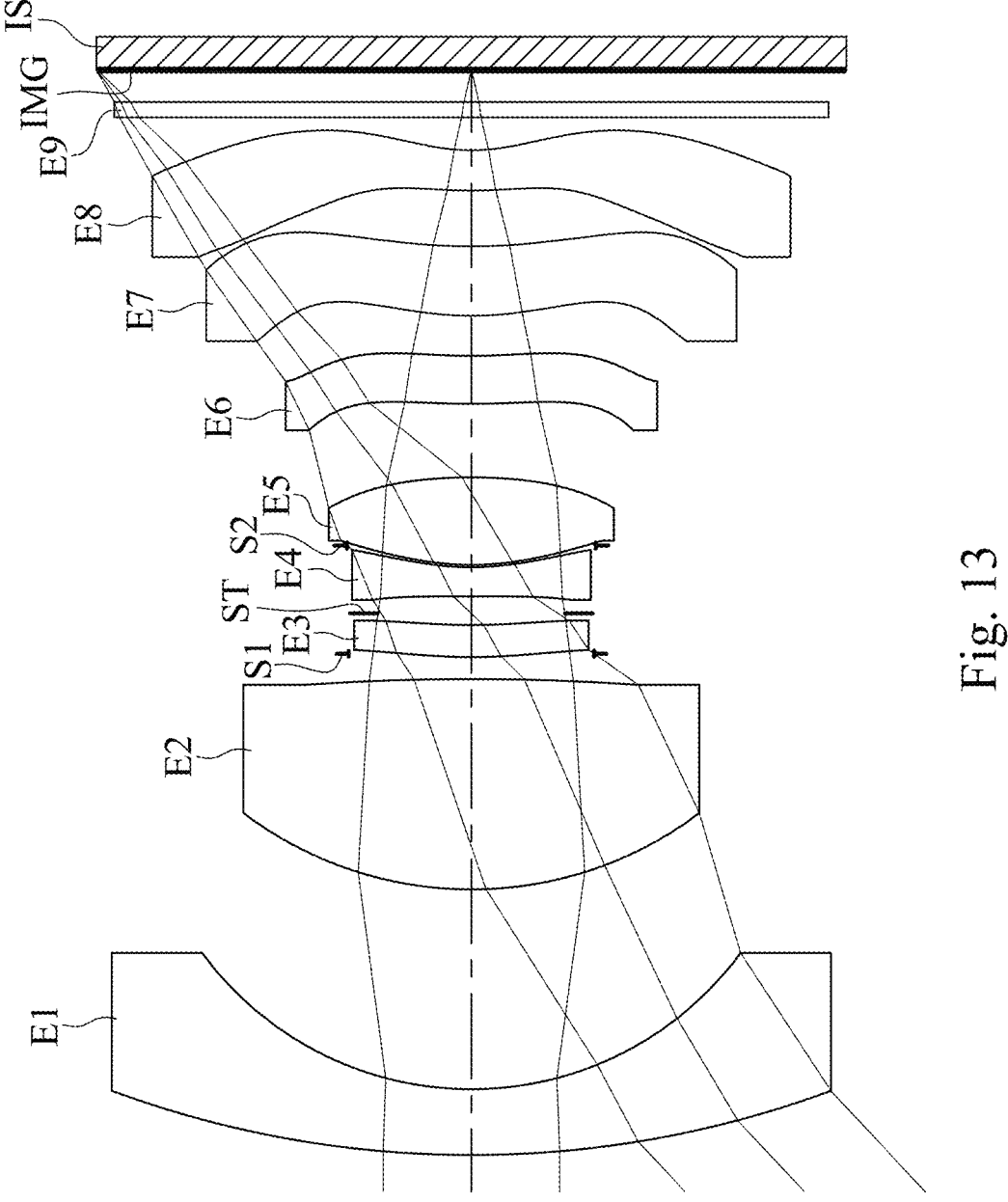
FIG. 13 is a schematic view of an imaging apparatus according to the 7th embodiment of the present disclosure.
Figure 14:
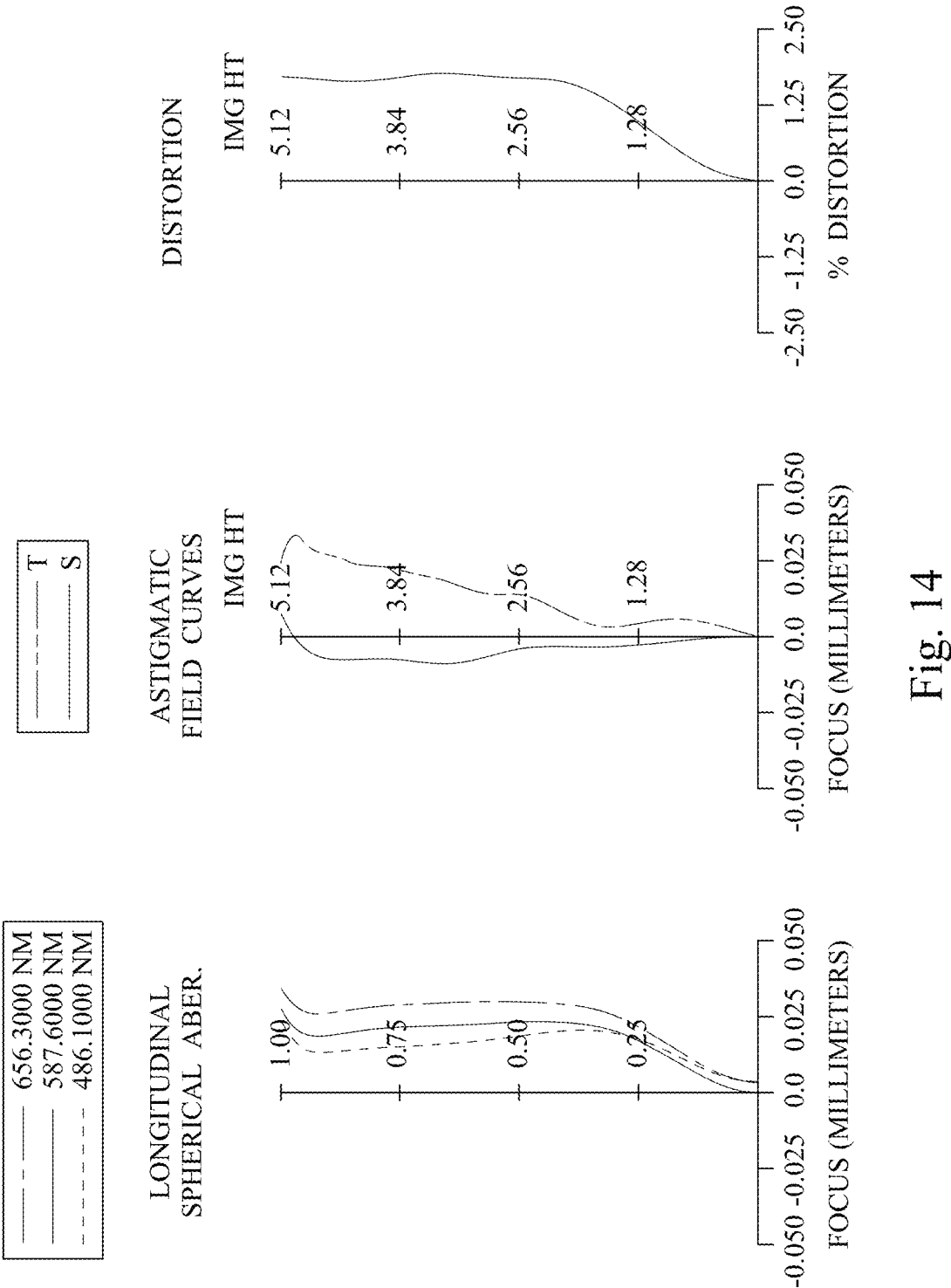
FIG. 14 shows spherical aberration curves, astigmatic field curves and a distortion curve of the imaging apparatus according to the 7th embodiment.

FIG. 13 is a schematic view of an imaging apparatus 7 according to the 7th embodiment of the present disclosure. FIG. 14 shows spherical aberration curves, astigmatic field curves and a distortion curve of the imaging apparatus 7 according to the 7th embodiment. In FIG. 13, the imaging apparatus 7 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both spherical.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point and one critical point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes one inflection point and one critical point, and the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes two inflection points and one critical point, and the and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes three inflection points and one critical point, and the image-side surface of the eighth lens element E8 includes one inflection point and one critical point.

The filter E9 is made of a glass material, which is located between the eighth lens element E8 and the image surface IMG in order, and will not affect the focal length of the image capturing system lens assembly.

The detailed optical data of the 7th embodiment are shown in Table 7A and the aspheric surface data are shown in Table 7B below.

TABLE 7A

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 14.1800 | SPH | 0.900 | Glass | 1.729 | 54.7 | −9.61 |
| 2 | | 4.5630 | SPH | 2.730 | | | | |
| 3 | Lens 2 | 5.1637 | SPH | 2.877 | Glass | 1.743 | 49.2 | 6.20 |
| 4 | | −32.4788 | SPH | 0.345 | | | | |
| 5 | Stop | Plano | | −0.045 | | | | |
| 6 | Lens 3 | 7.8785 | ASP | 0.438 | Plastic | 1.544 | 56.0 | 146.51 |
| 7 | | 8.5714 | ASP | 0.160 | | | | |
| 8 | Ape. Stop | Plano | | 0.230 | | | | |
| 9 | Lens 4 | 62.7323 | ASP | 0.400 | Plastic | 1.639 | 23.5 | −5.66 |
| 10 | | 3.4092 | ASP | 0.295 | | | | |
| 11 | Stop | Plano | | −0.264 | | | | |
| 12 | Lens 5 | 3.4280 | ASP | 1.198 | Plastic | 1.544 | 56.0 | 4.39 |
| 13 | | −6.9043 | ASP | 1.004 | | | | |
| 14 | Lens 6 | 9.8522 | ASP | 0.656 | Plastic | 1.587 | 28.3 | −59.51 |
| 15 | | 7.4961 | ASP | 0.548 | | | | |
| 16 | Lens 7 | 4.3729 | ASP | 0.950 | Plastic | 1.566 | 37.4 | 14.44 |
| 17 | | 8.6685 | ASP | 0.762 | | | | |
| 18 | Lens 8 | 6.1570 | ASP | 0.550 | Plastic | 1.587 | 28.3 | −7.70 |
| 19 | | 2.5204 | ASP | 0.450 | | | | |
| 20 | Filter | Plano | | 0.210 | Glass | 1.517 | 64.2 | — |
| 21 | | Plano | | 0.438 | | | | |
| 22 | Image | Plano | | — | | | | |

7th Embodiment
f = 5.37 mm, Fno = 2.23, HFOV = 43.0 deg.

Reference wavelength is 587.6 nm (d-line).
Effective radius of Surface 5 (stop S1) is 1.68 mm.
Effective radius of Surface 11 (stop S2) is 1.70 mm.

TABLE 7B

Aspheric Coefficients

| Surface # | 6 | 7 | 9 | 10 |
|---|---|---|---|---|
| k= | 0.0000000E+00 | 0.0000000E+00 | 0.0000000E+00 | 2.1478300E+00 |
| A4= | −1.2040481E−02 | −1.7203449E−02 | −3.1061620E−02 | −7.9408364E−02 |
| A6= | 1.1210164E−03 | 1.9833975E−03 | 2.6048644E−02 | 7.2581623E−02 |
| A8= | −3.0459826E−04 | 8.9735253E−05 | −3.3627931E−02 | −6.3078332E−02 |
| A10= | 1.3181006E−04 | −1.7177608E−04 | 3.6694688E−02 | 3.4877568E−02 |
| A12= | −2.6726559E−05 | | −2.9809263E−02 | −1.1978064E−02 |
| A14= | | | 1.5751938E−02 | 2.2944488E−03 |
| A16= | | | −4.7389648E−03 | −1.9637538E−04 |
| A18= | | | 6.0641263E−04 | 1.5999825E−06 |

| Surface # | 12 | 13 | 14 | 15 |
|---|---|---|---|---|
| k= | −1.5685900E+01 | −1.0000000E+00 | 0.0000000E+00 | 0.0000000E+00 |
| A4= | −1.1662686E−02 | −1.0154756E−02 | −2.7445413E−02 | −3.8156401E−02 |
| A6= | 4.0199279E−02 | 1.4978502E−03 | 7.4538897E−03 | 9.7657803E−03 |
| A8= | −4.3060741E−02 | −1.4513693E−03 | −5.7195402E−03 | −4.2742985E−03 |
| A10= | 2.6594477E−02 | 6.8397735E−04 | 2.7766250E−03 | 1.3498225E−03 |
| A12= | −1.0076051E−02 | −2.0635362E−04 | −9.2230568E−04 | −2.9646118E−04 |
| A14= | 2.2999663E−03 | 3.7405744E−05 | 1.8662587E−04 | 4.2987936E−05 |
| A16= | −2.8992878E−04 | −2.9628720E−06 | −2.0270411E−05 | −3.4533325E−06 |
| A18= | 1.5436164E−05 | | 9.0069945E−07 | 1.1954771E−07 |
| A20= | | | | −6.6040222E−10 |

| Surface # | 16 | 17 | 18 | 19 |
|---|---|---|---|---|
| k= | 0.0000000E+00 | 0.0000000E+00 | 0.0000000E+00 | −1.0000000E+00 |
| A4= | −1.8367763E−02 | 1.6042072E−03 | −5.6988732E−02 | −5.9123274E−02 |
| A6= | 3.6399941E−04 | −1.5225296E−03 | 9.5437334E−03 | 1.1471046E−02 |
| A8= | 7.0588056E−04 | −8.8622267E−04 | −2.6515798E−03 | −1.8672060E−03 |
| A10= | −1.1767108E−03 | 6.8986416E−04 | 9.1678086E−04 | 1.9874297E−04 |
| A12= | 7.3384467E−04 | −2.2004119E−04 | −1.7346604E−04 | −2.0765865E−06 |
| A14= | −2.6477865E−04 | 4.1236950E−05 | 1.6128027E−05 | −3.0150919E−06 |
| A16= | 5.8876667E−05 | −4.9382269E−06 | −5.4547596E−07 | 4.9452906E−07 |
| A18= | −8.1069154E−06 | 3.8237937E−07 | −1.6301050E−08 | −4.1298455E−08 |
| A20= | 6.7094984E−07 | −1.8478702E−08 | 9.2369722E−10 | 2.0767574E−09 |
| A22= | −3.0497788E−08 | 5.0452346E−10 | 8.6271486E−11 | −6.3515622E−11 |

TABLE 7B-continued

| Aspheric Coefficients | | | |
|---|---|---|---|
| A24= | 5.8373286E−10 | −5.9115425E−12 | −6.6781926E−12 | 1.0926961E−12 |
| A26= | | | 1.2784064E−13 | −8.1340339E−15 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 7A and Table 7B as the following values and satisfy the following conditions in Table 7C:

TABLE 7C

| 7th Embodiment | | | |
|---|---|---|---|
| f [mm] | 5.37 | (R3 − R4)/(R3 + R4) | −1.38 |
| Fno | 2.23 | R10/R13 | −1.58 |
| HFOV [deg.] | 43.0 | Dr1r4/Dr11r16 | 1.88 |
| FOV [deg.] | 86.0 | CT4/CT5 | 0.33 |
| TL/ImgH | 2.90 | CT5/CT3 | 2.74 |
| SD/TD | 0.46 | CT5/T78 | 1.57 |
| T12/f | 0.51 | T56/CT5 | 0.84 |
| T12/BL | 2.49 | N2 | 1.743 |
| \|f2/f1\| | 0.64 | V8 | 28.3 |
| \|f5/f3\| | 0.03 | V3/V4 | 2.4 |
| \|f/R10\| | 0.78 | V3/V6 | 2.0 |
| \|f/R9\| + \|f/R10\| | 2.35 | Y1R1/Y8R2 | 1.13 |
| (\|f/f3\| + \|f/f6\|)/(\|f/f4\| + \|f/f5\|) | 0.06 | Y5R1/ImgH | 0.35 |
| (R1 − R9)/(R1 + R9) | 0.61 | SAG1R2/CT1 | 2.07 |
| (R1 − R16)/(R1 + R16) | 0.70 | | |

8th Embodiment

Figure 15:
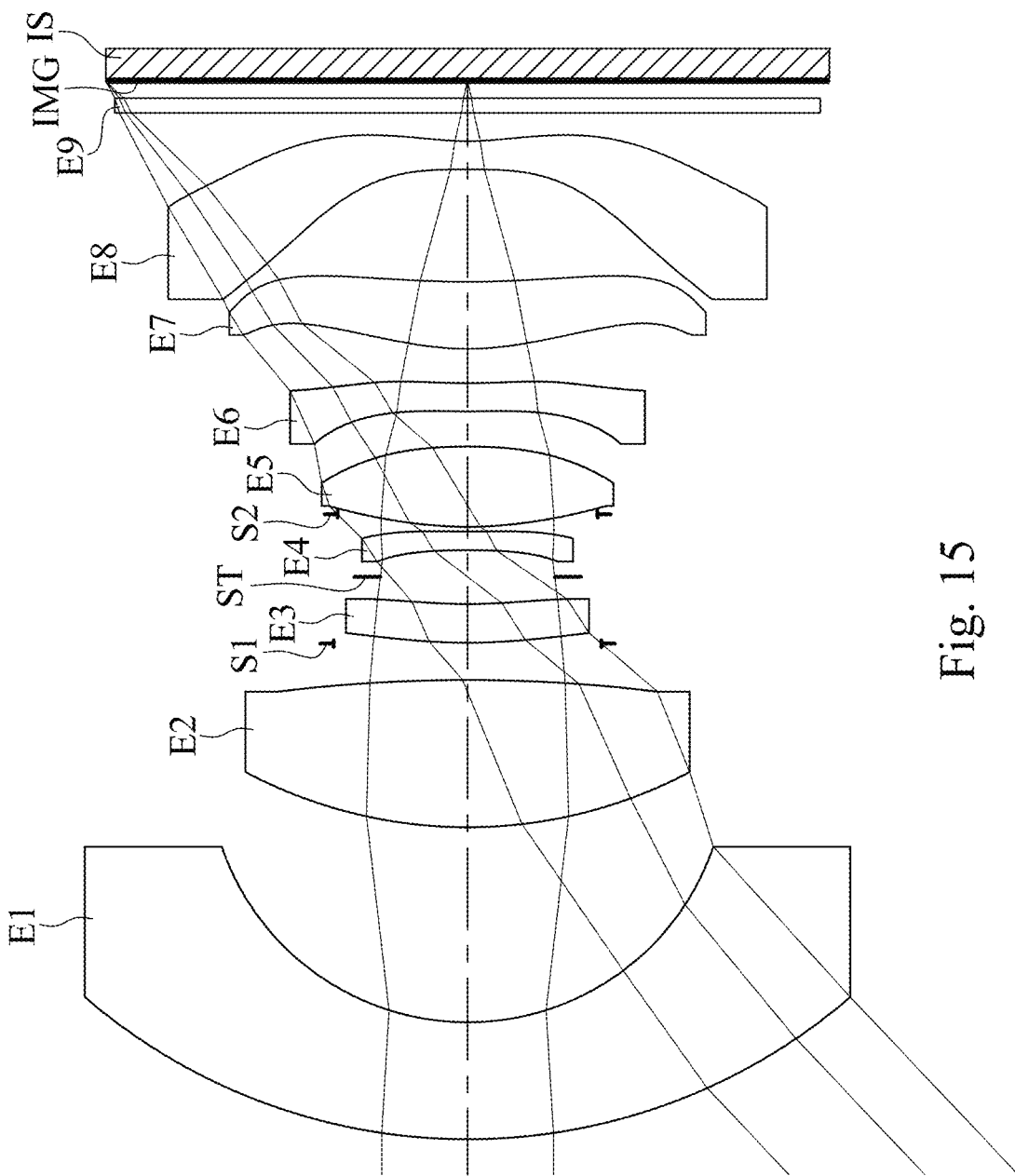
FIG. 15 is a schematic view of an imaging apparatus according to the 8th embodiment of the present disclosure.
Figure 16:
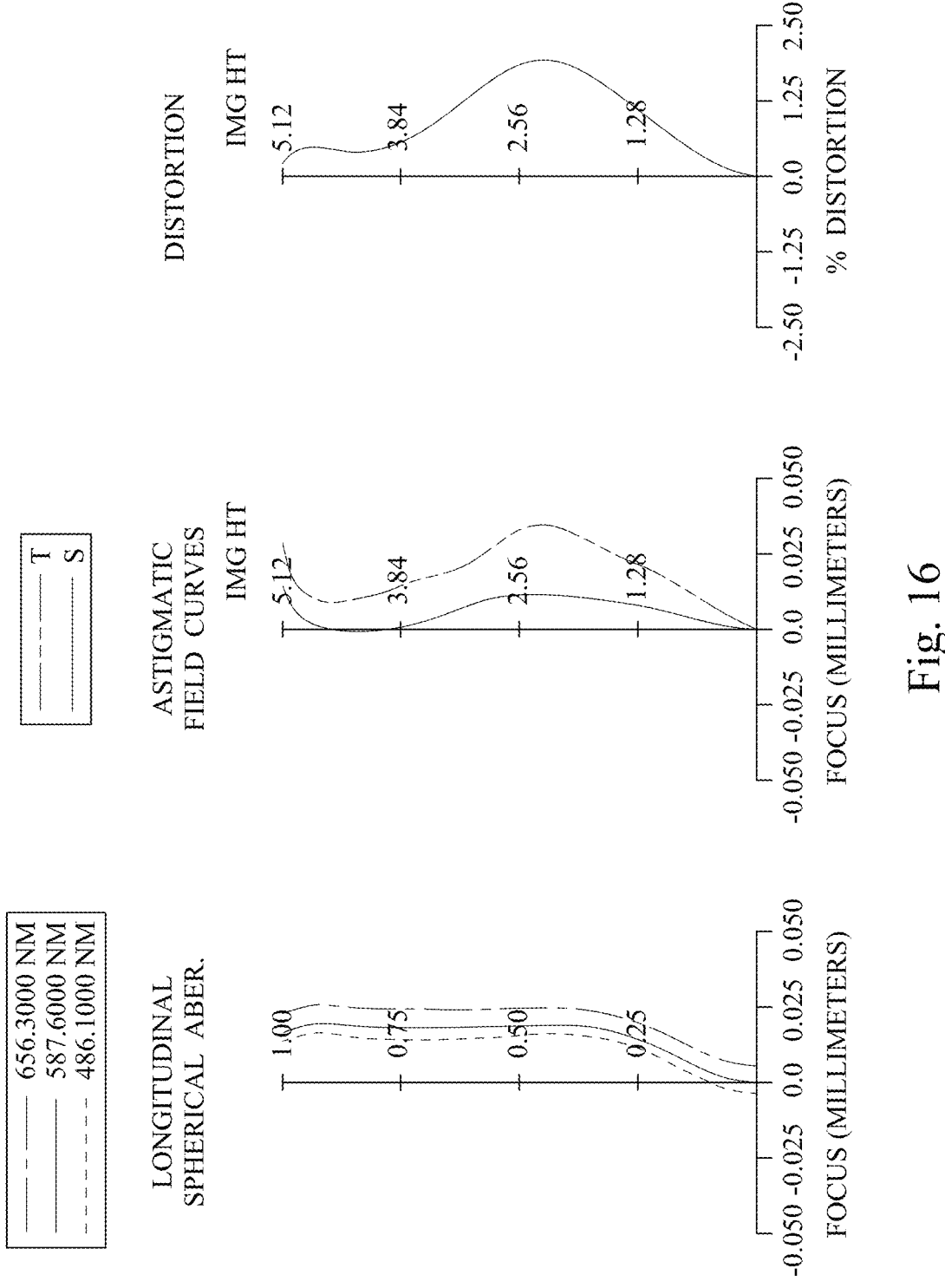
FIG. 16 shows spherical aberration curves, astigmatic field curves and a distortion curve of the imaging apparatus according to the 8th embodiment.

FIG. 15 is a schematic view of an imaging apparatus 8 according to the 8th embodiment of the present disclosure. FIG. 16 shows spherical aberration curves, astigmatic field curves and a distortion curve of the imaging apparatus 8 according to the 8th embodiment. In FIG. 15, the imaging apparatus 8 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both spherical.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the image-side surface of the third lens element E3 includes one inflection point.

The fourth lens element E4 with negative refractive power has an object-side surface being concave in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes one inflection point and one critical point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes one inflection point and one critical point, and the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes two inflection points and one critical point, and the image-side surface of the seventh lens element E7 includes two inflection points and one critical point.

The eighth lens element E8 with negative refractive power has an object-side surface being concave in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes two inflection points, and the image-side surface of the eighth lens element E8 includes three inflection points and one critical point.

The filter E9 is made of a glass material, which is located between the eighth lens element E8 and the image surface IMG in order, and will not affect the focal length of the image capturing system lens assembly.

The detailed optical data of the 8th embodiment are shown in Table 8A and the aspheric surface data are shown in Table 8B below.

TABLE 8A

| | | Curvature | | Thickness | Material | Index | Abbe # | Focal |
|---|---|---|---|---|---|---|---|---|
| Surface # | | Radius | | | | | | Length |
| 0 | Object | Plano | | Infinity | | | | |
| 1 | Lens 1 | 8.2871 | SPH | 1.657 | Glass | 1.673 | 32.2 | −11.48 |
| 2 | | 3.6762 | SPH | 2.762 | | | | |
| 3 | Lens 2 | 6.7033 | SPH | 2.085 | Glass | 1.720 | 50.4 | 7.36 |
| 4 | | −22.0256 | SPH | 0.517 | | | | |
| 5 | Stop | Plano | | 0.010 | | | | |
| 6 | Lens 3 | 7.4085 | ASP | 0.549 | Plastic | 1.544 | 56.0 | 361.98 |
| 7 | | 7.4971 | ASP | 0.386 | | | | |
| 8 | Ape. Stop | Plano | | 0.377 | | | | |
| 9 | Lens 4 | −10.8995 | ASP | 0.265 | Plastic | 1.639 | 23.5 | −13.00 |
| 10 | | 35.1206 | ASP | 0.244 | | | | |
| 11 | Stop | Plano | | −0.180 | | | | |
| 12 | Lens 5 | 5.2814 | ASP | 1.139 | Plastic | 1.544 | 56.0 | 5.74 |
| 13 | | −7.0675 | ASP | 0.498 | | | | |
| 14 | Lens 6 | 22.0473 | ASP | 0.400 | Plastic | 1.639 | 23.5 | −23.67 |
| 15 | | 8.9049 | ASP | 0.485 | | | | |
| 16 | Lens 7 | 3.8699 | ASP | 0.950 | Plastic | 1.544 | 56.0 | 9.65 |
| 17 | | 13.4424 | ASP | 1.591 | | | | |
| 18 | Lens 8 | −21.7391 | ASP | 0.400 | Plastic | 1.660 | 20.4 | −5.06 |
| 19 | | 3.9711 | ASP | 0.400 | | | | |
| 20 | Filter | Plano | | 0.210 | Glass | 1.517 | 64.2 | — |
| 21 | | Plano | | 0.247 | | | | |
| 21 | Image | Plano | | — | | | | |

Reference wavelength is 587.6 nm (d-line).
Effective radius of Surface 5 (stop S1) is 1.89 mm.
Effective radius of Surface 11 (stop S2) is 1.84 mm.

TABLE 8B

Aspheric Coefficients

| Surface # | 6 | 7 | 9 | 10 |
|---|---|---|---|---|
| k= | 3.0109700E+00 | −7.4414600E+00 | 9.1285700E+00 | 9.9000000E+01 |
| A4= | −1.2235981E−02 | −1.5430425E−02 | −2.7566489E−02 | −2.0946650E−02 |
| A6= | 3.8384272E−03 | 4.2920832E−05 | −9.4903502E−05 | −3.0128721E−02 |
| A8= | −5.6238145E−03 | −6.2831028E−05 | −3.8324401E−02 | 3.7825002E−02 |
| A10= | 5.8501269E−03 | 8.0138451E−04 | 1.2370032E−02 | −2.4120589E−02 |
| A12= | −3.5951430E−03 | −6.9200471E−04 | −2.1711595E−01 | 1.0343827E−02 |
| A14= | 1.3380112E−03 | 6.7122636E−04 | 2.4576825E−01 | −3.8112429E−03 |
| A16= | −2.6636891E−04 | −5.6080946E−04 | −1.8171482E−01 | 1.3269820E−03 |
| A18= | 1.2651927E−05 | 2.7356490E−04 | 8.4228282E−02 | −3.3443406E−04 |
| A20= | 4.5612712E−06 | −6.9200949E−05 | −2.2130804E−02 | 3.9395694E−05 |
| A22= | −6.1388182E−07 | 7.1229001E−06 | 2.5087468E−03 | −4.0085267E−07 |

| Surface # | 12 | 13 | 14 | 15 |
|---|---|---|---|---|
| k= | −2.2088000E+01 | 2.3437400E+00 | 1.1703500E+01 | 2.7592600E+00 |
| A4= | 1.5609191E−02 | −1.5421359E−02 | −4.6193414E−02 | −5.1727531E−02 |
| A6= | −2.9708183E−02 | 3.5687464E−04 | 2.1279104E−02 | 2.9221099E−02 |
| A8= | 3.4556389E−02 | 1.4441940E−03 | −2.5021382E−02 | −2.3787791E−02 |
| A10= | −2.4682100E−02 | −2.0964696E−03 | 2.4018510E−02 | 1.6870045E−02 |
| A12= | 1.1880950E−02 | 1.6311668E−03 | −1.6943856E−02 | −9.1101296E−03 |
| A14= | −3.9379572E−03 | −6.6585504E−04 | 8.5965298E−03 | 3.6509725E−03 |
| A16= | 8.8317659E−04 | 1.5006859E−04 | −3.0112376E−03 | −1.0457365E−03 |
| A18= | −1.2756983E−04 | −1.8626134E−05 | 7.0804972E−04 | 2.0737639E−04 |
| A20= | 1.0690509E−05 | 1.1510608E−06 | −1.0875520E−04 | −2.7593278E−05 |
| A22= | −3.9463785E−07 | −2.4327181E−08 | 1.0381240E−05 | 2.3430802E−06 |
| A24= | | | −5.5308964E−07 | −1.1451209E−07 |
| A26= | | | 1.2385309E−08 | 2.4467656E−09 |

| Surface # | 16 | 17 | 18 | 19 |
|---|---|---|---|---|
| k= | −3.2601500E−01 | 1.7194200E+00 | −9.9000000E+01 | −6.8737300E−01 |
| A4= | −2.8349102E−02 | −5.3862531E−03 | −7.7881235E−02 | −7.3025684E−02 |
| A6= | 1.2174763E−02 | 1.6752151E−03 | 2.5178695E−02 | 2.5941935E−02 |
| A8= | −7.1747901E−03 | −1.1317149E−03 | −5.9011640E−03 | −7.6331979E−03 |

US 12,693,502 B2

49

50

TABLE 8B-continued

| | | Aspheric Coefficients | | |
|---|---|---|---|---|
| A10= | 3.5839117E−03 | 5.2064700E−04 | 2.0930137E−04 | 1.6420114E−03 |
| A12= | −1.3694503E−03 | −1.6780584E−04 | 4.6825091E−04 | −2.5394063E−04 |
| A14= | 3.8176193E−04 | 3.7302538E−05 | −2.0080341E−04 | 2.8047841E−05 |
| A16= | −7.6611381E−05 | −5.9397383E−06 | 4.6142211E−05 | −2.1728418E−06 |
| A18= | 1.0995109E−05 | 7.2223832E−07 | −6.9036564E−06 | 1.1331873E−07 |
| A20= | −1.1145716E−06 | −7.1126159E−08 | 7.0307101E−07 | −3.5970225E−09 |
| A22= | 7.7660277E−08 | 5.6298841E−09 | −4.8579691E−08 | 4.6594289E−11 |
| A24= | −3.5251797E−09 | −3.2471338E−10 | 2.1864040E−09 | 9.0400536E−13 |
| A26= | 9.3505052E−11 | 1.1531121E−11 | −5.7926792E−11 | −4.1456807E−14 |
| A28= | −1.0958706E−12 | −1.8304379E−13 | 6.8597288E−13 | 4.4275261E−16 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 8A and Table 8B as the following values and satisfy the following conditions in Table 8C:

TABLE 8C

| 8th Embodiment | | | |
|---|---|---|---|
| f [mm] | 5.39 | (R3 − R4)/(R3 + R4) | −1.87 |
| Fno | 2.22 | R10/R13 | −1.83 |
| HFOV [deg.] | 43.4 | Dr1r4/Dr11r16 | 1.70 |
| FOV [deg.] | 86.8 | CT4/CT5 | 0.23 |
| TL/ImgH | 2.93 | CT5/CT3 | 2.07 |
| SD/TD | 0.44 | CT5/T78 | 0.72 |
| T12/f | 0.51 | T56/CT5 | 0.44 |
| T12/BL | 3.22 | N2 | 1.720 |
| \|f2/f1\| | 0.64 | V8 | 20.4 |
| \|f5/f3\| | 0.02 | V3/V4 | 2.4 |
| \|f/R10\| | 0.76 | V3/V6 | 2.4 |
| \|f/R9\| + \|f/R10\| | 1.78 | Y1R1/Y8R2 | 1.28 |
| (\|f/f3\| + \|f/f6\|)/(\|f/f4\| + \|f/f5\|) | 0.18 | Y5R1/ImgH | 0.38 |
| (R1 − R9)/(R1 + R9) | 0.22 | SAG1R2/CT1 | 1.50 |
| (R1 − R16)/(R1 + R16) | 0.35 | | |

9th Embodiment

Figure 17:
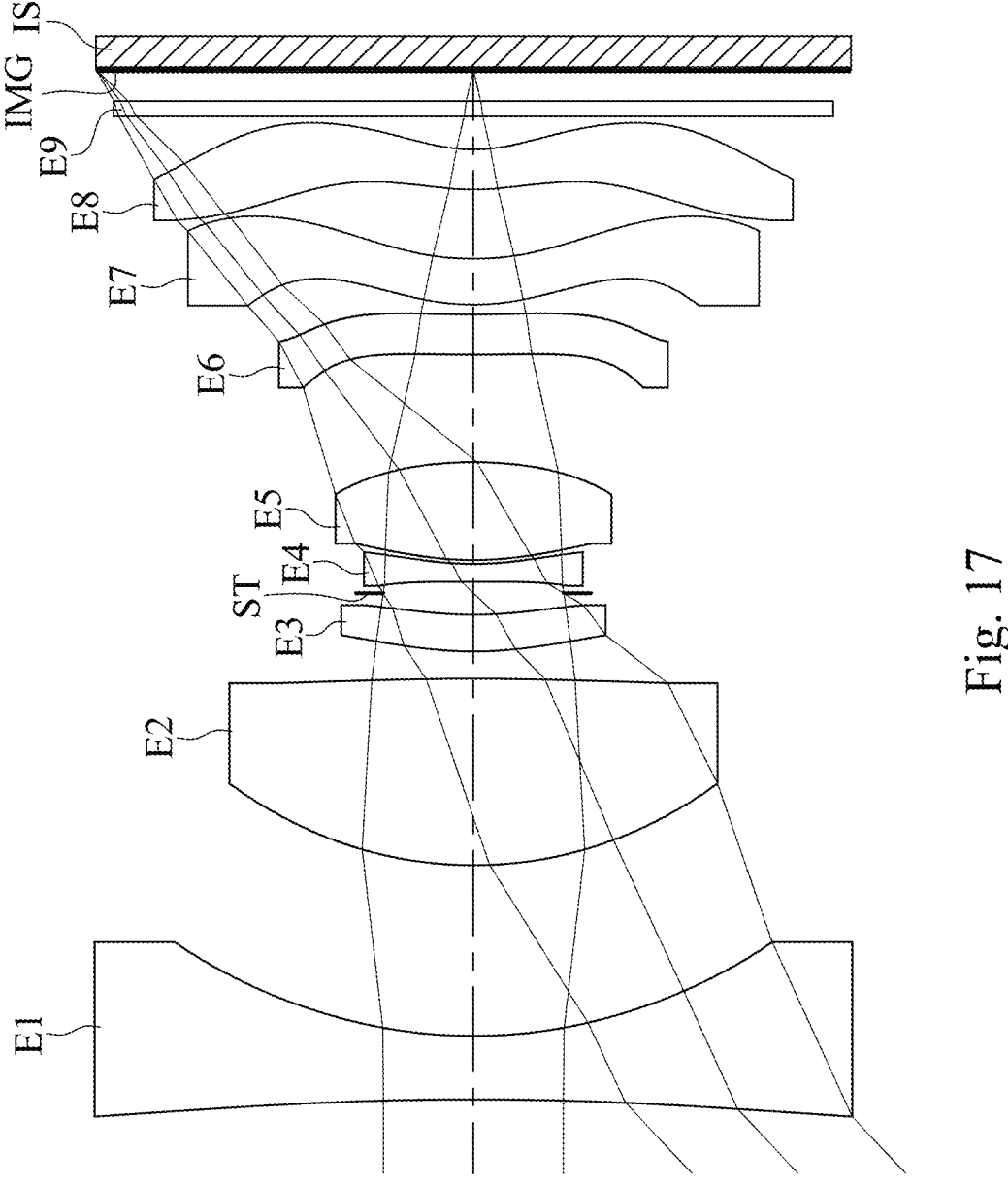
FIG. 17 is a schematic view of an imaging apparatus according to the 9th embodiment of the present disclosure.
Figure 18:
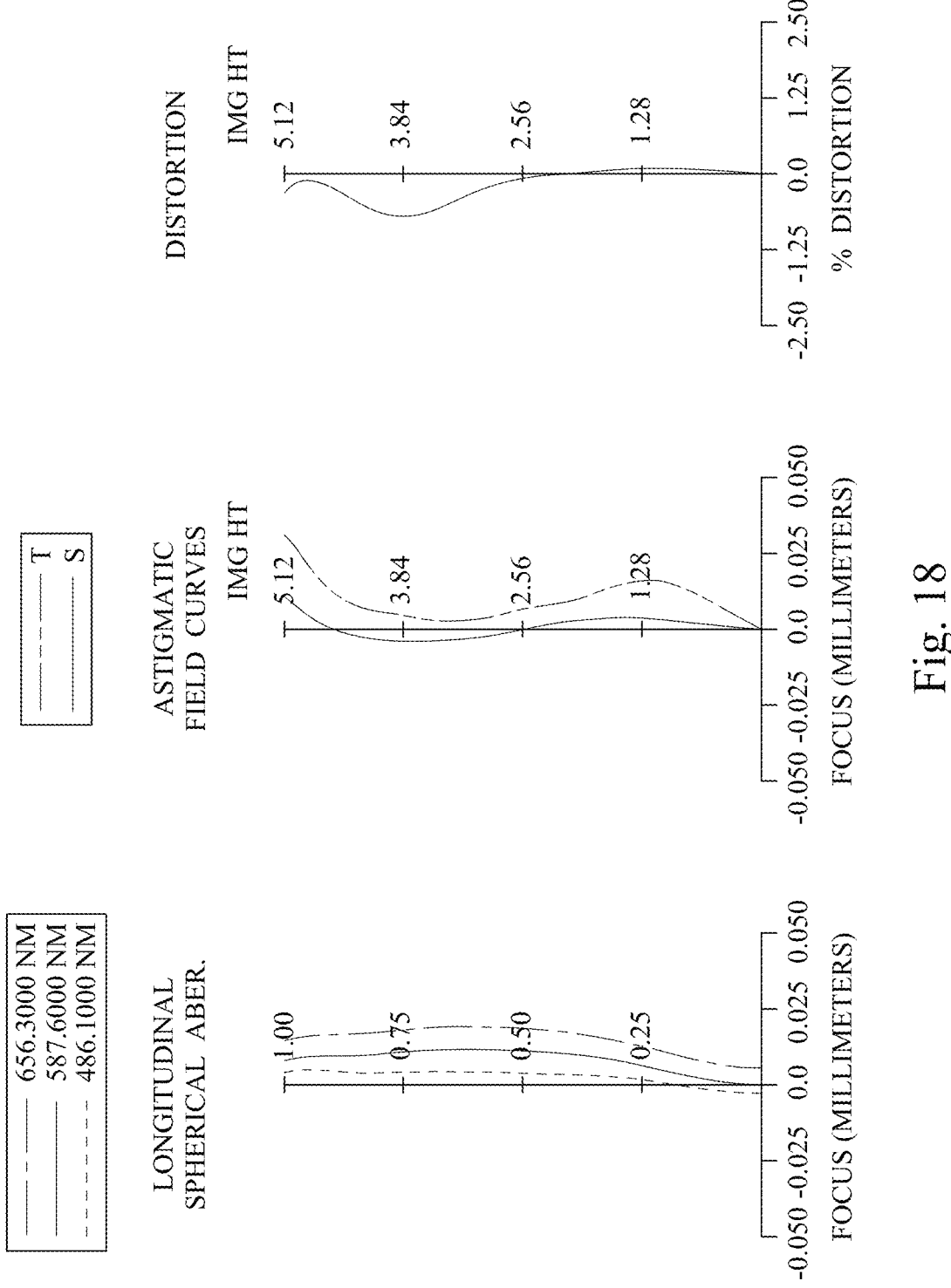
FIG. 18 shows spherical aberration curves, astigmatic field curves and a distortion curve of the imaging apparatus according to the 9th embodiment.

FIG. 17 is a schematic view of an imaging apparatus 9 according to the 9th embodiment of the present disclosure. FIG. 18 shows spherical aberration curves, astigmatic field curves and a distortion curve of the imaging apparatus 9 according to the 9th embodiment. In FIG. 17, the imaging apparatus 9 includes an image capturing system lens assembly (its reference numeral is omitted) and an image sensor IS. The image capturing system lens assembly includes, in order from an object side to an image side along an optical path, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being concave in a paraxial region thereof and an image-side surface being concave in a paraxial region thereof. The first lens element E1 is made of a glass material, and has the object-side surface and the image-side surface being both aspheric. Furthermore, the object-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both aspheric. Furthermore, the image-side surface of the second lens element E2 includes one inflection point.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the image-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point and one critical point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes one inflection point and one critical point, and the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes two inflection points and one critical point, and the image-side surface of the seventh lens element E7 includes one inflection point and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes three inflection points and one critical point, and the image-side surface of the eighth lens element E8 includes three inflection points and one critical point.

The filter E9 is made of a glass material, which is located between the eighth lens element E8 and the image surface IMG in order, and will not affect the focal length of the image capturing system lens assembly.

The detailed optical data of the 9th embodiment are shown in Table 9A and the aspheric surface data are shown in Table 9B below.

TABLE 9A

| 9th Embodiment f = 5.45 mm, Fno = 2.23, HFOV = 43.2 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −45.4545 | ASP | 0.864 | Glass | 1.547 | 62.7 | −10.88 |
| 2 | | 6.8902 | ASP | 2.319 | | | | |
| 3 | Lens 2 | 5.4364 | ASP | 2.533 | Glass | 1.734 | 51.5 | 6.78 |
| 4 | | −47.0666 | ASP | 0.370 | | | | |
| 5 | Lens 3 | 5.0380 | ASP | 0.501 | Plastic | 1.544 | 56.0 | 70.44 |
| 6 | | 5.5973 | ASP | 0.292 | | | | |
| 7 | Ape. Stop | Plano | | 0.155 | | | | |
| 8 | Lens 4 | 88.4851 | ASP | 0.243 | Plastic | 1.639 | 23.5 | −6.51 |
| 9 | | 3.9646 | ASP | 0.052 | | | | |
| 10 | Lens 5 | 4.2514 | ASP | 1.331 | Plastic | 1.544 | 56.0 | 4.65 |
| 11 | | −5.5707 | ASP | 1.460 | | | | |
| 12 | Lens 6 | 25.7812 | ASP | 0.547 | Plastic | 1.614 | 25.6 | −46.18 |
| 13 | | 13.3962 | ASP | 0.134 | | | | |
| 14 | Lens 7 | 3.2621 | ASP | 0.624 | Plastic | 1.544 | 56.0 | 22.60 |
| 15 | | 4.1410 | ASP | 0.938 | | | | |
| 16 | Lens 8 | 3.5912 | ASP | 0.544 | Plastic | 1.587 | 28.3 | −10.09 |
| 17 | | 2.1110 | ASP | 0.450 | | | | |
| 18 | Filter | Plano | | 0.210 | Glass | 1.517 | 64.2 | — |
| 19 | | Plano | | 0.426 | | | | |
| 20 | Image | Plano | | — | | | | |

Reference wavelength is 587.6 nm (d-line).

TABLE 9B

| Aspheric Coefficients | | | | |
|---|---|---|---|---|
| Surface # | 1 | 2 | 3 | 4 |
| k= | 0.0000000E+00 | 0.0000000E+00 | 0.0000000E+00 | 0.0000000E+00 |
| A4= | 6.8731756E−04 | 8.7931041E−04 | 2.1202455E−04 | 3.1490020E−04 |
| A6= | −1.6938832E−04 | −2.9131138E−04 | −5.1351906E−05 | −9.1084131E−05 |
| A8= | 1.9366416E−05 | 2.7638015E−05 | −2.5573473E−06 | 3.2092109E−05 |
| A10= | −1.2196524E−06 | −8.8307653E−07 | 1.8428041E−06 | −5.3444623E−06 |
| A12= | 4.7016183E−08 | −1.0710732E−08 | −2.1728380E−07 | 4.6830155E−07 |
| A14= | −1.1309393E−09 | 8.0298668E−10 | 7.7816422E−09 | −1.3860065E−08 |
| A16= | 1.5844855E−11 | | | |
| A18= | −9.9055051E−14 | | | |

| Surface # | 5 | 6 | 8 | 9 |
|---|---|---|---|---|
| k= | 0.0000000E+00 | 0.0000000E+00 | 0.0000000E+00 | 2.5780400E+00 |
| A4= | −1.1019132E−02 | −1.3740838E−02 | −3.8596286E−02 | −7.3683649E−02 |
| A6= | −5.9642920E−04 | −4.2278809E−04 | 3.5437709E−02 | 8.1810547E−02 |
| A8= | −8.9845444E−06 | −7.5524714E−04 | −4.3132662E−02 | −8.8024178E−02 |
| A10= | 7.9219466E−05 | 4.2225864E−04 | 3.3351910E−02 | 5.9999480E−02 |
| A12= | 1.9334229E−05 | 3.0690476E−05 | −1.6169166E−02 | −2.5215920E−02 |
| A14= | −4.8942870E−06 | −2.5835470E−05 | 4.4622721E−03 | 5.9096628E−03 |
| A16= | | | −5.3711772E−04 | −5.9246464E−04 |

| Surface # | 10 | 11 | 12 | 13 |
|---|---|---|---|---|
| k= | −2.3663900E+01 | −1.0000000E+00 | 0.0000000E+00 | 1.8040300E+01 |
| A4= | −4.4459008E−03 | −9.9071891E−03 | −1.7725824E−02 | −2.8691568E−02 |
| A6= | 3.2004569E−02 | −4.3018582E−04 | 9.1940854E−03 | 8.0861006E−03 |
| A8= | −3.9582243E−02 | 6.5183130E−04 | −8.5235813E−03 | −3.7983299E−03 |

TABLE 9B-continued

| | | Aspheric Coefficients | | |
|---|---|---|---|---|
| A10= | 2.6124527E−02 | −4.8164244E−04 | 4.5056725E−03 | 1.5541855E−03 |
| A12= | −1.0037691E−02 | 2.0153484E−04 | −1.6160005E−03 | −4.9196246E−04 |
| A14= | 2.0967352E−03 | −4.2291435E−05 | 3.7249035E−04 | 1.0150972E−04 |
| A16= | −1.8430542E−04 | 3.4231679E−06 | −5.2322498E−05 | −1.2385736E−05 |
| A18= | | | 4.0818669E−06 | 8.1802595E−07 |
| A20= | | | −1.3514072E−07 | −2.2693819E−08 |

| Surface # | 14 | 15 | 16 | 17 |
|---|---|---|---|---|
| k= | −1.9905200E−01 | −1.1002700E+00 | −1.2803000E+01 | −8.4090200E−01 |
| A4= | −7.4907519E−03 | 2.1695616E−02 | −2.7666010E−02 | −7.5916846E−02 |
| A6= | −1.1053103E−02 | −1.6544237E−02 | −3.4160475E−03 | 1.7373479E−02 |
| A8= | 5.2336243E−03 | 5.1034416E−03 | 4.5846148E−03 | −3.5154895E−03 |
| A10= | −1.8260823E−03 | −1.0424340E−03 | −1.7024347E−03 | 5.7545360E−04 |
| A12= | 5.0522101E−04 | 1.4902914E−04 | 3.7947161E−04 | −7.5487977E−05 |
| A14= | −1.0809164E−04 | −1.5091084E−05 | −5.6205610E−05 | 7.6693234E−06 |
| A16= | 1.6661544E−05 | 1.0789415E−06 | 5.7052231E−06 | −5.7704904E−07 |
| A18= | −1.7290821E−06 | −5.3521447E−08 | −3.9882107E−07 | 3.0160373E−08 |
| A20= | 1.1261972E−07 | 1.7676229E−09 | 1.8888350E−08 | −9.5694509E−10 |
| A22= | −4.1148456E−09 | −3.5343963E−11 | −5.7921985E−10 | 9.9982213E−12 |
| A24= | 6.3861283E−11 | 3.2728908E−13 | 1.0383093E−11 | 4.4951096E−13 |
| A26= | | | −8.2652273E−14 | −1.7914153E−14 |
| A28= | | | | 2.0043841E−16 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 9A and Table 9B as the following values and satisfy the following conditions in Table 9C:

TABLE 9C

| | 9th Embodiment | | |
|---|---|---|---|
| f [mm] | 5.45 | (R3 − R4)/(R3 + R4) | −1.26 |
| Fno | 2.23 | R10/R13 | −1.71 |
| HFOV [deg.] | 43.2 | Dr1r4/Dr11r16 | 2.05 |
| FOV [deg.] | 86.4 | CT4/CT5 | 0.18 |
| TL/ImgH | 2.73 | CT5/CT3 | 2.66 |
| SD/TD | 0.47 | CT5/T78 | 1.42 |
| T12/f | 0.43 | T56/CT5 | 1.10 |
| T12/BL | 2.13 | N2 | 1.734 |
| \|f2/f1\| | 0.62 | V8 | 28.3 |
| \|f5/f3\| | 0.07 | V3/V4 | 2.4 |
| \|f/R10\| | 0.98 | V3/V6 | 2.2 |
| \|f/R9\| + \|f/R10\| | 2.26 | Y1R1/Y8R2 | 1.19 |
| (\|f/f3\| + \|f/f6\|)/(\|f/f4\| + \|f/f5\|) | 0.10 | Y5R1/ImgH | 0.31 |
| (R1 − R9)/(R1 + R9) | 1.21 | SAG1R2/CT1 | 1.47 |
| (R1 − R16)/(R1 + R16) | 1.10 | | |

10th Embodiment

Figure 19:
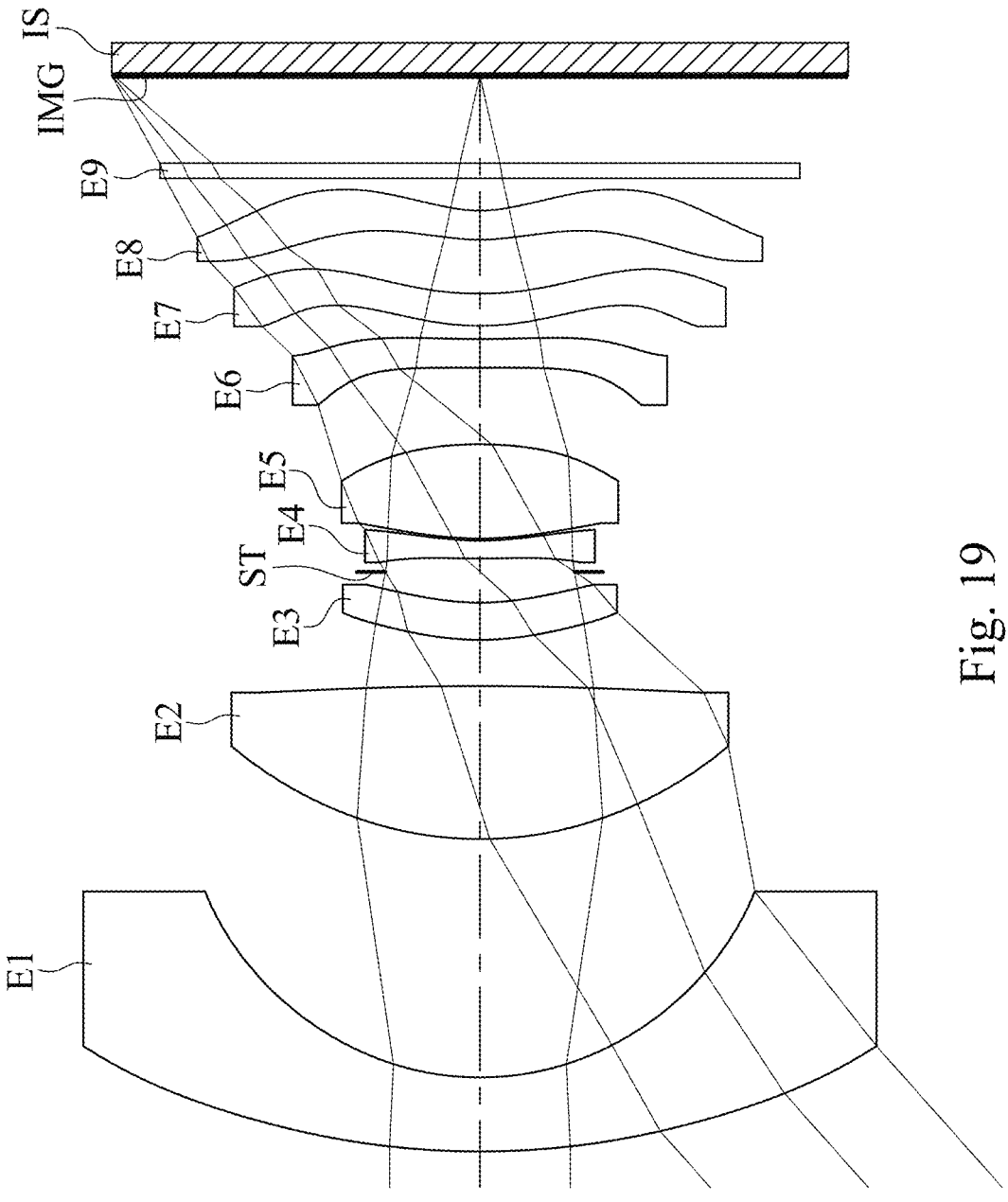
FIG. 19 is a schematic view of an imaging apparatus according to the 10th embodiment of the present disclosure.
Figure 20:
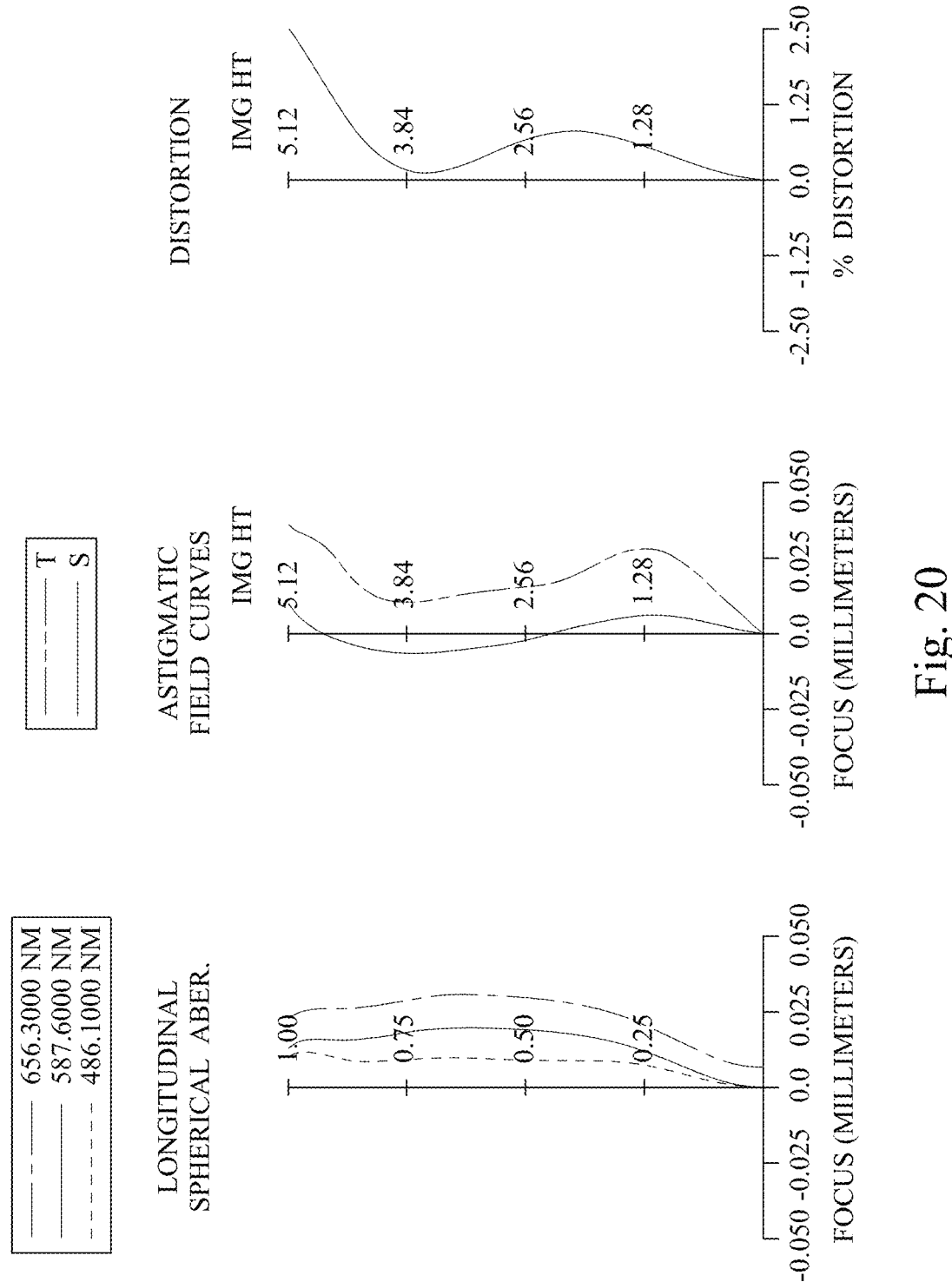
FIG. 20 shows spherical aberration curves, astigmatic field curves and a distortion curve of the imaging apparatus according to the 10th embodiment.

FIG. 19 is a schematic view of an imaging apparatus 10 according to the 10th embodiment of the present disclosure. FIG. 20 shows spherical aberration curves, astigmatic field curves and a distortion curve of the imaging apparatus 10 according to the 10th embodiment. In FIG. 19, the imaging apparatus 10 includes an image capturing system lens assembly (its reference numeral is omitted) and an image sensor IS. The image capturing system lens assembly includes, in order from an object side to an image side along an optical path, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both aspheric. Furthermore, the image-side surface of the second lens element E2 includes one inflection point.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point and one critical point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes one inflection point.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes one inflection point and one critical point, and the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes three inflection points and one critical point, and the and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes three inflection points and one critical point, and the image-side surface of the eighth lens element E8 includes three inflection points and one critical point.

The filter E9 is made of a glass material, which is located between the eighth lens element E8 and the image surface IMG in order, and will not affect the focal length of the image capturing system lens assembly.

The detailed optical data of the 10th embodiment are shown in Table 10A and the aspheric surface data are shown in Table 10B below.

TABLE 10A

10th Embodiment
f = 5.61 mm, Fno = 2.23, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.8411 | ASP | 1.032 | Glass | 1.699 | 30.0 | −9.43 |
| 2 | | 4.0813 | ASP | 3.320 | | | | |
| 3 | Lens 2 | 5.1552 | ASP | 2.131 | Glass | 1.754 | 37.5 | 6.24 |
| 4 | | −43.7581 | ASP | 0.645 | | | | |
| 5 | Lens 3 | 4.0615 | ASP | 0.518 | Plastic | 1.544 | 56.0 | −136.83 |
| 6 | | 3.6783 | ASP | 0.429 | | | | |
| 7 | Ape. Stop | Plano | | 0.187 | | | | |
| 8 | Lens 4 | 22.3296 | ASP | 0.249 | Plastic | 1.669 | 19.5 | −7.61 |
| 9 | | 4.1262 | ASP | 0.027 | | | | |
| 10 | Lens 5 | 4.3326 | ASP | 1.314 | Plastic | 1.544 | 56.0 | 4.62 |
| 11 | | −5.3460 | ASP | 1.067 | | | | |
| 12 | Lens 6 | 83.6793 | ASP | 0.400 | Plastic | 1.669 | 19.5 | −25.00 |
| 13 | | 13.9152 | ASP | 0.184 | | | | |
| 14 | Lens 7 | 3.7655 | ASP | 0.450 | Plastic | 1.544 | 56.0 | 22.47 |
| 15 | | 5.2124 | ASP | 0.750 | | | | |
| 16 | Lens 8 | 3.0543 | ASP | 0.405 | Plastic | 1.566 | 37.4 | −12.43 |
| 17 | | 2.0279 | ASP | 0.450 | | | | |
| 18 | Filter | Plano | | 0.210 | Glass | 1.517 | 64.2 | — |
| 19 | | Plano | | 1.223 | | | | |
| 20 | Image | Plano | | — | | | | |

Reference wavelength is 587.6 nm (d-line).

TABLE 10B

Aspheric Coefficients

| Surface # | 1 | 2 | 3 | 4 |
|---|---|---|---|---|
| k= | 0.0000000E+00 | 0.0000000E+00 | 0.0000000E+00 | 0.0000000E+00 |
| A4= | 1.0295131E−03 | 1.7410564E−03 | 2.9981556E−04 | 5.7877507E−04 |
| A6= | −1.6652840E−04 | −3.0451040E−04 | −4.5050075E−05 | −1.2558588E−04 |
| A8= | 1.1738241E−05 | 1.3782914E−05 | −6.8762802E−06 | 1.3304806E−05 |
| A10= | −4.4322718E−07 | 1.4330725E−08 | 1.0409346E−06 | −8.1759269E−07 |
| A12= | 9.8461478E−09 | −2.6683109E−08 | −1.7939262E−08 | 2.3837000E−08 |
| A14= | −1.2415112E−10 | 2.1940917E−09 | −7.6438793E−09 | 1.3954473E−09 |
| A16= | 7.1170052E−13 | −8.8726544E−11 | 4.8809243E−10 | 4.3023105E−11 |

| Surface # | 5 | 6 | 8 | 9 |
|---|---|---|---|---|
| k= | 0.0000000E+00 | 0.0000000E+00 | 0.0000000E+00 | 2.7568900E+00 |
| A4= | −1.0978103E−02 | −1.7522056E−02 | −3.3839875E−02 | −7.2678583E−02 |

TABLE 10B-continued

| Aspheric Coefficients | | | | |
|---|---|---|---|---|
| A6= | 8.2600461 E−05 | −1.5026195E−03 | 1.7984316E−02 | 7.5540470E−02 |
| A8= | −2.1645488E−04 | 7.1701439E−04 | −2.1393637E−02 | −7.7294034E−02 |
| A10= | 1.9366282E−04 | −3.6085398E−04 | 1.5045818E−02 | 4.8492756E−02 |
| A12= | −3.1404635E−05 | 2.1579829E−04 | −6.3093137E−03 | −1.8222172E−02 |
| A14= | 3.9422371E−06 | −3.0812560E−05 | 1.4700701E−03 | 3.7770324E−03 |
| A16= | | | −1.4682162E−04 | −3.3569274E−04 |

| Surface # | 10 | 11 | 12 | 13 |
|---|---|---|---|---|
| k= | −3.2141900E+01 | −1.0000000E+00 | 0.0000000E+00 | 2.3397000E+01 |
| A4= | −4.9089180E−03 | −1.3221875E−02 | −2.3562096E−02 | −3.1289905E−02 |
| A6= | 3.4975187E−02 | 5.5461371E−04 | 1.4800472E−02 | 1.8285810E−02 |
| A8= | −4.4322031E−02 | −8.0445557E−04 | −1.3159561E−02 | −1.1600776E−02 |
| A10= | 2.8271749E−02 | 4.8821574E−04 | 6.2134544E−03 | 4.7793229E−03 |
| A12= | −1.0190700E−02 | −1.5402644E−04 | −1.8633015E−03 | −1.3249006E−03 |
| A14= | 1.9822554E−03 | 2.3962599E−05 | 3.3655295E−04 | 2.4074999E−04 |
| A16= | −1.6240657E−04 | −9.4647816E−07 | −3.1914269E−05 | −2.6911816E−05 |
| A18= | | | 1.1224746E−06 | 1.6730020E−06 |
| A20= | | | 1.0748618E−08 | −4.4558188E−08 |

| Surface # | 14 | 15 | 16 | 17 |
|---|---|---|---|---|
| k= | 6.5342900E−02 | −2.3420800E+00 | −1.0164900E+01 | −8.4928900E−01 |
| A4= | −3.7410021E−03 | 2.7291274E−02 | −3.9634243E−02 | −1.0023642E−01 |
| A6= | −1.1594056E−02 | −2.1987969E−02 | 4.2561019E−03 | 3.1928611E−02 |
| A8= | 4.3413710E−03 | 7.6398569E−03 | 1.9744829E−03 | −1.0095780E−02 |
| A10= | −1.0782878E−03 | −1.8067880E−03 | −1.2631616E−03 | 2.7274695E−03 |
| A12= | 2.1781004E−04 | 3.1380616E−04 | 3.7465111E−04 | −5.9419043E−04 |
| A14= | −4.1004550E−05 | −4.1459804E−05 | −6.9434571E−05 | 1.0017427E−04 |
| A16= | 6.5781303E−06 | 4.1728248E−06 | 8.5745785E−06 | −1.2692558E−05 |
| A18= | −7.7413109E−07 | −3.1009154E−07 | −7.1736393E−07 | 1.1809987E−06 |
| A20= | 6.0404103E−08 | 1.5917515E−08 | 4.0238082E−08 | −7.8755006E−08 |
| A22= | −2.7653997E−09 | −4.9744854E−10 | −1.4513738E−09 | 3.6389563E−09 |
| A24= | 5.5599980E−11 | 7.0254245E−12 | 3.0461454E−11 | −1.1014257E−10 |
| A26= | | | −2.8301941E−13 | 1.9577389E−12 |
| A28= | | | | −1.5449354E−14 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 10A and Table 10B as the following values and satisfy the following conditions in Table 10C:

TABLE 10C

| 10th Embodiment | | | |
|---|---|---|---|
| f [mm] | 5.61 | (R3 − R4)/(R3 + R4) | −1.27 |
| Fno | 2.23 | R10/R13 | −1.42 |
| HFOV [deg.] | 41.6 | Dr1r4/Dr11r16 | 2.96 |
| FOV [deg.] | 83.2 | CT4/CT5 | 0.19 |
| TL/ImgH | 2.93 | CT5/CT3 | 2.54 |
| SD/TD | 0.38 | CT5/T78 | 1.75 |
| T12/f | 0.59 | T56/CT5 | 0.81 |
| T12/BL | 1.76 | N2 | 1.754 |
| \|f2/f1\| | 0.66 | V8 | 37.4 |
| \|f5/f3\| | 0.03 | V3/V4 | 2.9 |
| \|f/R10\| | 1.05 | V3/V6 | 2.9 |
| \|f/R9\| + \|f/R10\| | 2.34 | Y1R1/Y8R2 | 1.40 |
| (\|f/f3\| + \|f/f6\|)/(\|f/f4\| + \|f/f5\|) | 0.14 | Y5R1/ImgH | 0.33 |
| (R1 − R9)/(R1 + R9) | 0.46 | SAG1R2/CT1 | 2.51 |
| (R1 − R16)/(R1 + R16) | 0.71 | | |

11th Embodiment

Figure 21:
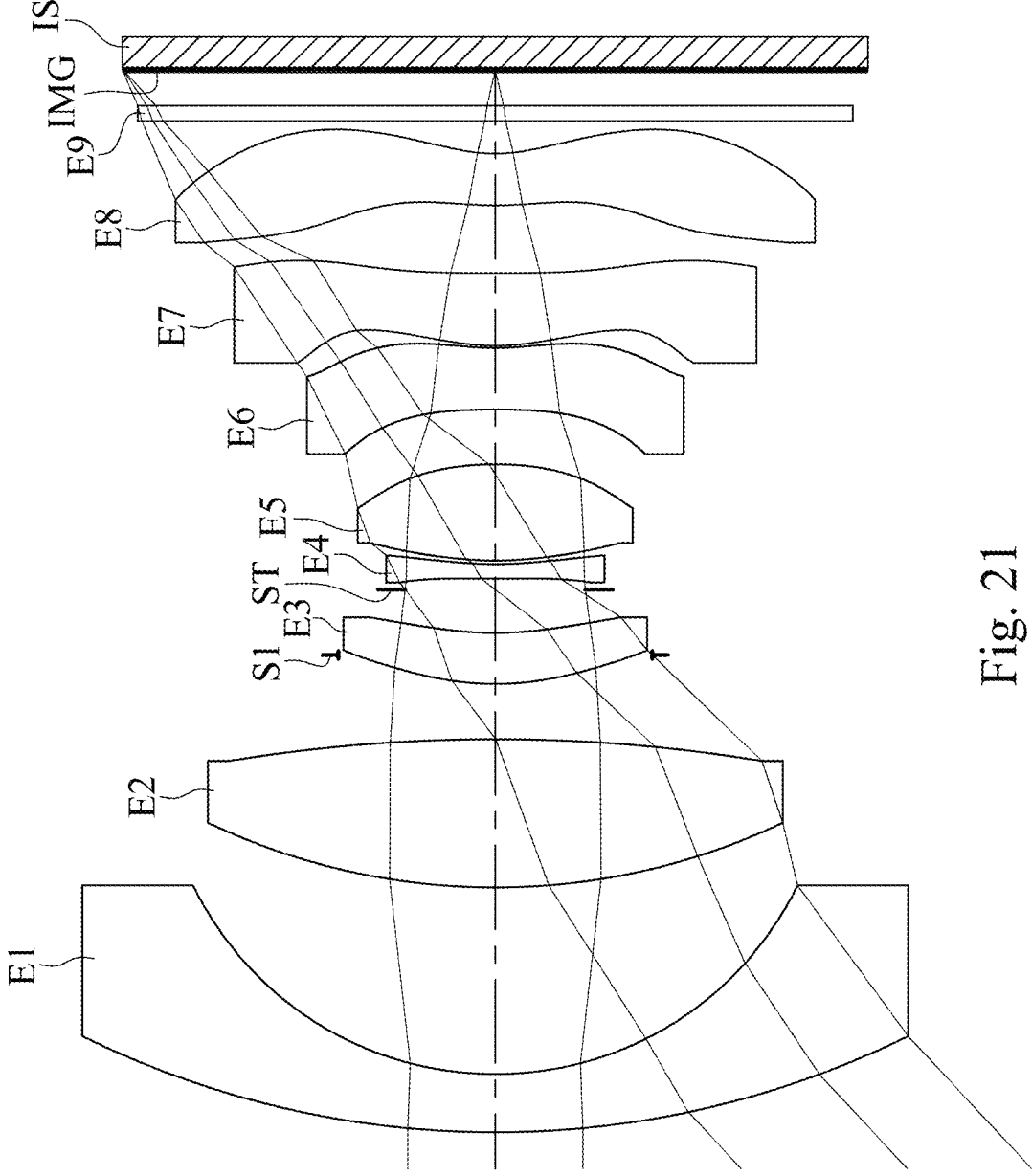
FIG. 21 is a schematic view of an imaging apparatus according to the 11th embodiment of the present disclosure.

FIG. 21 is a schematic view of an imaging apparatus 11 according to the 11th embodiment of the present disclosure.

Figure 22:
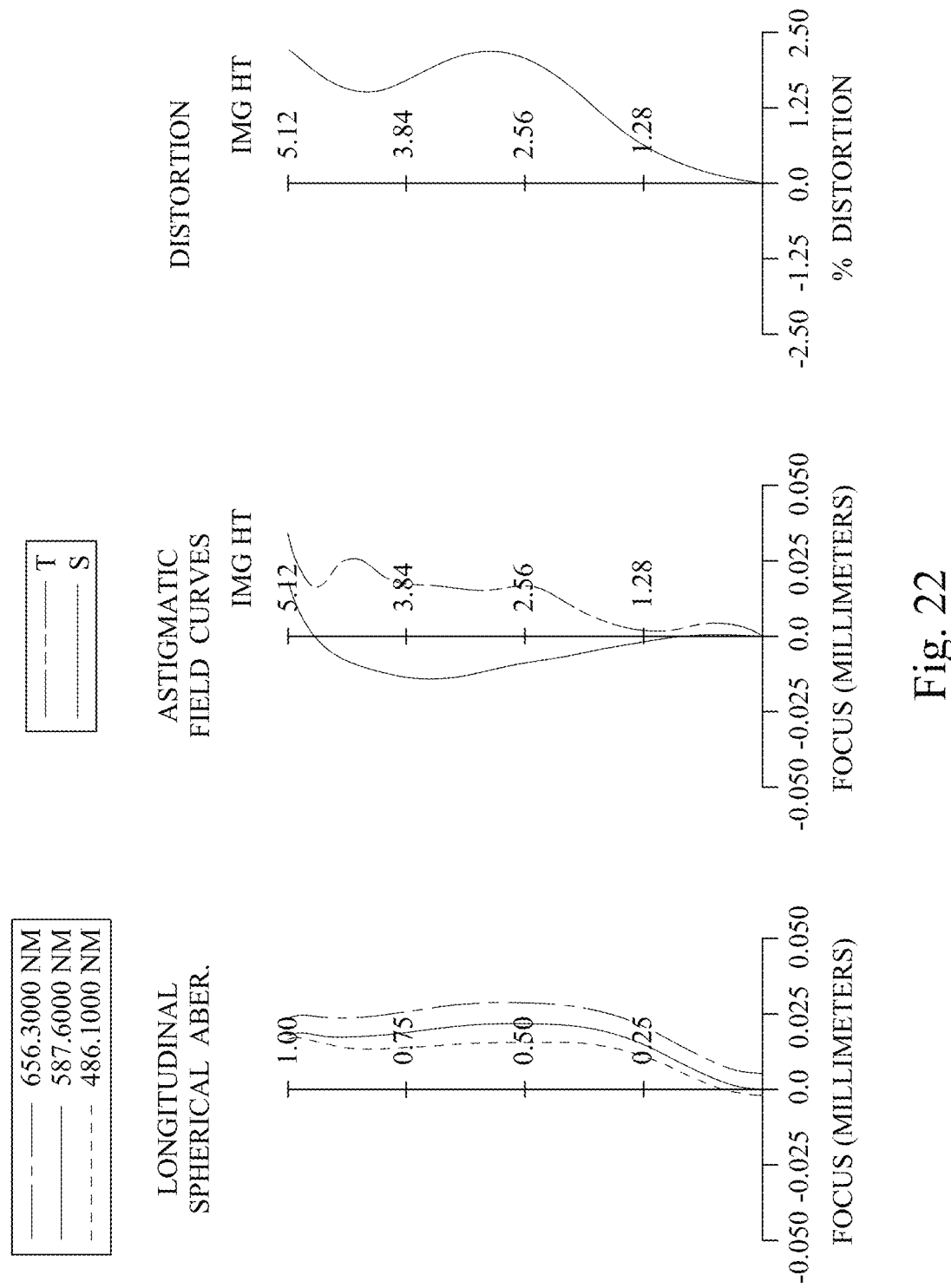
FIG. 22 shows spherical aberration curves, astigmatic field curves and a distortion curve of the imaging apparatus according to the 11th embodiment.

FIG. 22 shows spherical aberration curves, astigmatic field curves and a distortion curve of the imaging apparatus 11 according to the 11th embodiment. In FIG. 21, the imaging apparatus 11 includes an image capturing system lens assembly (its reference numeral is omitted) and an image sensor IS. The image capturing system lens assembly includes, in order from an object side to an image side along an optical path, a first lens element E1, a second lens element E2, a stop S1, a third lens element E3, an aperture stop ST, a fourth lens element E4, a fifth lens element E5, a sixth lens element E6, a seventh lens element E7, an eighth lens element E8, a filter E9 and an image surface IMG, wherein the image sensor IS is disposed on the image surface IMG of the image capturing system lens assembly. The image capturing system lens assembly includes eight lens elements (E1, E2, E3, E4, E5, E6, E7, E8) without additional one or more lens elements inserted between the first lens element E1 and the eighth lens element E8.

The first lens element E1 with negative refractive power has an object-side surface being convex in a paraxial region thereof and an image-side surface being concave in a paraxial region thereof. The first lens element E1 is made of a glass material, and has the object-side surface and the image-side surface being both spherical.

The second lens element E2 with positive refractive power has an object-side surface being convex in a paraxial region thereof and an image-side surface being convex in a paraxial region thereof. The second lens element E2 is made of a glass material, and has the object-side surface and the image-side surface being both spherical.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the image-side surface of the third lens element E3 includes two inflection points.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point and one critical point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the image-side surface of the fifth lens element E5 includes one inflection point.

The sixth lens element E6 with negative refractive power has an object-side surface being concave in a paraxial region thereof and an image-side surface being concave in a paraxial region thereof. The sixth lens element E6 is made of a plastic material, and has the object-side surface and the image-side surface being both aspheric. Furthermore, the image-side surface of the sixth lens element E6 includes two inflection points and one critical point.

The seventh lens element E7 with positive refractive power has an object-side surface being convex in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes two inflection points and one critical point, and the image-side surface of the seventh lens element E7 includes one inflection point and one critical point.

The eighth lens element E8 with negative refractive power has an object-side surface being convex in a paraxial region thereof and an image-side surface being concave in a paraxial region thereof. The eighth lens element E8 is made of a plastic material, and has the object-side surface and the image-side surface being both aspheric. Furthermore, the object-side surface of the eighth lens element E8 includes three inflection points and one critical point, and the image-side surface of the eighth lens element E8 includes one inflection point and one critical point.

The filter E9 is made of a glass material, which is located between the eighth lens element E8 and the image surface IMG in order, and will not affect the focal length of the image capturing system lens assembly.

The detailed optical data of the 11th embodiment are shown in Table 11A and the aspheric surface data are shown in Table 11B below.

TABLE 11A

| | | | | | | | |
|---|---|---|---|---|---|---|---|
| 11th Embodiment | | | | | | | |
| f = 5.37 mm, Fno = 2.23, HFOV = 42.9 deg. | | | | | | | |
| Surface # | | Curvature Radius | | Thickness | Material | Index | Abbe # | Focal Length |
| 0 | Object | Plano | | Infinity | | | | |
| 1 | Lens 1 | 12.8473 | SPH | 0.800 | Glass | 1.658 | 50.9 | −11.43 |
| 2 | | 4.6276 | SPH | 2.573 | | | | |
| 3 | Lens 2 | 9.2134 | SPH | 2.044 | Glass | 1.755 | 52.3 | 8.91 |
| 4 | | −22.5767 | SPH | 1.161 | | | | |
| 5 | Stop | Plano | | −0.400 | | | | |
| 6 | Lens 3 | 3.9218 | ASP | 0.704 | Plastic | 1.544 | 56.0 | 28.71 |
| 7 | | 4.9053 | ASP | 0.597 | | | | |
| 8 | Ape. Stop | Plano | | 0.150 | | | | |
| 9 | Lens 4 | 34.2256 | ASP | 0.200 | Plastic | 1.587 | 28.3 | −8.92 |
| 10 | | 4.5351 | ASP | 0.049 | | | | |
| 11 | Lens 5 | 4.3096 | ASP | 1.328 | Plastic | 1.544 | 56.0 | 4.16 |
| 12 | | −4.2498 | ASP | 0.755 | | | | |
| 13 | Lens 6 | −10.7628 | ASP | 0.849 | Plastic | 1.660 | 20.4 | −4.39 |
| 14 | | 4.0871 | ASP | 0.030 | | | | |
| 15 | Lens 7 | 2.9981 | ASP | 1.001 | Plastic | 1.639 | 23.5 | 4.90 |
| 16 | | 61.5030 | ASP | 0.934 | | | | |
| 17 | Lens 8 | 4.8109 | ASP | 0.712 | Plastic | 1.587 | 28.3 | −7.55 |
| 18 | | 2.1808 | ASP | 0.450 | | | | |
| 19 | Filter | Plano | | 0.210 | Glass | 1.517 | 64.2 | — |
| 20 | | Plano | | 0.494 | | | | |
| 21 | Image | Plano | | — | | | | |

Reference wavelength is 587.6 nm (d-line).
Effective radius of Surface 5 (stop S1) is 2.16 mm.

TABLE 11B

| | | | | |
|---|---|---|---|---|
| Aspheric Coefficients | | | | |
| Surface # | 6 | 7 | 9 | 10 |
| k= | 0.0000000E+00 | 0.0000000E+00 | 0.0000000E+00 | 3.5740400E+00 |
| A4= | −6.1123504E−03 | −9.8508715E−03 | −4.3107805E−02 | −8.8381364E−02 |

TABLE 11B-continued

| Aspheric Coefficients | | | |
|---|---|---|---|
| A6= | −9.9418325E−04 | −2.2203546E−03 | 4.7403367E−02 | 1.0386692E−01 |
| A8= | 3.4141614E−05 | 5.6684958E−04 | −6.9858554E−02 | −1.1458637E−01 |
| A10= | 2.2200184E−05 | 2.6589735E−06 | 7.0398034E−02 | 8.4304394E−02 |
| A12= | 2.3344050E−06 | | −4.9404592E−02 | −3.9376334E−02 |
| A14= | | | 2.3261463E−02 | 1.1193631E−02 |
| A16= | | | −6.6048898E−03 | −1.7812701E−03 |
| A18= | | | 8.4332307E−04 | 1.2293530E−04 |

| Surface # | 11 | 12 | 13 | 14 |
|---|---|---|---|---|
| k= | −2.7540700E+01 | −1.0000000E+00 | 0.0000000E+00 | 0.0000000E+00 |
| A4= | −1.4358029E−02 | −1.9858843E−02 | −2.9476755E−02 | −8.9812717E−02 |
| A6= | 4.2019503E−02 | 3.5054654E−03 | 3.9883881E−03 | 3.7940253E−02 |
| A8= | −5.1977156E−02 | −3.1296913E−03 | −2.2007585E−03 | −1.9996551E−02 |
| A10= | 3.8751835E−02 | 1.9875874E−03 | 1.7210140E−03 | 8.3724683E−03 |
| A12= | −1.7802379E−02 | −7.4345589E−04 | −8.5837098E−04 | −2.3652922E−03 |
| A14= | 4.9563345E−03 | 1.4460180E−04 | 2.3203885E−04 | 4.2685152E−04 |
| A16= | −7.6632337E−04 | −1.0161087E−05 | −3.1889632E−05 | −4.6951419E−05 |
| A18= | 5.0462431E−05 | | 1.7416848E−06 | 2.8729537E−06 |
| A20= | | | | −7.5126690E−08 |

| Surface # | 15 | 16 | 17 | 18 |
|---|---|---|---|---|
| k= | 0.0000000E+00 | 0.0000000E+00 | 0.0000000E+00 | −1.0000000E+00 |
| A4= | −7.3357962E−02 | 2.5340670E−03 | −8.0146452E−02 | −8.8044019E−02 |
| A6= | 4.2272162E−02 | 1.0977636E−02 | 2.5149477E−02 | 3.0803331E−02 |
| A8= | −2.8259217E−02 | −7.6011018E−03 | −7.3480568E−03 | −9.3877790E−03 |
| A10= | 1.4129815E−02 | 2.6885307E−03 | 1.6340435E−03 | 2.1822330E−03 |
| A12= | −5.2428739E−03 | −6.1674544E−04 | −2.3160527E−04 | −3.7506085E−04 |
| A14= | 1.4192841E−03 | 9.6562259E−05 | 1.8504237E−05 | 4.7149326E−05 |
| A16= | −2.7517454E−04 | −1.0390815E−05 | −4.4453225E−07 | −4.2941102E−06 |
| A18= | 3.6803356E−05 | 7.5554160E−07 | −6.3659106E−08 | 2.7873784E−07 |
| A20= | −3.1898555E−06 | −3.5447095E−08 | 7.4645266E−09 | −1.2518721E−08 |
| A22= | 1.6018620E−07 | 9.6813868E−10 | −3.6988345E−10 | 3.6846711E−10 |
| A24= | −3.5283675E−09 | −1.1689558E−11 | 9.3245542E−12 | −6.3775396E−12 |
| A26= | | | −9.7596655E−14 | 4.9104169E−14 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 11A and Table 11B as the following values and satisfy the following conditions in Table 11C:

TABLE 11C

| 11th Embodiment | | | |
|---|---|---|---|
| f [mm] | 5.37 | (R3 − R4)/(R3 + R4) | −2.38 |
| Fno | 2.23 | R10/R13 | −1.42 |
| HFOV [deg.] | 42.9 | Dr1r4/Dr11r16 | 1.54 |
| FOV [deg.] | 85.8 | CT4/CT5 | 0.15 |
| TL/ImgH | 2.86 | CT5/CT3 | 1.89 |
| SD/TD | 0.45 | CT5/T78 | 1.42 |
| T12/f | 0.48 | T56/CT5 | 0.57 |
| T12/BL | 2.23 | N2 | 1.755 |
| \|f2/f1\| | 0.78 | V8 | 28.3 |
| \|f5/f3\| | 0.14 | V3/V4 | 2.0 |
| \|f/R10\| | 1.26 | V3/V6 | 2.7 |
| \|f/R9\| + \|f/R10\| | 2.51 | Y1R1/Y8R2 | 1.29 |
| (\|f/f3\| + \|f/f6\|)/(\|f/f4\| + \|f/f5\|) | 0.75 | Y5R1/ImgH | 0.34 |
| (R1 − R9)/(R1 + R9) | 0.50 | SAG1R2/CT1 | 3.25 |
| (R1 − R16)/(R1 + R16) | 0.71 | | |

12th Embodiment

Figure 25:
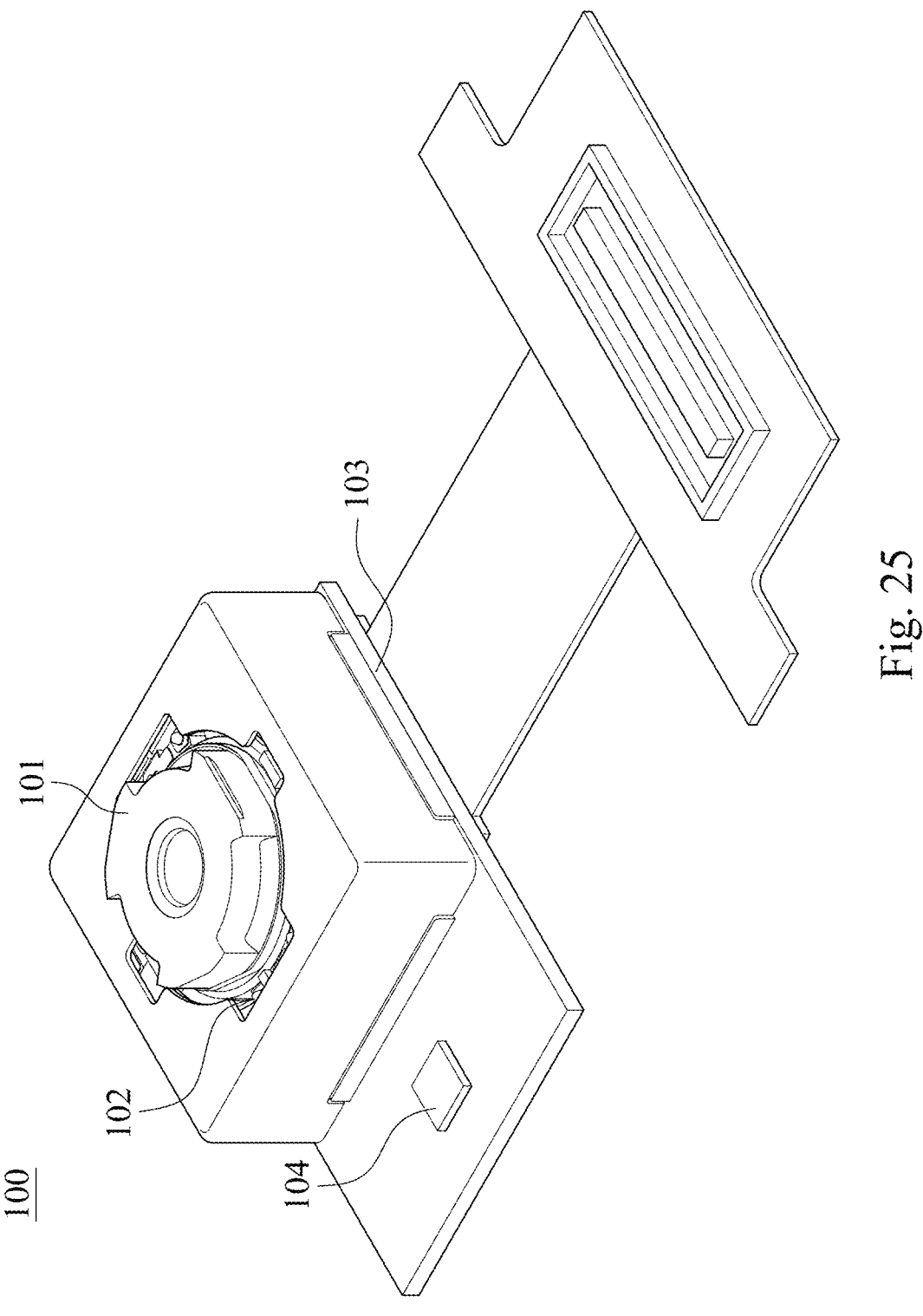
FIG. 25 is a schematic view of an imaging apparatus according to the 12th embodiment of the present disclosure.

FIG. 25 is a schematic view of an imaging apparatus 100 according to the 12th embodiment of the present disclosure.

In FIG. 25, the imaging apparatus 100 of the 12th embodiment is a camera module, the imaging apparatus 100 includes an imaging lens assembly 101, a driving apparatus 102 and an image sensor 103, wherein the imaging lens assembly 101 includes the image capturing system lens assembly of the present disclosure and a lens barrel (not shown in drawings) for carrying the image capturing system lens assembly. The imaging apparatus 100 can focus light from an imaged object via the imaging lens assembly 101, perform image focusing by the driving apparatus 102, and generate an image on the image sensor 103, and the imaging information can be transmitted.

The driving apparatus 102 can be an auto-focus module, which can be driven by driving systems, such as voice coil motors (VCM), micro electro-mechanical systems (MEMS), piezoelectric systems, and shape memory alloys etc. The image capturing system lens assembly can obtain a favorable imaging position by the driving apparatus 102 so as to capture clear images when the imaged object is disposed at different object distances.

The imaging apparatus 100 can include the image sensor 103 located on the image surface of the image capturing system lens assembly, such as CMOS and CCD, with superior photosensitivity and low noise. Thus, it is favorable for providing realistic images with high definition image quality thereof. Moreover, the imaging apparatus 100 can further include an image stabilization module 104, which can be a kinetic energy sensor, such as an accelerometer, a gyro sensor, and a Hall Effect sensor. In the 12th embodiment, the image stabilization module 104 is a gyro sensor, but is not limited thereto. Therefore, the variation of different axial directions of the image capturing system lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

13th Embodiment

Figure 26A:
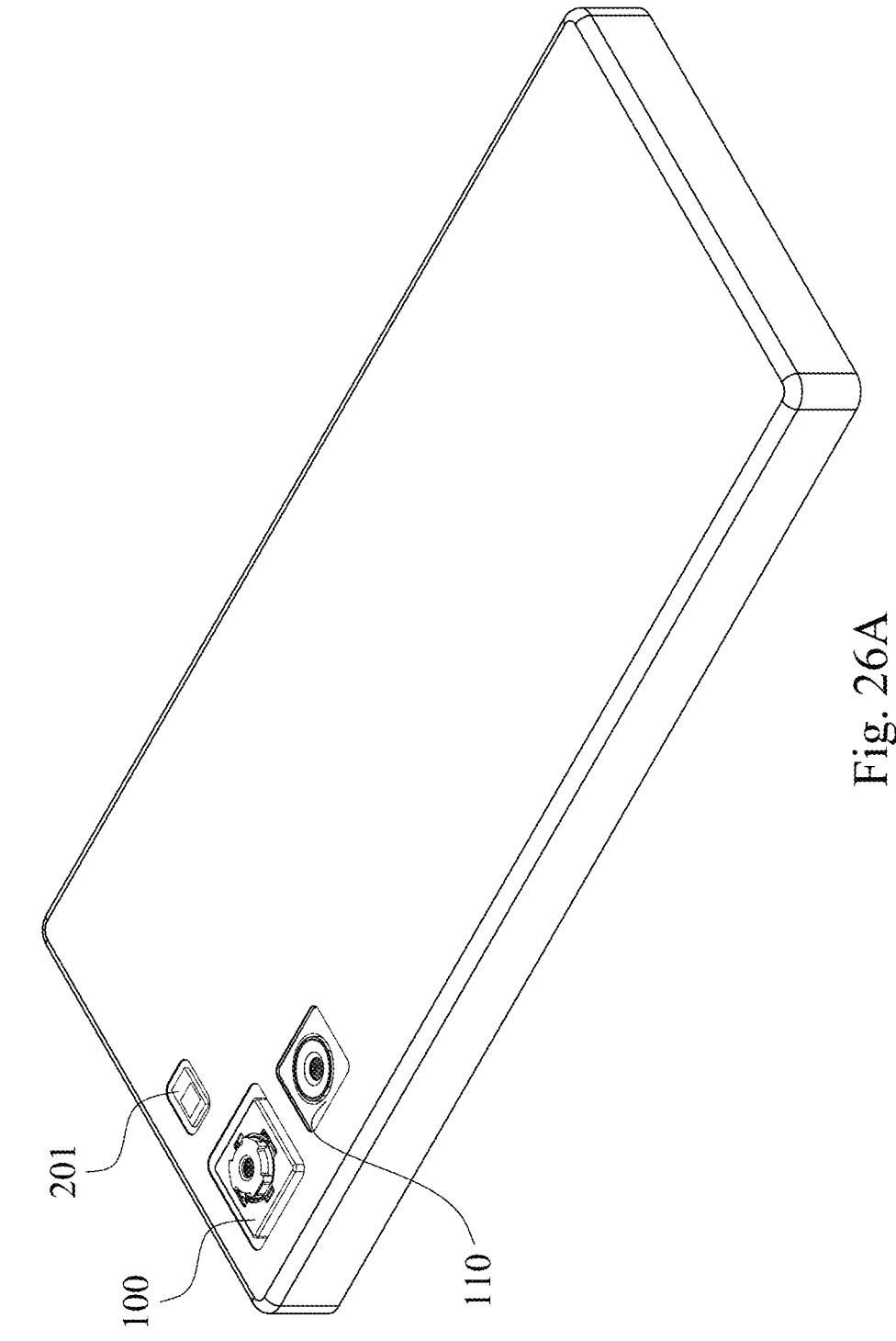
FIG. 26A is a schematic view of one side of an electronic device according to the 13th embodiment of the present disclosure.
Figure 26B:
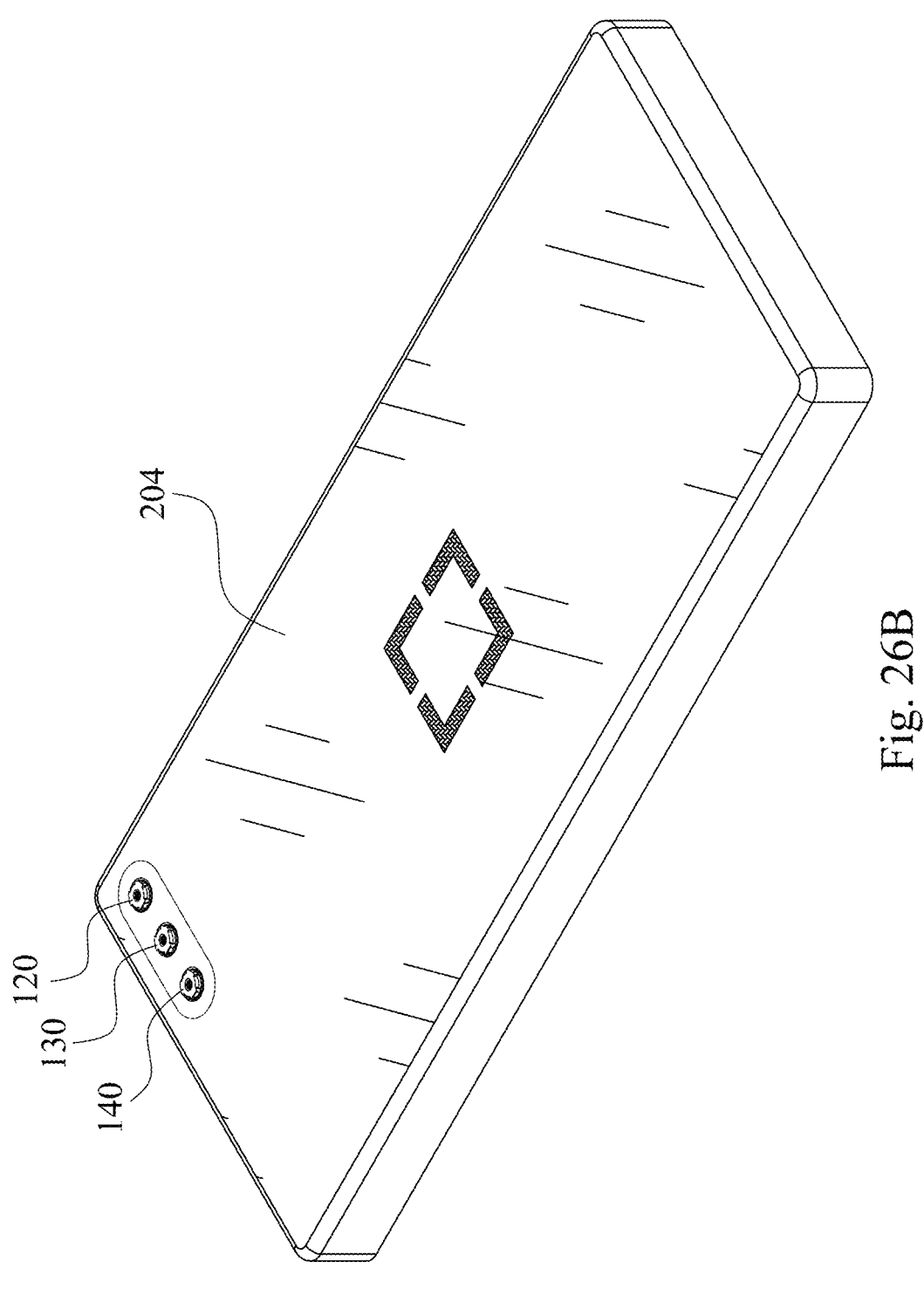
FIG. 26B is a schematic view of another side of the electronic device of FIG. 26A.
Figure 26C:
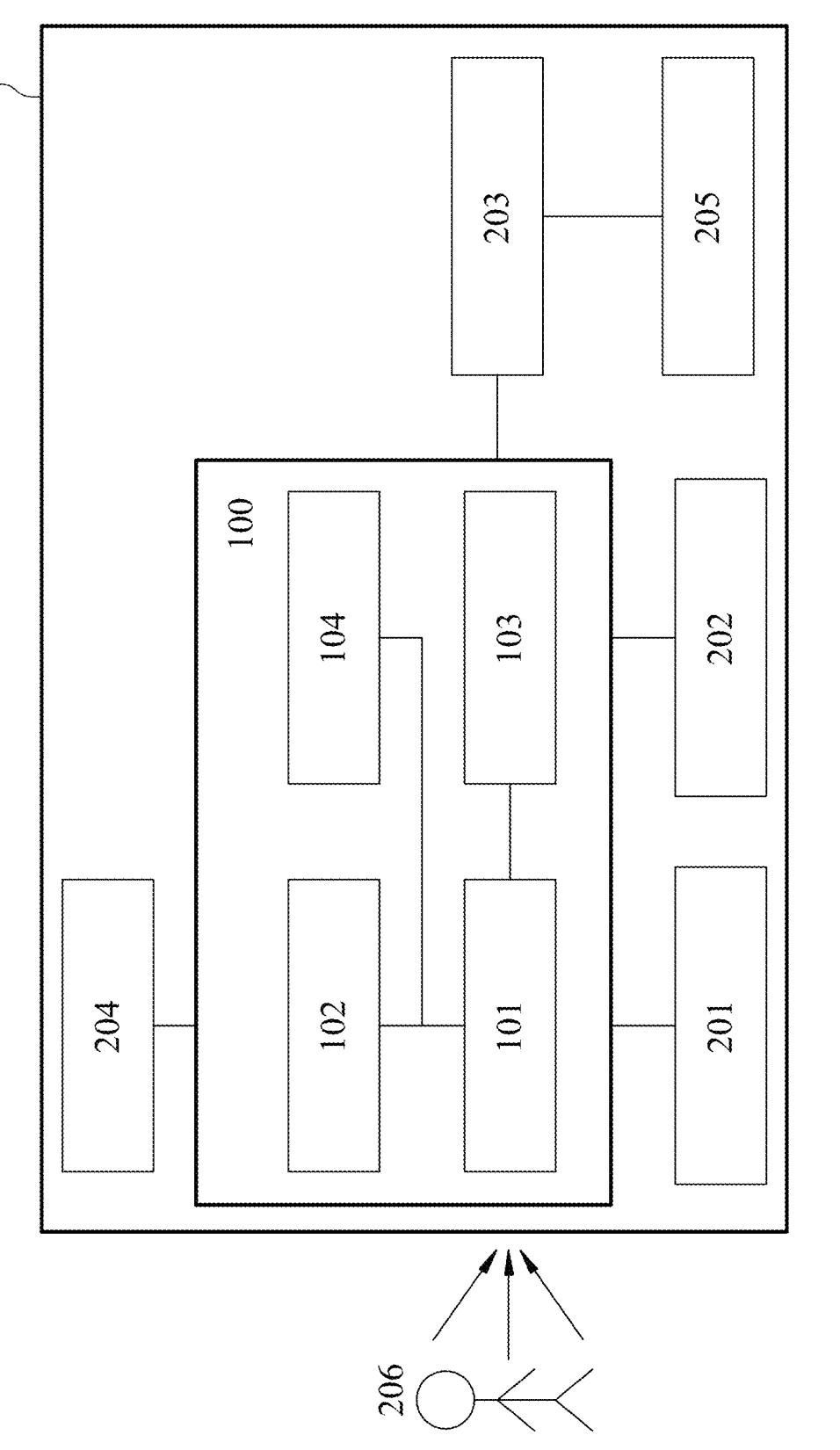
FIG. 26C is a system schematic view of the electronic device of FIG. 26A.

FIG. 26A is a schematic view of one side of an electronic device 200 according to the 13th embodiment of the present disclosure. FIG. 26B is a schematic view of another side of the electronic device 200 of FIG. 26A. FIG. 26C is a system schematic view of the electronic device 200 of FIG. 26A. In FIGS. 26A, 26B and 26C, the electronic device 200 according to the 13th embodiment is a smartphone, which include imaging apparatuses 100, 110, 120, 130, 140, a flash module 201, a focusing assisting module 202, an image signal processor (ISP) 203, a user interface 204 and an image software processor 205, wherein each of the imaging apparatuses 120, 130, 140 is a front camera. When the user captures images of an imaged object 206 via the user interface 204, the electronic device 200 focuses and generates an image via at least one of the imaging apparatuses 100, 110, 120, 130, 140, while compensating for low illumination via the flash module 201 when necessary. Then, the electronic device 200 quickly focuses on the imaged object 206 according to its object distance information provided by the focusing assisting module 202, and optimizes the image via the image signal processor 203 and the image software processor 205. Thus, the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

Each of the imaging apparatuses 100, 110, 120, 130, 140 according to the 13th embodiment can include the image capturing system lens assembly of the present disclosure, and can be the same or similar to the imaging apparatus 100 according to the aforementioned 12th embodiment, and will not describe again herein. In detail, according to the 13th embodiment, the imaging apparatuses 100, 110 can be wide angle imaging apparatus and ultra-wide angle imaging apparatus, respectively. The imaging apparatuses 120, 130, 140 can be wide angle imaging apparatus, ultra-wide angle imaging apparatus and TOF (Time-Of-Flight) module, respectively, or can be others imaging apparatuses, which will not be limited thereto. Further, the connecting relationships between each of the imaging apparatuses 110, 120, 130, 140 and other elements can be the same as the imaging apparatus 100 in FIG. 26C, or can be adaptively adjusted according to the type of the imaging apparatuses, which will not be shown and detailed described again.

14th Embodiment

Figure 27:
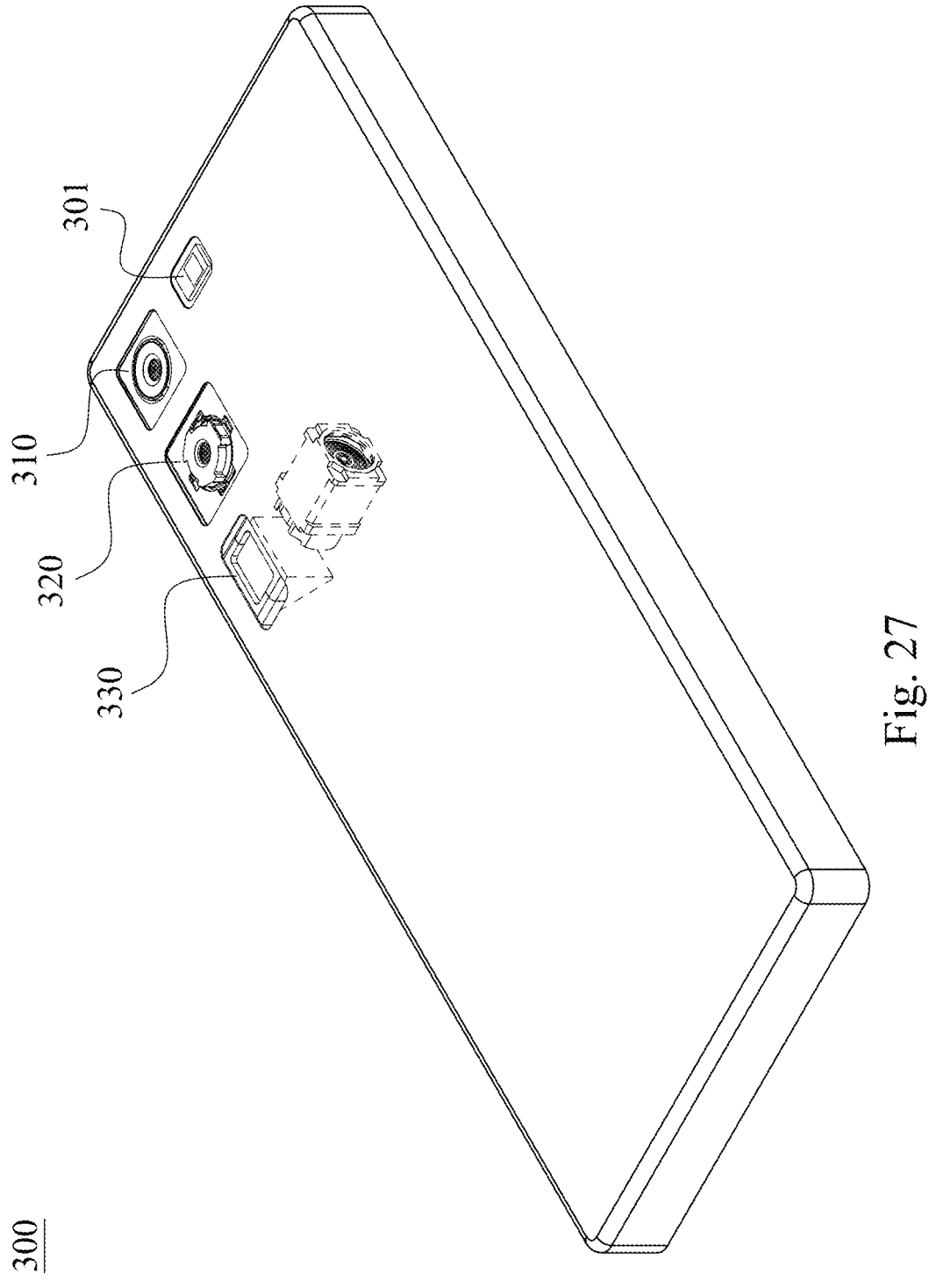
FIG. 27 is a schematic view of one side of an electronic device according to the 14th embodiment of the present disclosure.

FIG. 27 is a schematic view of one side of an electronic device 300 according to the 14th embodiment of the present disclosure. According to the 14th embodiment, the electronic device 300 is a smartphone, which include imaging apparatuses 310, 320, 330 and a flash module 301.

The electronic device 300 according to the 14th embodiment can include the same or similar elements to that according to the 13th embodiment, and each of the imaging apparatuses 310, 320, 330 according to the 14th embodiment can have a configuration which is the same or similar to that according to the 13th embodiment, and will not describe again herein. In detail, according to the 14th embodiment, each of the imaging apparatuses 310, 320, 330 can include the image capturing system lens assembly of the present disclosure, and can be the same or similar to the imaging apparatus 100 according to the aforementioned 12th embodiment, and will not describe again herein. In detail, the imaging apparatus 310 can be ultra-wide angle imaging apparatus, the imaging apparatus 320 can be wide angle imaging apparatus, the imaging apparatus 330 can be telephoto imaging apparatus (which can include light path folding element), or can be adaptively adjusted according to the type of the imaging apparatuses, which will not be limited to the arrangement.

15th Embodiment

Figure 28:
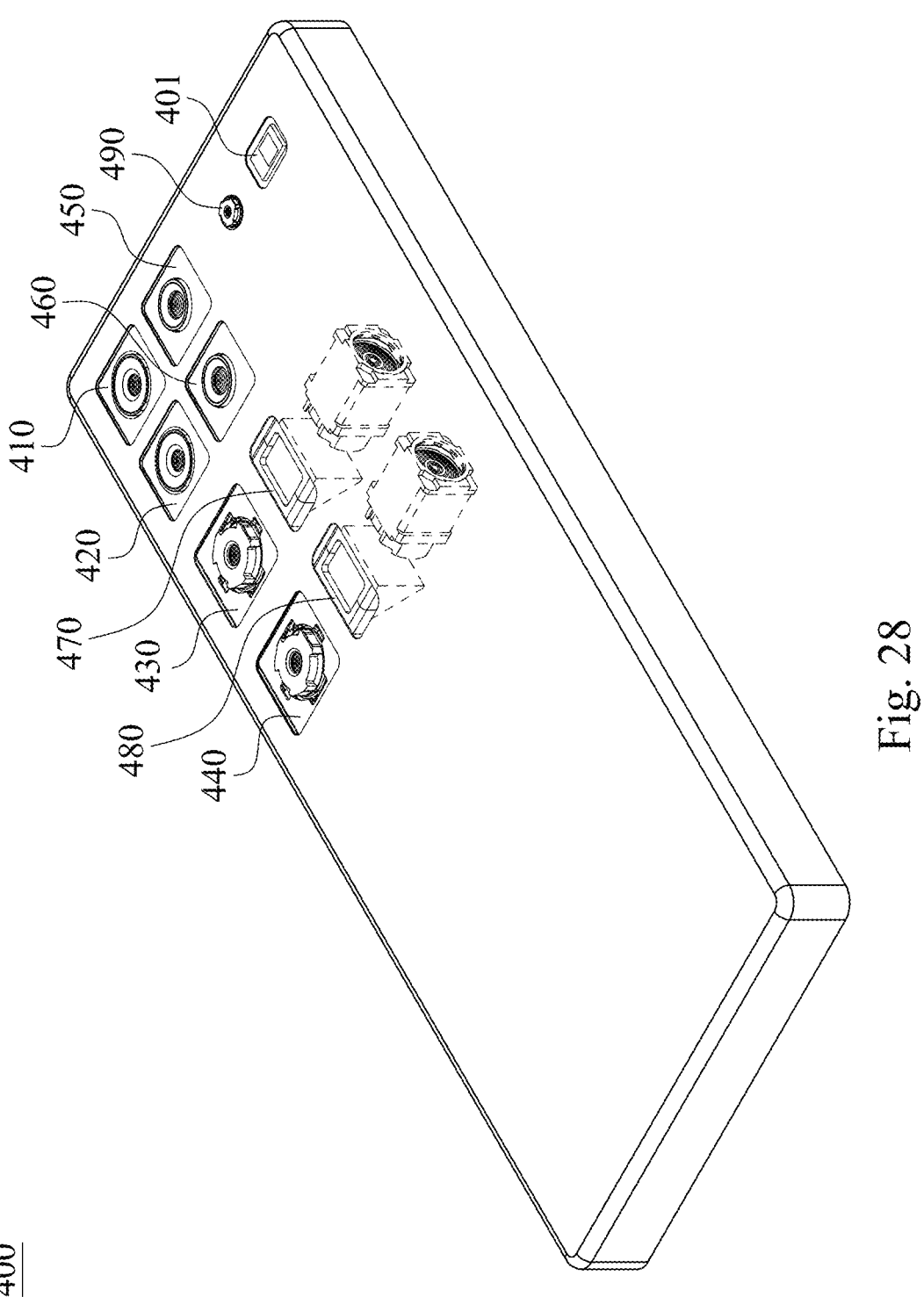
FIG. 28 is a schematic view of one side of an electronic device according to the 15th embodiment of the present disclosure.

FIG. 28 is a schematic view of one side of an electronic device 400 according to the 15th embodiment of the present disclosure. According to the 15th embodiment, the electronic device 400 is a smartphone, which include imaging apparatuses 410, 420, 430, 440, 450, 460, 470, 480, 490 and a flash module 401.

The electronic device 400 according to the 15th embodiment can include the same or similar elements to that according to the 13th embodiment, and each of the imaging apparatuses 410, 420, 430, 440, 450, 460, 470, 480, 490 and the flash module 401 can have a configuration which is the same or similar to that according to the 13th embodiment, and will not describe again herein. In detail, according to the 15th embodiment, each of the imaging apparatuses 410, 420, 430, 440, 450, 460, 470, 480, 490 can include the image capturing system lens assembly of the present disclosure, and can be the same or similar to the imaging apparatus 100 according to the aforementioned 12th embodiment, and will not describe again herein.

In detail, each of the imaging apparatuses 410, 420 can be ultra-wide angle imaging apparatus, each of the imaging apparatuses 430, 440 can be wide angle imaging apparatus, each of the imaging apparatuses 450, 460 can be telephoto imaging apparatus, each of the imaging apparatuses 470, 480 can be telephoto imaging apparatus (which can include light path folding element), the imaging apparatus 490 can be TOF module, or can be adaptively adjusted according to the type of the imaging apparatuses, which will not be limited to the arrangement.

16th Embodiment

Figures 29A, 29B:
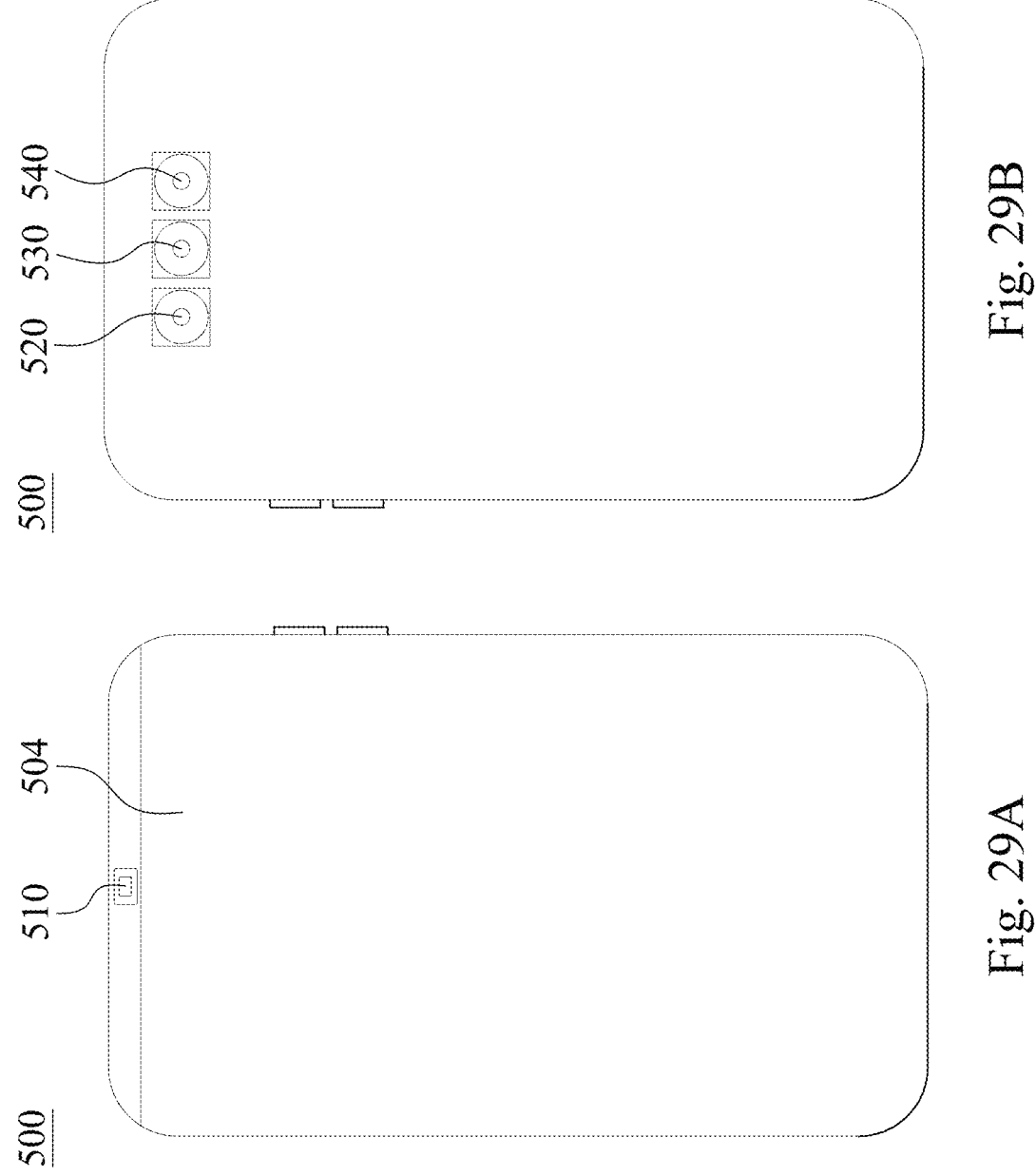
FIG. 29A is a schematic view of one side of an electronic device according to the 16th embodiment of the present disclosure.
FIG. 29B is a schematic view of another side of the electronic device according to the 16th embodiment of FIG. 29A.

FIG. 29A is a schematic view of one side of an electronic device 500 according to the 16th embodiment of the present disclosure. FIG. 29B is a schematic view of another side of the electronic device 500 according to the 16th embodiment of FIG. 29A. In FIG. 29A and FIG. 29B, according to the 16th embodiment, the electronic device 500 is a smartphone, which include imaging apparatuses 510, 520, 530, 540 and a user interface 504.

The electronic device 500 according to the 16th embodiment can include the same or similar elements to that according to the 13th embodiment, and each of the imaging apparatuses 510, 520, 530, 540 and the user interface 504 can have a configuration which is the same or similar to that according to the 13th embodiment, and will not describe again herein. In detail, according to the 16th embodiment, the imaging apparatus 510 corresponds to a non-circular opening located on an outer side of the electronic device 500 for capturing the image, and the imaging apparatuses 520, 530, 540 can be telephoto imaging apparatus, wide angle imaging apparatus and ultra-wide angle imaging apparatus, respectively, or can be adaptively adjusted according to the type of the imaging apparatuses, which will not be limited to the arrangement.

17th Embodiment

Figure 30:
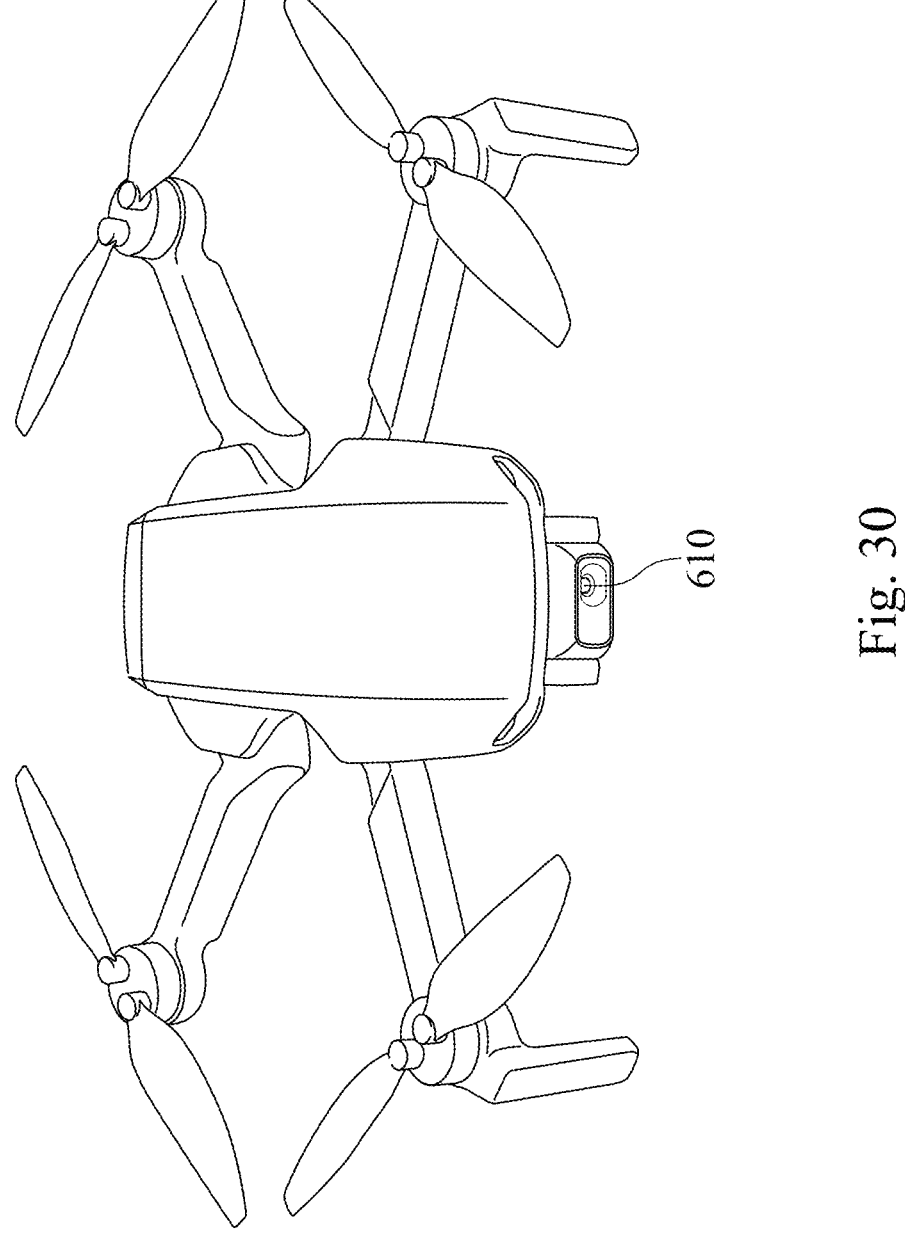
FIG. 30 is a three-dimensional schematic view of an electronic device according to the 17th embodiment of the present disclosure.

FIG. 30 is a three-dimensional schematic view of an electronic device 600 according to the 17th embodiment of the present disclosure. In FIG. 30, the electronic device in the 17th embodiment is an unmanned aerial vehicle, which includes an imaging apparatus 610. The imaging apparatus 610 can include the image capturing system lens assembly of the present disclosure, and can be the same or similar to the imaging apparatus 100 according to the aforementioned 12th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing system lens assembly comprising eight lens elements, the eight lens elements being, in order from an object side to an image side:

a first lens element, a second lens element, a third lens element, a fourth lens element, a fifth lens element, a sixth lens element, a seventh lens element and an eighth lens element; each of the eight lens elements has an object-side surface towards the object side and an image-side surface towards the image side;

wherein the image-side surface of the first lens element is concave in a paraxial region thereof;

the second lens element has positive refractive power;

the fourth lens element has negative refractive power;

the fifth lens element has positive refractive power;

the eighth lens element has negative refractive power, the image-side surface of the eighth lens element is concave in a paraxial region thereof, the image-side surface of the eighth lens element comprises at least one inflection point;

wherein the image capturing system lens assembly further comprises an aperture stop, an axial distance between the aperture stop and the image-side surface of the eighth lens element is SD, an axial distance between the object-side surface of the first lens element and the image-side surface of the eighth lens element is TD, a focal length of the image capturing system lens assembly is f, a focal length of the first lens element is f1, a focal length of the second lens element is f2, an axial distance between the first lens element and the second lens element is T12, a curvature radius of the image-side surface of the fifth lens element is R10, and the following conditions are satisfied:

$$0.20 < T12/f < 2.50;$$
$$0.25 < |f2/f1| < 1.40;$$
$$0.01 < SD/TD < 0.70; \text{ and}$$
$$0.40 < |f/R10| < 2.5.$$

2. The image capturing system lens assembly of claim 1, wherein the focal length of the image capturing system lens assembly is f, the axial distance between the first lens element and the second lens element is T12, and the following condition is satisfied:

$$0.30 < T12/f < 1.50.$$

3. The image capturing system lens assembly of claim 1, wherein the focal length of the image capturing system lens assembly is f, a focal length of the third lens element is f3, a focal length of the fourth lens element is f4, a focal length of the fifth lens element is f5, a focal length of the sixth lens element is f6, and the following condition is satisfied:

$$0 < (|f/f3|+|f/f6|)/(|f/f4|+|f/f5|) < 0.50.$$

4. The image capturing system lens assembly of claim 1, wherein the object-side surface of the second lens element is convex in a paraxial region thereof, the object-side surface of the fifth lens element is convex in a paraxial region thereof, the image-side surface of the fifth lens element is convex in a paraxial region thereof.

5. The image capturing system lens assembly of claim 1, wherein the object-side surface of the seventh lens element is convex in a paraxial region thereof; a focal length of the third lens element is f3, a focal length of the fifth lens element is f5, and the following condition is satisfied:

$$0 < |f5/f3| < 0.25.$$

6. The image capturing system lens assembly of claim 1, wherein an axial distance between the object-side surface of the first lens element and an image surface is TL, a maximum image height of the image capturing system lens assembly is ImgH, and the following condition is satisfied:

$$1.50 < TL/\text{ImgH} < 3.50.$$

7. The image capturing system lens assembly of claim 1, wherein a central thickness of the fourth lens element is CT4, a central thickness of the fifth lens element is CT5, and the following condition is satisfied:

$$0.10 < CT4/CT5 < 0.40.$$

8. The image capturing system lens assembly of claim 1, wherein the axial distance between the first lens element and the second lens element is T12, an axial distance between the image-side surface of the eighth lens element and an image surface is BL, and the following condition is satisfied:

$$0.90 < T12/BL < 5.00.$$

9. The image capturing system lens assembly of claim 1, wherein an Abbe number of the eighth lens element is V8, and the following condition is satisfied:

$$10.0 < V8 < 40.0.$$

10. The image capturing system lens assembly of claim 1, wherein an axial distance between the object-side surface of the first lens element and the image-side surface of the second lens element is Dr1r4, an axial distance between the object-side surface of the sixth lens element and the image-side surface of the eighth lens element is Dr11r16, and the following condition is satisfied:

$$1.20 < Dr1r4/Dr11r16 < 2.50.$$

11. The image capturing system lens assembly of claim 1, wherein a maximum effective radius of the object-side surface of the first lens element is Y1R1, a maximum effective radius of the object-side surface of the fifth lens element is Y5R1, a maximum effective radius of the image-side surface of the eighth lens element is Y8R2, a maximum image height of the image capturing system lens assembly is ImgH, and the following conditions are satisfied:

$$0.80 < Y1R1/Y8R2 < 1.50; \text{ and}$$

$$0.20 < Y5R1/ImgH < 0.50.$$

12. The image capturing system lens assembly of claim 1, wherein a displacement in parallel with an optical axis from an axial vertex on the image-side surface of the first lens element to a maximum effective radius position on the image-side surface of the first lens element is SAG1R2, a central thickness of the first lens element is CT1, and the following condition is satisfied:

$$1.00 < SAG1R2/CT1 < 4.50.$$

13. An imaging apparatus, comprising:
the image capturing system lens assembly of claim 1; and
an image sensor disposed on an image surface of the image capturing system lens assembly.
14. An electronic device, comprising:
the imaging apparatus of claim 13.
15. An image capturing system lens assembly comprising eight lens elements, the eight lens elements being, in order from an object side to an image side:
a first lens element, a second lens element, a third lens element, a fourth lens element, a fifth lens element, a sixth lens element, a seventh lens element and an eighth lens element; each of the eight lens elements has an object-side surface towards the object side and an image-side surface towards the image side;
wherein the image-side surface of the first lens element is concave in a paraxial region thereof;
the object-side surface of the second lens element is convex in a paraxial region thereof;
the fourth lens element has negative refractive power;
the image-side surface of the fifth lens element is convex in a paraxial region thereof;
the image-side surface of the eighth lens element is concave in a paraxial region thereof, the image-side surface of the eighth lens element comprises at least one inflection point;
wherein a focal length of the image capturing system lens assembly is f, a focal length of the first lens element is f1, a focal length of the second lens element is f2, an axial distance between the first lens element and the second lens element is T12, a curvature radius of the object-side surface of the second lens element is R3, a curvature radius of the image-side surface of the second lens element is R4, and the following conditions are satisfied:

$$0.25 < T12/f < 2.50;$$

$$0.25 < |f2/f1| < 1.40; \text{ and}$$

$$-12.00 < (R3 - R4)/(R3 + R4) < 0.20.$$

16. The image capturing system lens assembly of claim 15, wherein the curvature radius of the object-side surface of the second lens element is R3, the curvature radius of the image-side surface of the second lens element is R4, and the following condition is satisfied:

$$-7.00 < (R3 - R4)/(R3 + R4) < -0.50.$$

17. The image capturing system lens assembly of claim 15, wherein the object-side surface of the seventh lens element is convex in a paraxial region thereof, and the object-side surface of the seventh lens element comprises at least one inflection point.
18. The image capturing system lens assembly of claim 15, wherein both of the first lens element and the second lens element are made of glass material; a refractive index of the second lens element is N2, and the following condition is satisfied:

$$1.620 < N2 < 1.900.$$

19. The image capturing system lens assembly of claim 15, wherein the eighth lens element has negative refractive power; a maximum field of view of the image capturing system lens assembly is FOV, and the following condition is satisfied:

$$70.0 \text{ degrees} < FOV < 120.0 \text{ degrees.}$$

20. The image capturing system lens assembly of claim 15, wherein a curvature radius of the object-side surface of the first lens element is R1, a curvature radius of the object-side surface of the fifth lens element is R9, and the following condition is satisfied:

$$0.10 < (R1 - R9)/(R1 + R9) < 2.50.$$

21. The image capturing system lens assembly of claim 15, wherein a central thickness of the fifth lens element is CT5, an axial distance between the seventh lens element and the eighth lens element is T78, and the following condition is satisfied:

$$0.10 < CT5/T78 < 4.00.$$

22. The image capturing system lens assembly of claim 15, wherein an Abbe number of the third lens element is V3, an Abbe number of the sixth lens element is V6, and the following condition is satisfied:

$$1.5 < V3/V6 < 3.5.$$

23. An image capturing system lens assembly comprising eight lens elements, the eight lens elements being, in order from an object side to an image side:

a first lens element, a second lens element, a third lens element, a fourth lens element, a fifth lens element, a sixth lens element, a seventh lens element and an eighth lens element; each of the eight lens elements has an object-side surface towards the object side and an image-side surface towards the image side;

wherein the image-side surface of the first lens element is concave in a paraxial region thereof;

the second lens element has positive refractive power, the object-side surface of the second lens element is convex in a paraxial region thereof;

the fourth lens element has negative refractive power;

the image-side surface of the fifth lens element is convex in a paraxial region thereof;

the eighth lens element has negative refractive power, the image-side surface of the eighth lens element is concave in a paraxial region thereof, the image-side surface of the eighth lens element comprises at least one inflection point;

wherein the image capturing system lens assembly further comprises an aperture stop, an axial distance between the aperture stop and the image-side surface of the eighth lens element is SD, an axial distance between the object-side surface of the first lens element and the image-side surface of the eighth lens element is TD, a focal length of the image capturing system lens assembly is f, a focal length of the first lens element is f1, a focal length of the second lens element is f2, an axial distance between the first lens element and the second lens element is T12, a curvature radius of the object-side surface of the first lens element is R1, a curvature radius of the image-side surface of the eighth lens element is R16, and the following conditions are satisfied:

$$0.28 < T12/f < 2.00;$$

$$0.01 < |f2/f1| < 1.40;$$

$$0.01 < SD/TD < 0.70; \text{ and}$$

$$0.10 < (R1 - R16)/(R1 + R16) < 2.00.$$

24. The image capturing system lens assembly of claim 23, wherein the object-side surface of the first lens element is convex in a paraxial region thereof; a curvature radius of the image-side surface of the fifth lens element is R10, a curvature radius of the object-side surface of the seventh lens element is R13, and the following condition is satisfied:

$$-2.00 < R10/R13 < -0.10.$$

25. The image capturing system lens assembly of claim 23, wherein the image-side surface of the seventh lens element is concave in a paraxial region thereof, the image-side surface of the seventh lens element comprises at least one inflection point; a central thickness of the third lens element is CT3, a central thickness of the fifth lens element is CT5, and the following condition is satisfied:

$$1.70 < CT5/CT3 < 5.50.$$

26. The image capturing system lens assembly of claim 23, wherein the focal length of the image capturing system lens assembly is f, a curvature radius of the object-side surface of the fifth lens element is R9, a curvature radius of the image-side surface of the fifth lens element is R10, and the following condition is satisfied:

$$1.20 < |f/R9| + |f/R10| < 3.40.$$

27. The image capturing system lens assembly of claim 23, wherein the aperture stop is located between the third lens element and the fourth lens element; a central thickness of the fifth lens element is CT5, an axial distance between the fifth lens element and the sixth lens element is T56, and the following condition is satisfied:

$$0.20 < T56/CT5 < 1.35.$$

28. The image capturing system lens assembly of claim 23, wherein an Abbe number of the third lens element is V3, an Abbe number of the fourth lens element is V4, and the following condition is satisfied:

$$1.5 < V3/V4 < 3.5.$$

29. The image capturing system lens assembly of claim 23, wherein the focal length of the image capturing system lens assembly is f, the focal length of the first lens element is f1, the focal length of the second lens element is f2, the axial distance between the first lens element and the second lens element is T12, the axial distance between the aperture stop and the image-side surface of the eighth lens element is SD, the axial distance between the object-side surface of the first lens element and the image-side surface of the eighth lens element is TD, the curvature radius of the object-side surface of the first lens element is R1, a curvature radius of the object-side surface of the second lens element is R3, a curvature radius of the image-side surface of the second lens element is R4, a curvature radius of the image-side surface of the fifth lens element is R10, the curvature radius of the image-side surface of the eighth lens element is R16, and the following conditions are satisfied:

$$0.43 \leq T12/f \leq 0.63;$$

$$0.61 \leq |f2/f1| \leq 0.93;$$

$$0.38 \leq SD/TD \leq 0.49;$$

$$0.76 \leq |f/R10| \leq 1.26;$$

$$-5.37 \leq (R3 - R4)/(R3 + R4) \leq -0.72; \text{ and}$$

$$0.35 \leq (R1 - R16)/(R1 + R16) \leq 1.10.$$

* * * * *